(12) United States Patent
Rothbrust et al.

(10) Patent No.: US 12,239,500 B2
(45) Date of Patent: Mar. 4, 2025

(54) PRE-SINTERED MULTI-LAYERED DENTAL MILL BLANK, PROCESS FOR PREPARING THE SAME, AND USES THEREOF, AND A SINTERING PROCESS

(71) Applicant: Ivoclar Vivadent AG, Schaan (LI)

(72) Inventors: Frank Rothbrust, Rons (AT); Sasa Lukic, Lindau (DE); Christian Ritzberger, Grabs (CH); Corina Serban, Goldach (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 18/440,645

(22) Filed: Feb. 13, 2024

(65) Prior Publication Data

US 2024/0277456 A1 Aug. 22, 2024

Related U.S. Application Data

(60) Provisional application No. 63/485,147, filed on Feb. 15, 2023.

(51) Int. Cl.
*A61C 13/00* (2006.01)
*A61C 13/08* (2006.01)
(Continued)

(52) U.S. Cl.
CPC ...... *A61C 13/0022* (2013.01); *A61C 13/0004* (2013.01); *A61C 13/082* (2013.01);
(Continued)

(58) Field of Classification Search
CPC ....... Y10T 428/24942; Y10T 428/2495; Y10T 428/24967; Y10T 428/24983;
(Continued)

(56) References Cited

U.S. PATENT DOCUMENTS 6,087,285 A 7/2000 Oomichi et al.
6,713,421 B1 3/2004 Hauptmann et al.
(Continued)

FOREIGN PATENT DOCUMENTS

CN 105584161 A 5/2016
EP 3772497 A1 2/2021
(Continued)

OTHER PUBLICATIONS

Li, L, et al., Rapid-sintered dental zirconia for chair-side one-visit application, International Journal of Applied Ceramic Technology, Mar. 29, 2019,, vol. 16, No. 5, pp. 1830-1835.

*Primary Examiner* — Maria V Ewald
*Assistant Examiner* — Ethan A. Utt
(74) *Attorney, Agent, or Firm* — Hodgson Russ LLP

(57) ABSTRACT

The present invention relates to a pre-sintered multi-layered dental mill blank comprising a top layer, a bottom layer, and at least one intermediate layer. The pre-sintered multi-layered dental mill blank or a part prepared thereof has one or more desirable properties when being fully sintered by a speed sintering process. The present invention also relates to a process for preparing a dental restoration using the pre-sintered multi-layered dental mill blank as well as to a dental restoration as such. The present invention further relates to a process for sintering a dental restoration precursor.

20 Claims, 7 Drawing Sheets

(51) Int. Cl.
*A61C 13/083* (2006.01)
*B32B 18/00* (2006.01)
*C04B 35/486* (2006.01)

(52) U.S. Cl.
CPC ............ *A61C 13/083* (2013.01); *B32B 18/00* (2013.01); *C04B 35/486* (2013.01); *A61C 2201/002* (2013.01); *B32B 2307/4026* (2013.01); *C04B 2237/348* (2013.01); *C04B 2237/58* (2013.01); *C04B 2237/704* (2013.01)

(58) Field of Classification Search
CPC ............ Y10T 428/24922; Y10T 428/26; Y10T 428/266; B32B 7/00; B32B 7/02; B32B 7/022; B32B 9/00; B32B 9/005; B32B 9/04; B32B 18/00; A61C 13/00; A61C 13/08; A61C 13/083; A61K 6/00; A61K 6/80; A61K 6/802; A61K 6/804; A61K 6/811; A61K 6/813; A61K 6/818; A61K 6/82; A61K 6/822; A61K 6/824; C04B 35/00; C04B 35/01; C04B 35/48; C04B 35/486; C04B 35/488; C04B 35/4885; C04B 2103/54; C04B 2103/56; C04B 2201/20; C04B 2201/50; C04B 2235/65; C04B 2235/66; C04B 2237/00; C04B 2237/30; C04B 2237/32; C04B 2237/34; C04B 2237/345; C04B 2237/348; C04B 2237/50; C04B 2237/58
USPC ....... 428/212, 213, 215, 217, 218, 220, 332, 428/337, 688, 689, 697, 699, 701, 702, 428/542.8; 433/167, 201.1, 202.1, 203.1, 433/212.1; 106/35; 501/1, 94, 102, 103, 501/105, 126, 127, 132, 152, 153
See application file for complete search history.

(56) References Cited

U.S. PATENT DOCUMENTS

| | | |
|---|---|---|
| 2007/0197368 A1 | 8/2007 | Tsukuma et al. |
| 2007/0272120 A1 | 11/2007 | Engels et al. |
| 2007/0275352 A1 | 11/2007 | Gubler et al. |
| 2007/0292597 A1 | 12/2007 | Ritzberger et al. |
| 2010/0003630 A1 | 1/2010 | Yamashita et al. |
| 2011/0027742 A1 | 2/2011 | Fujisaki et al. |
| 2012/0012789 A1 | 1/2012 | Yamada et al. |
| 2013/0221554 A1 | 8/2013 | Jung et al. |
| 2013/0316305 A1 | 11/2013 | Carden et al. |
| 2013/0341812 A1 | 12/2013 | Schechner et al. |
| 2014/0135200 A1 | 5/2014 | Reinshagen et al. |
| 2014/0227654 A1 | 8/2014 | Fujisaki et al. |
| 2015/0125822 A1 | 5/2015 | Cramer Von Clausbruch |
| 2015/0191397 A1 | 7/2015 | Ritzberger et al. |
| 2015/0223917 A1 | 8/2015 | Herrmann et al. |
| 2015/0315086 A1 | 11/2015 | Kawamura et al. |
| 2016/0016853 A1 | 1/2016 | Yamada et al. |
| 2016/0074142 A1 | 3/2016 | Yamada et al. |
| 2016/0095798 A1 | 4/2016 | Brodkin et al. |
| 2016/0120765 A1 | 5/2016 | Dang et al. |
| 2016/0157971 A1 | 6/2016 | Rothbrust et al. |
| 2016/0310245 A1 | 10/2016 | Fujisaki et al. |
| 2017/0143458 A1 | 5/2017 | Fujisaki et al. |
| 2017/0181818 A1 | 6/2017 | Volkl et al. |
| 2017/0189146 A1 | 7/2017 | Volkl et al. |
| 2017/0216000 A1 | 8/2017 | Jahns et al. |
| 2017/0258563 A1 | 9/2017 | Volkl et al. |
| 2017/0349494 A1 | 12/2017 | Yamashita et al. |
| 2018/0002235 A1 | 1/2018 | Ito et al. |
| 2018/0028295 A1 | 2/2018 | Kadobayashi et al. |
| 2018/0055612 A1 | 3/2018 | Kadobayashi et al. |
| 2018/0125616 A1 | 5/2018 | Kitamura et al. |
| 2018/0147034 A1 | 5/2018 | Torita et al. |
| 2018/0235847 A1 | 8/2018 | Balasubramanian et al. |
| 2018/0237345 A1 | 8/2018 | Valenti et al. |
| 2018/0263740 A1 | 9/2018 | Jung et al. |
| 2018/0263863 A1 | 9/2018 | Kim |
| 2018/0327319 A1 | 11/2018 | Li et al. |
| 2019/0117521 A1 | 4/2019 | Herrmann et al. |
| 2019/0231651 A1 | 8/2019 | Ito |
| 2019/0328622 A1 | 10/2019 | Bäurer |
| 2019/0380815 A1 | 12/2019 | Aiba et al. |
| 2019/0381769 A1 | 12/2019 | Reinshagen et al. |
| 2020/0008910 A1 | 1/2020 | Bojemueller et al. |
| 2020/0113658 A1 | 4/2020 | Ban et al. |
| 2020/0113661 A1 | 4/2020 | Ritzberger |
| 2020/0132550 A1 | 4/2020 | Lerch et al. |
| 2020/0170763 A1 | 6/2020 | Jiang et al. |
| 2020/0170765 A1 | 6/2020 | Rothbrust et al. |
| 2020/0171699 A1 | 6/2020 | Ritzberger et al. |
| 2020/0223756 A1 | 7/2020 | Kawamura et al. |
| 2020/0317581 A1 | 10/2020 | Ito et al. |
| 2020/0331807 A1 | 10/2020 | Nonaka et al. |
| 2020/0368116 A1 | 11/2020 | Woldegergis et al. |
| 2020/0375706 A1 | 12/2020 | Jung et al. |
| 2020/0405586 A1 | 12/2020 | Hauptmann et al. |
| 2021/0093517 A1 | 4/2021 | Hauptmann et al. |
| 2021/0102116 A1 | 4/2021 | Kudo et al. |
| 2021/0128283 A1 | 5/2021 | Kato et al. |
| 2021/0155551 A1 | 5/2021 | Park |
| 2021/0196437 A1 | 7/2021 | Seger et al. |
| 2021/0290351 A1* | 9/2021 | Voelkl ..................... C04B 35/46 |
| 2021/0308018 A1 | 10/2021 | Ito et al. |
| 2021/0355042 A1 | 11/2021 | Yan et al. |
| 2021/0401552 A1 | 12/2021 | Nonaka et al. |
| 2022/0017423 A1 | 1/2022 | Kato et al. |
| 2022/0096215 A1 | 3/2022 | Rampf et al. |
| 2022/0104925 A1 | 4/2022 | Reusch et al. |
| 2022/0133601 A1 | 5/2022 | Jahns et al. |
| 2022/0135486 A1 | 5/2022 | Kudo et al. |
| 2022/0153649 A1 | 5/2022 | Kudo et al. |
| 2022/0267215 A1 | 8/2022 | Sakamoto et al. |
| 2022/0273403 A1 | 9/2022 | Gödiker et al. |
| 2022/0273404 A1 | 9/2022 | Jahns et al. |
| 2022/0347060 A1 | 11/2022 | Reinshagen et al. |
| 2022/0370299 A1 | 11/2022 | Serban et al. |
| 2022/0378669 A1 | 12/2022 | Angot et al. |
| 2022/0380259 A1 | 12/2022 | Matsuura et al. |
| 2023/0051424 A1 | 2/2023 | Serban et al. |
| 2023/0052915 A1 | 2/2023 | Kato et al. |
| 2023/0082176 A1 | 3/2023 | Kato |

FOREIGN PATENT DOCUMENTS

| | | |
|---|---|---|
| JP | H08-33650 A | 2/1996 |
| WO | 2007/137696 A2 | 12/2007 |
| WO | 2021/100876 A1 | 5/2021 |
| WO | 2021/132704 A1 | 7/2021 |
| WO | 2021/137666 A1 | 7/2021 |
| WO | 2022/074494 A1 | 4/2022 |
| WO | 2023/025588 A1 | 3/2023 |

* cited by examiner

PRE-SINTERED MULTI-LAYERED DENTAL MILL BLANK, PROCESS FOR PREPARING THE SAME, AND USES THEREOF, AND A SINTERING PROCESS

CROSS-REFERENCE TO RELATED APPLICATIONS

This application claims the benefit of U.S. Provisional Patent Application No. 63/485,147, filed on Feb. 15, 2023, the entire disclosure of which is incorporated herein by reference.

TECHNICAL FIELD

The present invention relates to pre-sintered multi-layered dental mill blanks and processes for preparing pre-sintered multi-layered dental mill blanks. The present invention also relates to dental restorations that are obtainable from pre-sintered multi-layered mill blanks. The present invention further relates to processes for sintering dental restoration precursors.

BACKGROUND OF INVENTION

It is typically desired that dental restorations resemble the appearance of a natural tooth and/or match the appearance of neighboring tooth in the mouth of a patient. Although the appearance of natural teeth may vary, there are some optical characteristics that may be seen as universal for most natural human teeth. A natural tooth usually has a color and/or translucency that changes from the upper incisal or occlusal part of the tooth to its lower dentin part. The upper incisal or occlusal part typically has a higher translucency and may be lighter than the lower dentin part. The portion of a tooth between those two parts often shows some type of gradual change or transition in color and translucency. In addition to an appreciable aesthetic of the dental restoration, the dental restoration should have adequate mechanical properties and be long lasting. The preparation of an individual dental restoration should be fast and efficient to provide a patient at the dentistry or at a dental health care center with an adequate treatment in a short time from start to finish.

In the modern dental field, dental restorations are often prepared from ceramic materials such as zirconia ceramic materials. Ceramic dental restorations are typically prepared from dental ceramic mill blanks. Dental ceramic mill blanks are usually porous and not perfectly sintered in order to provide a suitable machinability and workability of the mill blank, like in a CAD/CAM process. Multi-layered dental mill blanks are available in the art that contain different ceramic materials in different layers from a top to a bottom of the mill blank. These dental mill blanks are used with the aim to provide dental restorations with a graded change in optical appearance from an incisal region of the restoration to its dentin region. To prepare a final dental restoration, a ceramic dental restoration precursor is first machined from the dental mill blank. This dental restoration precursor typically has a shape of the final ceramic dental restoration but not yet its final density, and therefore not yet its final dimensions. To provide the ceramic dental restoration in its final density and dimensions, the dental restoration precursor needs to be subjected to a final sintering process. The final properties, such as the optical properties, of a ceramic dental restoration are strongly influenced by the final sintering process. In order to achieve a satisfactory result for the dental restoration, it is usually necessary to proceed through a comparatively long final sintering process, like a sintering process with an overall duration of several hours. Therefore, the final sintering makes up a large part of the time that is needed to prepare an individualized ceramic dental restoration and significantly adds to the time that is necessary to provide a patient with a required treatment.

It would be desirable to shorten the final sintering process in order to shorten the overall time that is necessary to prepare a dental restoration. This is in particular of relevance when aiming at short processing times that would allow so-called chairside (as opposed to labside) applications, in which the patient can be provided with the final dental restoration during a single visit. However, attempts to significantly reduce the final sintering time using known multi-layered dental mill blanks result in dental restorations having unsatisfactory properties, like unsatisfactory optical properties. For example, a dental restoration may be obtained with an unnatural look, e.g., in that it does not show a uniform change of optical properties over the different regions of the restoration.

There is a continuing need in the art for a dental mill blank that is suitable for providing a dental restoration precursor that can be sintered to full density in as short time as possible while at the same time providing a dental restoration having a good optical appearance.

OBJECTS AND SUMMARY OF THE INVENTION

One object of the present invention is to at least partially overcome one or more drawbacks of a prior art dental mill blank. One object of the present invention is to provide a dental mill blank which allows for improved convenience for the patient such as a chairside application and at the same time provides for attractive aesthetics of the dental restoration. One object of the present invention is to provide a dental mill blank that is suitable for providing a dental restoration having desirable properties such as optical properties. One object of the present invention is to provide a dental mill blank that is suitable for preparing a dental restoration precursor that can be sintered to full density in a comparatively short time while at the same time providing a dental restoration having desirable properties such as a desirable optical property, like a graded increase of a translucency from a dentin region to an incisal region.

At least one of the above objects is at least partially solved by the embodiments and aspects of the present invention.

One aspect of the present invention provides a pre-sintered multi-layered dental mill blank comprising a top layer, a bottom layer, and at least one intermediate layer.

In one embodiment, the pre-sintered multi-layered dental mill blank is characterized by providing a representative test section for each layer, the representative test sections, when being fully sintered by a speed sintering process, having a contrast ratio that increases layer-by-layer from the top layer to the bottom layer.

In one embodiment, the pre-sintered multi-layered dental mill blank is characterized by providing a representative test section for each layer, the representative test sections, when being fully sintered by a speed sintering process, having a CIE lightness L* that increases layer-by-layer from the bottom layer to the top layer.

In one embodiment, the pre-sintered multi-layered dental mill blank is characterized by providing a representative test section for each layer, and the representative test section of the top layer and/or an intermediate layer being adjacent to the top layer, when being fully sintered by a speed sintering process, having a number of pores per grain of less than 0.25.

In one embodiment, each layer of the pre-sintered multi-layered dental mill blank comprises zirconia and yttria, wherein the yttria content of the layers increases layer-by-layer from the bottom layer to the top layer, and the top layer comprises a sintering activator (e.g., zinc oxide, gallium oxide, or a combination thereof).

In one embodiment, each layer of the pre-sintered multi-layered dental mill blank comprises zirconia and yttria, wherein the yttria content of the layers increases layer-by-layer from the bottom layer to the top layer, and the top layer comprising aluminum oxide in an amount of less than 0.01 wt. %, based on the total weight of the top layer.

One aspect of the present invention provides a process for preparing a pre-sintered multi-layered dental mill blank, the process comprising the steps of:
 a) providing three yttria-stabilized zirconia powders P1 to P3, powder P1 having an yttria content in the range of 4.5 to 6.1 wt. %, powder P2 having an yttria content in the range of 6.2 to 7.9 wt. %, and powder P3 having an yttria content in the range of 8.0 to 11.0 wt. %,
 b) preparing a green body composed of:
 a top powder layer of powder P3,
 at least one intermediate powder layer of a powder mixture being selected from a mixture of powders P2/P3 and a mixture of powders P1/P2,
 a bottom powder layer of powder P1 or of a mixture of powders P1/P2,
 c) pre-sintering the green body to provide a pre-sintered multi-layered dental mill blank.

Another aspect of the present invention provides a process for preparing a dental restoration, the process comprising the steps of: machining a pre-sintered multi-layered dental mill blank according to any one of the embodiments of the present invention to provide a dental restoration precursor; optionally surface-treating the dental restoration precursor, and sintering the dental restoration precursor to provide a dental restoration.

Another aspect of the present invention provides a dental restoration, the dental restoration being obtainable by a process for preparing a dental restoration according to any one of the embodiments of the present invention.

Yet another aspect of the present invention provides a process for sintering a dental restoration precursor, the process having a total duration of less than 25 minutes and a maximum sintering temperature in the range of 1350 to 1650° C.,
 the process comprising subjecting the dental restoration precursor to
 (i) a heating treatment, and
 (ii) a cooling treatment,
 the cooling treatment comprising a cooling step A, the cooling step A starting and ending within a temperature range between 1100° C. and the maximum sintering temperature, and having a cooling rate A that is at least 75 K/min.

Definitions

In the context of the present invention, the following terms have the following meaning:

"Sintering" as used herein means the densification of a porous ceramic material to a less porous material having a higher density by subjecting the material to heat at an appropriate temperature for densification, the temperature being below the melting point of the main components of the ceramic material.

"Pre-sintered" or "pre-sintering" as used herein means subjecting a ceramic green body to heat in order to partially or fully remove or decompose organic binders, inorganic binders or thermally unstable components. Pre-sintering typically leads to an at least partial formation of sintering necks at connected particle boundaries in the ceramic material and a thermal hardening of the ceramic material which can facilitate workability or machinability of the material. The relative densification from a ceramic green body to a pre-sintered ceramic material is typically 5% or less, relative to a dimension of the ceramic green body. A pre-sintered ceramic material typically has an open-porous structure that can be further densified when fully sintering the material in a subsequent sintering step. The density of pre-sintered ceramic materials, like pre-sintered zirconia ceramics, may be in the range of 45 to 70% relative to the theoretical density of the ceramic material. For zirconia ceramic materials, pre-sintering is typically carried out at a maximum temperature of 700 to 1200° C. The temperature with which a ceramic body has been pre-sintered can be determined by the skilled person, e.g., by measuring the thermal expansion using a dilatometer.

"Fully sintered" or "fully sintering" as used herein means that a ceramic material has been sintered to a density of at least 98.5%, like at least 99.5% or at least 99.8%, of the theoretical density of the ceramic material. The density of the material can be determined by the Archimedes' method according to DIN EN 623-2, or by weighing the material and determining its volume geometrically. The theoretical density of a fully sintered material can be determined by the skilled person, e.g., based on the components of the material. Additionally or alternatively, the theoretical density of the ceramic material may be determined by grinding the ceramic material to a powder having volume-based median particle size in the range of 10 to 30 µm, e.g. 20 µm, and determining the density of the powder by means of a pycnometer. The volume-based median particle size may be determined by laser diffraction, e.g., according to ISO 13320 (2009). The layers of a multi-layered dental mill blank may have different theoretical densities depending on the ceramic materials being present in each layer. In such case, the density and theoretical density of the ceramic material can also be determined for each layer separately.

A "green body" is a molded body of ceramic powder that has not been subjected to a sintering or pre-sintering step, and that typically contains organic binders, inorganic binders, or other additives. The molded body is usually prepared by compacting, (e.g., pressing) the ceramic powder.

"Porous" as used herein means that a material has pores and is meant to comprise open-porous materials and closed-porous materials. An "open-porous" material is a material that has pores that are at least partially interconnected and that are at least partially accessible from the outside by, e.g., a flow of gas or liquid. An open-porous material as defined herein may also have pores that are not accessible from the outside by, e.g., a flow of gas or liquid. A "closed-porous" material is a material that is not open-porous and that has pores that are closed, i.e., pores that are not accessible from the outside by, e.g., by a flow of gas or liquid. "Porosity" is a measure of the void spaces, like pores, in a solid material, and is a fraction of the volume of the void spaces over the total volume of the solid material. It may be expressed as a percentage from 0 to 100%.

"Multi-layered" means having at least three layers, i.e., a "multi-layered dental mill blank" is a dental mill blank having at least three layers.

"Dental mill blank" means a solid, geometrically defined, three dimensional object of material, like a block or a disc, from which a dental article can be machined by, e.g., cutting, milling, grinding, drilling, and the like.

"Dental restoration" as used herein refers to an article that is useful in the dental or orthodontic field for restoring, remodeling, supporting and/or restructuring a tooth or parts thereof or a group of teeth or parts thereof. A dental restoration may be, but is not limited to, a crown, a partial crown, an abutment, an abutment crown, an inlay, an onlay, a veneer, a shell or a bridge.

A "dental restoration precursor" as used herein refers to a work piece machined from a dental mill blank that already has the shape of a dental restoration but that has not yet been fully sintered, and therefore not yet its final dimensions.

A "layer" means a discrete layer of the pre-sintered multi-layered dental mill blank that has one or more, and typical more than one, properties that are substantially homogenous within the dimensions of the layer. The one or more properties may be an optical property when being fully sintered (e.g., a CIE L*a*b* value or a contrast ratio determined as described herein) and/or an amount of one or more base components (e.g., zirconia and/or yttria). In this context, "substantially homogenous" is to be understood as having substantially the same values or properties within the layer irrespective of the position of measurement, subject to a tolerance due to inevitable manufacturing variability and/ measuring deviation as described herein.

"Contrast ratio" as used herein refers to the ratio of illuminance (Y) of a material when placed on a black background (Yb) to the illuminance of the same material when placed over a white background (Yw) (CR=Yb/Yw). The contrast ratio may be determined according to BS 5612. A suitable device for measuring the contrast ratio is, for example, the spectrophotometer CM 3700-D (Konica-Minolta). The contrast ratio can be used to characterize the translucency of a material, i.e. the light transmission of a material expressed as the ratio of transmitted to incident light intensity. A contrast ratio of close to 0% may indicate that a given material is almost fully transparent, while a contrast ratio of 100% may indicate that a material is fully opaque.

CIE (Commission Internationale de l'Eclairage, International Commission on Illumination) L*a*b* (CIELAB) values are used herein to characterize a color of a material by a three-dimensional color space. An individual color L* is a measure of luminance lightness and it is represented on the vertical axis of the color space. The a* and b* coordinates, are a measure of chromaticity and are represented on the horizontal coordinates of the color space, with positive a* representing red, negative a* representing green, positive b* representing yellow and negative b* representing blue. CIE L*a*b* values may be measured according to DIN 6174. A suitable device for measuring the contrast ratio is, for example, the spectrophotometer CM 3700-D (Konica-Minolta).

"Top layer" as used herein refers to an outermost layer of the multi-layered dental mill blank that can be used for preparing at least a part of the incisal or occlusal zone in a dental restoration that is obtainable from the mill blank by machining and sintering.

"Intermediate layer" means a layer that is positioned between the top layer and the bottom layer of the pre-sintered multi-layered dental mill blank. The at least one intermediate layer can be used to prepare at least part of a transition zone of a dental restoration, obtainable from the mill blank by machining and sintering.

"Bottom layer" means an outermost layer of the multi-layered dental mill blank that is located on an opposite side of the multi-layered dental mill blank with respect to the top layer. The bottom layer can be used to prepare at least part of a dentin zone of a dental restoration, obtainable from the mill blank by machining and sintering.

The terms "top layer", "intermediate layer" and "bottom layer" are not to be construed in that the multi-layered dental mill blank needs to be positioned in a specific manner or direction. Furthermore, any other part or layer additionally present on the outsides of a multi-layered dental mill blank (e.g., a support layer, a protective layer, a printing layer, or a sacrificial layer) and that is not intended to become part of a dental article machined from the multi-layered dental mill blank, is not to be understood as a top layer, intermediate layer or bottom layer of the pre-sintered multi-layered mill blank, or as being part of the dental mill blank.

A "speed sintering process" as used herein refers to a sintering process for preparing a fully sintered ceramic material from a ceramic material precursor that has a total duration of less than 45 minutes.

A "sintering process" as defined herein means a sequence of controlled temperature-adjusting steps (e.g., controlled heating, holding, or cooling steps) that are carried out in a sintering furnace. "Controlled" means that the heating or cooling rate is actively adjusted to a pre-defined value by a controlling device such as a furnace, as opposed to, e.g., a "cool down" which is uncontrolled and in which no active adjustment of the cooling rate takes place. Said sequence is typically programmed into a sintering furnace before starting the sintering process. A "cool down" as defined herein is not part of a sintering process as defined herein. A "cool down" means a cooling phase that starts after the final controlled temperature-adjusting step (e.g., a final controlled cooling step) has been completed. A cool down can at least partially take place in an opened sintering furnace. A cool down typically takes a few minutes (e.g., 2 to 8 minutes). A cool down is typically considered to be completed at a temperature in the range of 300 to 400° C. Of course, it is also possible to conduct a cool down to lower temperatures, like room temperature. The "total duration" of a sintering process as defined herein refers to the time that passes when proceeding through all controlled temperature-adjusting steps of a sintering process, i.e., including all controlled heating steps, holding steps, and cooling steps, but excluding a cool down. "Room temperature" as used herein refers to a temperature in the range of 15 to 50° C.

Unless explicitly stated otherwise, the "yttria content" or the "amount of yttria" (both expressions are used interchangeably herein) of an item, e.g., of powder, a composition, a layer, or a mill blank, refers to the total amount of yttria being present in said item, irrespective of how the yttria has been introduced into the item. When the yttria content is defined herein, it may comprise a type-I-yttria and a type-II-yttria. "Type-I-yttria" or a "type-I-yttria content" as defined herein refers to yttria or the yttria content that is present in an yttria-stabilized zirconia powder that is used to prepare at least a part of a powder layer of a green body, from which the pre-sintered multi-layered dental mill blank is obtainable by pre-sintering. Thus, when an yttria content of an yttria-stabilized zirconia powder is described herein, this yttria content is typically a type-I-yttria content. "Type-II-yttria" or a "type-II-yttria content" as defined herein refers to yttria that is obtainable by converting an yttrium salt into yttria when pre-sintering a green body of the multi-layered dental mill blank. For example, the surface of particles of a powder granulate may be treated with an yttrium salt. The surface-treated powder granulate may subsequently be used to prepare a powder layer of a green body, wherein the yttrium salt may be at least partially located on the boundaries between the different particles. When the green body is pre-sintered, the yttrium salt is converted into type-II-yttria. The type-II-yttria may segregate on the grain boundaries during and/or after pre-sintering.

"Yttria-stabilized zirconia" means a zirconia that is at least partially present in a tetragonal crystal phase or a cubic crystal phase and which has an amount of yttria incorporated into its crystal lattice that is sufficient to at least partially prevent a transition of the tetragonal crystal phase and cubic crystal phase, respectively, into the monoclinic crystal phase during cooling down to room temperature. At room temperature, pure zirconia is present in its most stable crystal phase, the monoclinic crystal phase. When the temperature of zirconia is increased to approx. 1170° C., the monoclinic crystal phase transforms into the tetragonal crystal phase, and subsequently the tetragonal phase transform into the cubic crystal phase at approx. 2370° C. The incorporation of an appropriate amount of yttria into the crystal lattice of the zirconia at least partially stabilizes the tetragonal or cubic crystal phase of the zirconia, i.e., at least partially prevents a transition of the tetragonal crystal phase and cubic crystal phase, respectively, into the (at room temperature) more stable monoclinic crystal phase of zirconia. Depending on the amount of yttria that is incorporated into the crystal lattice of the zirconia, the yttria-stabilized zirconia can be provided in the form of its tetragonal crystal phase, in the form of a mixture of its tetragonal crystal phase and its cubic crystal phase, or in form of its cubic crystal phase. For example, an yttria-stabilized zirconia comprising about 3 mol % of yttria can be provided in form of its tetragonal crystal phase without a substantial amount of cubic phase being present. An yttria-stabilized zirconia comprising about 4 mol % or 5 mol % of yttria can be provided in form of a mixture of the tetragonal crystal phase and the cubic crystal phase. An yttria-stabilized zirconia comprising about 8 mol % or more of yttria can be provided in form of its cubic crystal phase.

A "sintering activator" as used herein is a metal oxide that is added to a ceramic material (e.g., a yttria-stabilized zirconia) and that shifts a temperature that is necessary to achieve a specific densification in a (final) sintering process of the ceramic material to a lower temperature range. A sintering activator may be added to a ceramic material in form of a sintering activator precursor. A "sintering activator precursor" as used herein refers to a metal salt that can be converted into an oxide of the metal in a heating step, e.g., in a pre-sintering step, to provide a metal oxide which is the sintering activator.

A "sintering inhibitor" as used herein is a metal oxide that is added to a ceramic material (e.g., a yttria-stabilized zirconia) and that shifts a temperature that is necessary to achieve a specific densification in a (final) sintering process of the ceramic material to a higher temperature range. A sintering inhibitor may be added to a ceramic material in form of a sintering inhibitor precursor. A "sintering inhibitor precursor" as used herein refers to a metal salt that can be converted into an oxide of the metal in a heating step, e.g., in a pre-sintering step, to provide a metal oxide which is the sintering inhibitor.

A "pre-shaded" multi-layered dental mill blank means a multi-layered dental mill blank that comprises coloring metal oxides in an amount and/or combination that is effective to impart a color (e.g., a color matching a natural color of tooth and/or matching a tooth color by VITA classical A1-D4@ shade guide with VITA Bleached Shades manufactured by Vita Zahnfabrik or a similar dental shade guide system) to a dental restoration (or at least a part thereof) that is machined from the mill blank and then fully sintered.

Where the term "comprising" is used herein, it does not exclude that further non-specified elements are present. Where the term "essentially consisting of" is used herein, it is does not exclude that further non-specified elements are present that are not materially affecting the essential characteristics of the defined subject-matter. Where the term "consisting of" is used herein, it excludes that further non-specified elements are present with the exception that, when e.g. a composition is defined, it does not exclude that unavoidable components are present, like unavoidable trace impurities in a sum of <0.1 wt. % (e.g., $SiO_2$, $CaO$, $TiO_2$, or $Na_2O$). For the purposes of the present invention, the terms "essentially consisting of" and "consisting of" are considered to be specific embodiments of the term "comprising of". Whenever the terms "including" or "having" are used, these terms are meant to be equivalent to "comprising" as defined above.

The term "obtained" does not necessarily mean to indicate that, e.g., an embodiment must be obtained by, e.g., a sequence of steps following the term "obtained" even though such a limited understanding is always included by the terms "obtained" as a preferred embodiment.

Where a layer is described herein as comprising or having a weight content of a component, the weight content of the component is based on the total weight of that respective layer (unless explicitly stated otherwise). Furthermore, where the pre-sintered multi-layered dental mill blank is described herein as comprising or having a weight content of a component, the weight content of the component is based on the total weight of the pre-sintered multi-layered dental mill blank (unless explicitly stated otherwise). Furthermore, where the pre-sintered multi-layered dental mill blank or one of its layers is described herein as comprising a metal or metal cation in a specific weight amount, and the metal or metal cation is not defined as a metal oxide, it is to be understood that the weight amount of the metal or metal cation is calculated on the basis of the (most abundant) oxide of that metal or metal cation.

Numbers defined herein are rounded to their last digit and are meant to encompass the range of rounding values according to established rounding rules. For example, the value 3 is meant to encompass the values in the range of 2.5 to 3.4, the value 1.5 is meant to encompass the values in the range of 1.46 to 1.54, and so on.

BRIEF DESCRIPTION OF FIGURES

FIG. 12 shows the sintering kinetic adjustment after doping the materials with the sintering activator and the sintering inhibitor, e.g., by the shift of the sintering curve to lower temperatures.

DETAILED DESCRIPTION OF THE INVENTION

I. Pre-Sintered Multi-Layered Dental Mill Blank

Figure 1:
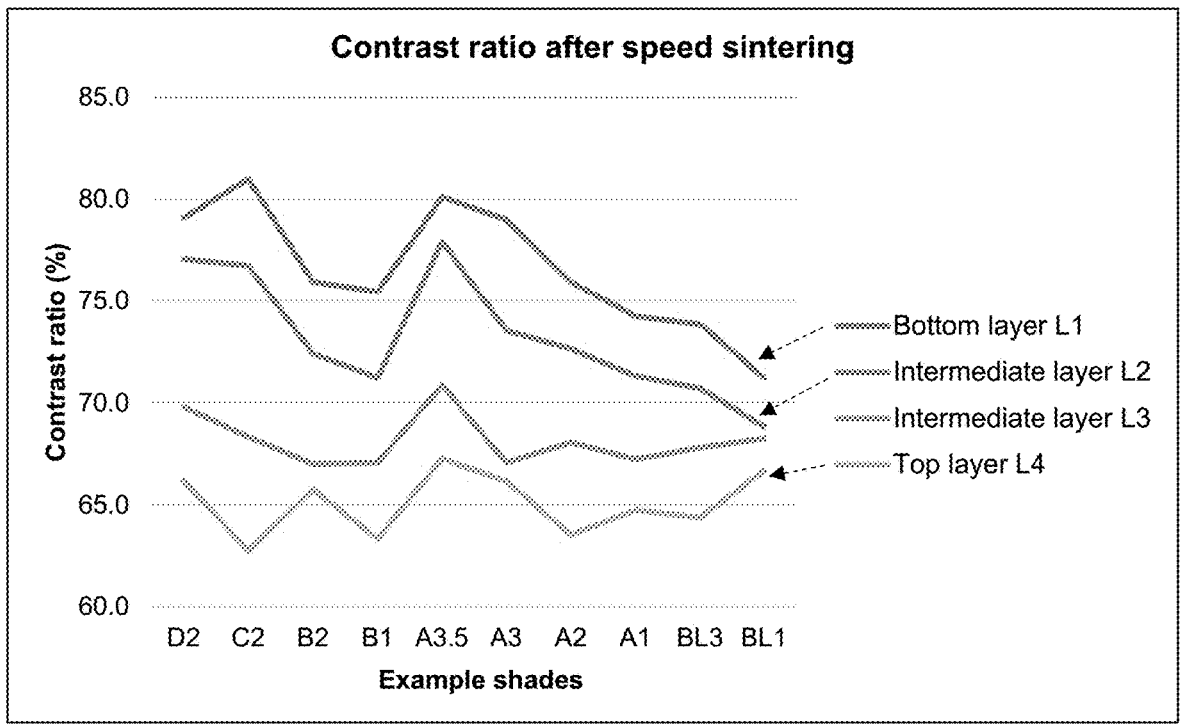
FIG. 1 shows a graphic representation of contrast ratio values for layers L1 to L4 provided in tables 8A and 8B of the example section.

One aspect of the present invention provides a pre-sintered multi-layered dental mill blank comprising a top layer, a bottom layer, and at least one intermediate layer. The pre-sintered multi-layered dental mill blank may be further defined by the properties of representative test sections being sintered by a speed sintering process, by its composition, by its form, structure, and/or layering.

1. Properties of Representative Test Sections when Fully Sintered by a Speed Sintering Process The pre-sintered multi-layered dental mill blank according to the present invention may be characterized by providing a representative test section for each layer. The representative test sections, when being fully sintered by a speed sintering process, may have specific characteristics, like contrast ratio, CIE L*a*b* values, porosity, and/or mechanical properties.

1.1 the Representative Test Sections

The pre-sintered multi-layered dental mill blank according to the present invention may be characterized by providing a representative test section for each layer. The representative test sections may be fully sintered by a speed sintering process to provide fully sintered representative test sections having one or more specific characteristics. The fully sintered representative test sections may be obtained by preparing representative test sections for each layer from the pre-sintered multi-layered dental mill blank by a subtractive process (e.g., cutting, milling, sawing), and then fully sintering the representative test sections by a speed sintering process to provide the fully sintered representative test sections.

There are different options for preparing the representative test sections for each layer. A representative test section may be cut (e.g., using a precision saw) from each one of the layers of the pre-sintered multi-layered dental mill blank. For instance, the representative test section may be cut out substantially parallel to an adjacent layer and in a way to have a substantially planar form. Such separately cut representative test sections for each layer may be used when determining the contrast ratio and/or the CIE L*a*b* values as described herein. Hence, in certain embodiments of the present invention, the pre-sintered multi-layered dental mill blank is characterized by providing a representative test section for each layer, each one of the representative test sections being prepared (e.g., cut) from a respective one of the layers of the pre-sintered multi-layered dental mill blank. In certain embodiments of the present invention, the pre-sintered multi-layered dental mill blank is characterized by providing a representative test section for each layer, each one of the representative test sections being cut from a respective one of the layers of the pre-sintered multi-layered dental mill blank, and each one of the representative test sections having a substantially planar form and being cut substantially parallel to an adjacent layer.

As an alternative to separately cutting out test sections for each layer, it is possible to obtain a representative test section for each layer by preparing (e.g., cutting) a cross section from the pre-sintered multi-layered dental mill blank that contains all layers. Representative test sections for each layer in form of a cross section may be used to determine the number of pores per grain as described herein. Hence, in certain embodiments of the present invention, the pre-sintered multi-layered dental mill blank is characterized by providing a representative test section for each layer, the representative test sections being prepared (e.g., cut) in form of a cross section of the pre-sintered multi-layered dental mill blank having all layers. In certain embodiments of the present invention, the pre-sintered multi-layered dental mill blank is characterized by providing a representative test section for each layer, the representative test sections being prepared (e.g., cut) in form of a cross section of the pre-sintered multi-layered dental mill blank having all layers, and the cross section having a substantially planar form and being cut substantially perpendicular to an outer surface of the top layer.

The representative section may be prepared from a part of the pre-sintered dental mill blank that has at least 1 mm distance to an outer surface of the pre-sintered dental mill blank. Thereby, potential inevitable surface defects or inevitable defects close to the surface of the mill blank may not be part of the representative test section. The representative test sections may be processed, e.g., ground and/or polished, before being subjected to the fully sintering by the speed sintering process. The fully sintered representative test sections may be processed, e.g., ground and/or polished, to a specific thickness before being subjected to a measuring method.

When a specific thickness (e.g. a thickness of 0.8 mm) is defined herein for measuring a characteristic (e.g., a contrast ratio or CIE L*a*b* values) of the fully sintered representative test sections, this is not to be understood in that each one of layers of the pre-sintered dental mill blank necessarily has to have a minimum thickness of that specific thickness (although this is possible). In the event that a layer of the pre-sintered multi-layered dental mill blank does not have a sufficient thickness for preparing a fully sintered representative test section having a specific thickness (e.g., a thickness of 0.8 mm), a fully sintered representative test section for that layer may be prepared from a comparable pre-sintered multi-layered dental mill blank comprising a layer of the same composition but with a sufficient thickness. Likewise, when a specific measuring method, like a standardized measuring method (e.g., an ISO norm or ASTM norm, or the like), is to be followed for measuring a characteristic (e.g., flexural strength or fracture toughness) of a fully sintered representative test section, this is not to be understood in that the respective layer of the pre-sintered dental mill blank necessarily has to have the dimensions of a specimen required for carrying out that specific measuring method (although this is possible). In the event that a layer of the pre-sintered multi-layered dental mill blank does not have sufficient dimensions of a specimen for carrying out a specific measuring method, a fully sintered representative test section for that layer may be prepared from a comparable pre-sintered multi-layered dental mill blank comprising a layer of the same composition but with sufficient dimensions.

1.2 Speed Sintering Process

The speed sintering process as defined herein may be a sintering process having a total duration of less than 25 minutes or less than 20 minutes, like in the range of 12 to 25 minutes or 12 to 20 minutes (e.g., 14, 15, or 16 minutes), and having a maximum sintering temperature in the range of at least 1350° C., at least 1400° C., at most 1650° C., or at most 1600° C. or at most 1500° C., like in the range of 1350 to 1650° C. or 1400 to 1600° ° C. (e.g., 1450° ° C. or 1560° C.) or 1400 to 1500° C. In one embodiment, the speed sintering process is a sintering process having a total duration of less than 20 minutes and having a maximum sintering temperature in the range of or 1400 to 1500° C. For example, the speed sintering process may be a sintering process having a total duration in the range of 12 to 20 minutes and a maximum sintering temperature of 1450° C. A suitable sinter furnace to carry out such a sintering process is the Programat CS6 sintering furnace, which is commercially available from Ivoclar Vivadent AG.

The speed sintering process as defined herein may be a sintering process consisting of the following steps:
 a first heating step starting at 25° C. and ending at 1050° C. with a heating rate of 200 K/min,
 a second heating step starting at 1050° C. and ending at 1450° C. with a heating rate of 100 K/min,
 a holding step maintaining the temperature at 1450° C. for 2 min,
 a first cooling step starting at 1450° C. and ending at 1350° C. with a cooling rate of 130 K/min,
 a second cooling step starting at 1350° C. and ending at 1200° ° C. with a cooling rate of 70 K/min, followed by a cool down, and
 wherein said first and second heating steps are carried out at a pressure in the range of 50 to 100 mbar (e.g., 80 mbar) by applying a vacuum until a temperature of 1400° C. is reached, and once the temperature of 1400° C. is reached the vacuum is exchanged with air.

The speed sintering process as defined herein may be a sintering process as described in table 5. The cool down which is not considered to be part of the sintering process may be completed (e.g., when arriving at a temperature of 400° C.) in less than 10 minutes, like less than 5 minutes, or like less than 3 minutes.

1.3 Contrast Ratio

One embodiment of the present invention provides a pre-sintered multi-layered dental mill blank comprising
 a top layer,
 a bottom layer, and
 at least one intermediate layer,
 the pre-sintered multi-layered dental mill blank being characterized by providing a representative test section for each layer, the representative test sections, when being fully sintered by a speed sintering process, having a contrast ratio that increases layer-by-layer from the top layer to the bottom layer.

When the contrast ratio increases layer-by-layer as described herein, the pre-sintered multi-layered dental mill blank is suitable for preparing, by a speed sintering process, a dental restoration having a natural and highly aesthetical appearance. For example, the mill blank can be used for preparing, by a speed sintering step, a dental restoration having a translucency that increases from its bottom (e.g., part of a dentin zone of the restoration) over a transitional part to its top (e.g., part of an incisal zone of the restoration).

The representative test sections are fully sintered by a speed sintering process to obtain fully sintered representative test sections, each one having a specific contrast ratio. The contrast ratio increases layer-by-layer from the fully sintered representative test section of the top layer to the fully sintered representative test section of the bottom layer. For example, when the pre-sintered multilayered dental mill blank is composed of a top layer L4, an intermediate layer L3, an intermediate layer L2, and a bottom layer L1, the contrast ratio increases layer-by-layer from the fully sintered representative test section of the top layer L4, to the fully sintered representative test section of intermediate layer L3, to the fully sintered representative test section of intermediate layer L2, to the fully sintered representative test section of the bottom layer L1.

Unless explicitly stated otherwise, the contrast ratio as defined herein refers to the contrast ratio of a representative test section that has been fully sintered by a speed sintering process. The contrast ratio may be subject to a tolerance due to inevitable manufacturing variability and/or measuring deviation of about +1.0% or less.

The contrast ratio of a fully sintered representative test section is typically dependent on the thickness of the fully sintered representative test section with an increasing thickness leading to an increased contrast ratio. The contrast ratios of the fully sintered representative test sections are therefore to be determined on test sections having the same or substantially the same thickness.

Unless explicitly stated otherwise, the contrast ratio as defined herein preferably refers to a contrast ratio determined for a fully sintered representative test section having a thickness of 0.8 mm, and particularly a thickness of 0.80±0.02 mm. The contrast ratio may be determined according to BS 5612. A suitable device for measuring the contrast ratio is, for example, the spectrophotometer CM 3700-D (Konica-Minolta).

The contrast ratio [%] of each layer may be at least 56%, at least 61%, at least 62%, or at least 64%. The contrast ratio [%] of each layer may be at most 88%, at most 83%, at most 82%, or at most 79%. The contrast ratio [%] of each layer may be in the range of 56 to 88%, 61 to 83%, 62 to 82%, or 64 to 79%. In one embodiment, the contrast ratio [%] of each layer is in the range of 61 to 83%.

The contrast ratios of the layers may differ by a specific value of percent points. The contrast ratio [%] of the bottom layer may differ from the contrast ratio [%] of the top layer by at least 2 percent points, at least 3 percent points, at least 5 percent points, at least 8 percent points or at least 10 percent points. The contrast ratio [%] of the bottom layer may differ from the contrast ratio [%] of the top layer by at most 24 percent points, at most 22 percent points, at most 19 percent points, at most 18 percent points, or at most 16 percent points. The contrast ratio [%] of the bottom layer may differ from the contrast ratio [%] of the top layer by in the range of 2 to 24 percent points, 3 to 22 percent points, 5 to 19 percent points, 8 to 18 or 10 percent points to 16 percent points. In one embodiment, the contrast ratio [%] of the bottom layer differs from the contrast ratio [%] of the top layer by at least 5 percent points, like in the range of 5 to 19, percent points.

The contrast ratio of the top layer and the contrast ratio of the bottom layer may fulfill the following formula (I), (II), (III) or (IV):

$$CR(TL)/CR(BL) \geq 75.0\%, \quad (I)$$

$$CR(TL)/CR(BL) \geq 77.0\%, \quad (II)$$

$$CR(TL)/CR(BL) \geq 82.0\%, \quad (III)$$

$$CR(TL)/CR(BL) \geq 85.0\%, \quad (IV)$$

with CR(TL) being the contrast ratio [%] of the top layer, and CR(BL) being the contrast ratio [%] of the bottom layer.

The contrast ratio of the bottom layer may be at least 66%, at least 70%, at least 71%, or at least 74%. The contrast ratio of the bottom layer may be at most 88%, at most 83%, at most 81%, or at most 80%. The contrast ratio of the bottom layer may be in the range of 66% to 88%, 70 to 83%, 71 to 81%, or 74 to 80%. In one embodiment, the contrast ratio of the bottom layer is in the range of 70 to 83%.

The contrast ratio of the top layer may be at least 56%, at least 61%, at least 62% or at least 64%. The contrast ratio of the top layer may be at most 72%, at most 68%, at most 67% or at most 66%. The contrast ratio of the top layer may be in the range of 56% to 72%, 61 to 68%, 62 to 67% or 64 to 66%. In one embodiment, the contrast ratio of the top layer is in the range of 61 to 68%.

The contrast ratio of the at least one intermediate layer may be at least 62% at least 66%, at least 67% or at least 68%. The contrast ratio of the at least one intermediate layer may be at most 83%, at most 79%, at most 78% or at most 76%. The contrast ratio of the at least one intermediate layer may be in the range of 62 to 83%, 66 to 79%, 67 to 78% or in the range of 68 to 76%.

The contrast ratio [%] of each pair of two adjacent layers may differ by at least 0.3 percent point, at least 0.5 percent point, at least 1.0 percent point, at least 1.5 percent points, at least 2.0 percent points, at least 2.5 percent points, at least 3.0 percent points, or at least 3.5 percent points. The contrast ratio [%] of each pair of two adjacent layers may differ by for example, at most 7.0 percent points or at most 6.0 percent points. The contrast ratio [%] of each pair of two adjacent layers may differ in the range of 0.3 to 7.0 percent points, 0.5 to 7.0 percent points, 1.0 to 7.0 percent points, 1.5 to 7.0 percent points, 2.0 to 6.0 percent points, 2.5 to 6.0 percent points, or 3.0 to 6.0 percent points. In one embodiment, the contrast ratio [%] of each pair of two adjacent layers differs by at least 2.0 percent points, like in the range of 2.0 to 6.0, percent points.

The contrast ratio of an intermediate layer, which is adjacent to the top layer, may be at least 62%, at least 66%, or at least 67%. The contrast ratio of an intermediate layer, which is adjacent to the top layer, may be at most 74%, at most 72%, at most 71%, or at most 70%. The contrast ratio of an intermediate layer, which is adjacent to the top layer, may be in the range of 63 to 74%, 66 to 72%, 67 to 71%, or 67 to 70%. The contrast ratio [%] of an intermediate layer, which is adjacent to the top layer, may differ from the contrast ratio of the top layer by in the range of 0.2 to 9.0 percent points, 0.5 to 7.0 percent points, 1.0 to 6.0 percent points, or 1.5 to 5.0 percent points.

The contrast ratio of an intermediate layer, which is adjacent to the bottom layer, may be at least 64%, at least 68%, at least 69%, or at least 70%. The contrast ratio of an intermediate layer, which is adjacent to the bottom layer, may be at most 82%, at most 79%, at most 78%, or at most 77%. The contrast ratio of an intermediate layer, which is adjacent to the bottom layer, may be in the range of 64 to 82%, 68 to 79%, 69 to 78% or 70 to 77%. The contrast ratio [%] of an intermediate layer, which is adjacent to the bottom layer, may differ from the contrast ratio of the bottom layer by in the range of 0.5 to 12.0 percent points, 1.5 to 7.0 percent points, 2.0 to 5.5 percent points, or 3.0 to 4.5 percent points.

The pre-sintered multi-layered dental mill blank may comprise at least two intermediate layers, and the contrast ratio [%] of one intermediate layer may differ from the contrast ratio of another intermediate layer by at least 0.2 percent point, at least 0.5 percent point, at least 3.0 percent points, or at least 4.0 percent points, and/or at most 12 percent points, at most 10.0 percent points, at most 9.0 percent points, or at most 8.0 percent points. The pre-sintered multi-layered dental mill blank may comprise at least two intermediate layers, and the contrast ratio [%] of one intermediate layer may differ from the contrast ratio of another intermediate layer by in the range of 0.2 to 12 percent points, 0.5 to 10.0 percent points, 3.0 to 9.0 percent points, or 4.0 to 8.0 percent points.

The pre-sintered multi-layered dental mill blank may comprise the following layers: a top layer L4, an intermediate layer L3, an intermediate layer L2, a bottom layer L1, and the contrast ratio of the layers satisfying one or more of the contrast ratio profiles A1.1 to J1.1 as defined herein in Table A1. Such a set of contrast ratio profiles A1.1 to J1.1 (or A1.2 to J1.2) is advantageous in that it provides a suitable choice of aesthetical appearance that will match an appearance, e.g. in terms of translucency, of natural teeth for most patients. The set of contrast ratio profiles C1.1 to H1.1 (or C1.2 to H1.2), e.g., F1.1 or G1.1 (or F1.2 or G1.2), may be seen as particularly advantageous in that it provides a suitable choice of aesthetical appearance that will match an appearance, e.g. in terms of translucency, of natural teeth for a large subgroup of all patients.

TABLE A1

| Profile | | L1 | L2 | L3 | L4 |
|---|---|---|---|---|---|
| A1.1 | Contrast ratio | 77-81 | 75-79 | 68-72 | 64-68 |
| B1.1 | [%] in | 79-83 | 75-79 | 66-70 | 61-65 |
| C1.1 | the range of | 74-78 | 70-74 | 65-69 | 64-68 |
| D1.1 | | | 74-78 | 69-73 | 66-70 | 61-65 |
| E1.1 | | | 78-82 | 76-80 | 69-73 | 66-70 |
| F1.1 | | 77-81 | 72-76 | 65-69 | 64-68 |
| G1.1 | | 74-78 | 71-75 | 66-70 | 62-66 |
| H1.1 | | 72-76 | 69-73 | 65-69 | 63-67 |
| I1.1 | | 72-76 | 69-73 | 66-70 | 62-66 |
| J1.1 | | 69-73 | 67-71 | 66-70 | 65-69 |

The pre-sintered multi-layered dental mill blank may comprise the following layers: a top layer L4, an intermediate layer L3, an intermediate layer L2, a bottom layer L1, and the contrast ratio of the layers satisfying one or more of the contrast ratio profiles A1.2 to J1.2 as defined herein in Table A2.

TABLE A2

| Profile | | L1 | L2 | L3 | L4 |
|---|---|---|---|---|---|
| A1.2 | Contrast ratio | 78-80 | 76-78 | 69-71 | 65-67 |
| B1.2 | [%] in | 70-82 | 76-78 | 67-69 | 62-64 |
| C1.2 | the range of | 75-77 | 71-73 | 66-68 | 65-67 |
| D1.2 | | 75-77 | 70-72 | 67-69 | 62-64 |
| E1.2 | | 79-81 | 77-79 | 70-72 | 67-69 |
| F1.2 | | 78-80 | 73-75 | 66-68 | 65-67 |
| G1.2 | | 75-77 | 72-74 | 67-69 | 63-65 |
| H1.2 | | 73-75 | 70-72 | 66-68 | 64-66 |
| I1.2 | | 73-75 | 70-72 | 67-69 | 63-65 |
| J1.2 | | 70-72 | 68-70 | 67-69 | 66-68 |

In one embodiment, the pre-sintered multi-layered dental mill blank is composed of the following layers: a top layer L4, an intermediate layer L3, an intermediate layer L2, a bottom layer L1, and the contrast ratio of the layers satisfying one or more of the contrast ratio profiles A.1.1 to J1.1 as defined herein in Table A1 or A1.2 to J1.2 as defined herein in Table A2. In one embodiment, the pre-sintered multi-layered dental mill blank is composed of the following layers: a top layer L4, an intermediate layer L3, an intermediate layer L2, a bottom layer L1, and the contrast ratio of the layers satisfying one or more of the contrast ratio profiles C1.1 to H1.1 as defined herein in Table A1 (e.g., profile F1.1 or G1.1) or C1.2 to H1.2 as defined herein in Table A2 (e.g., F1.2 or G1.2).

Additionally or alternatively to the contrast ratio as described herein, the representative test sections, when being fully sintered by a speed sintering process, may have further characteristics as described herein, such as CIE L*a*b values, number of pores per grain, or mechanical properties.

1.4 CIE L*a*b* Values

One embodiment of the present invention provides a pre-sintered multi-layered dental mill blank comprising
a top layer,
a bottom layer, and
at least one intermediate layer,
the pre-sintered multi-layered dental mill blank being characterized by providing a representative test section for each layer, the representative test sections, when being fully sintered by a speed sintering process, having a CIE lightness L* that increases layer-by-layer from the bottom layer to the top layer.

When the CIE lightness L' increases layer-by-layer as described herein, the pre-sintered multi-layered dental mill blank is suitable for preparing, by a speed sintering process, a dental restoration having desirable optical properties, like natural and aesthetical look. For example, the mill blank may be suitable for preparing, by a speed sintering step, a dental restoration having a more uniform color transition from its bottom (e.g., part of a dentin zone of the restoration) over a transitional part to its top (e.g., part of an incisal zone of the restoration).

The representative test sections are fully sintered by a speed sintering process to obtain fully sintered representative test section, each one having CIE L*a*b* values. The CIE lightness L* increases layer-by-layer from the fully sintered representative test section of the bottom layer to the fully sintered representative test section of the top layer. For example, when the pre-sintered multilayered dental mill blank is composed of a top layer L4, an intermediate layer L3, an intermediate layer L2, and a bottom layer L1, the CIE lightness L' increases layer-by-layer from the fully sintered representative test section of the bottom layer L1, to the fully sintered representative test section of intermediate layer L2, to the fully sintered representative test section of intermediate layer L3, to the fully sintered representative test section of the top layer L4.

Unless explicitly stated otherwise, the CIE L*a*b* values as defined herein refer to the CIE L*a*b* values of a representative test section that has been fully sintered by a speed sintering process. The CIE lightness L' (and optionally the CIE a* and b* values) may be subject to a tolerance due to inevitable manufacturing variability and/or measuring deviation of about +0.5.

The CIE L*a*b* values of a fully sintered representative test section are typically dependent on its thickness. The CIE L*a*b* values of the fully sintered representative test sections are therefore to be determined on test sections having the same or substantially the same thickness. Unless explicitly stated otherwise, the CIE L*a*b* values as defined herein preferably refer to CIE L*a*b* values determined for a fully sintered representative test section having a thickness of 0.8 mm, and particularly at a thickness of 0.80±0.02 mm. The CIE L*a*b* values may be measured according to DIN 6174. The measurements may be made using a spectrophotometer CM 3700-D (Konica-Minolta). The measurements may be made against a background of, for example, L*=93.1; a*=(−0.64); b*=4.22.

The CIE lightness L' of each layer may be at least 72, at least 76, at least 78 or at least 79. The CIE lightness L' of each layer may be at most 98, at most 94, at most 92 or at most 91. The CIE lightness L' of each layer may be in the range of 72 to 98, 76 to 94, 78 to 92 or 79 to 91. In one embodiment, the CIE lightness L' of each layer is in the range of 78 to 92.

The CIE lightness L' of each pair of two adjacent layers may differ by at least 0.05, at least 0.4, at least 0.6, or at least 0.8. The CIE lightness L' of each pair of two adjacent layers may differ by at most 3.0, at most 2.5 or at most 2.0. The CIE lightness L' of each pair of two adjacent layers may differ by a value in the range of 0.05 to 3.0, 0.4 to 3.0, 0.6 to 2.5, or 0.8 to 2.0. In one embodiment, the CIE lightness L' of each pair of two adjacent layers may differ by at least 0.6, like in the range of 0.6 to 2.5 or 0.6 to 2.0.

The CIE lightness L* of the bottom layer may be at least 72, at least 76, at least 78, at least 80, at least 82, or at least 84. The CIE lightness L' of the bottom layer may be at most 94, at most 92, at most 90, at most 88, at most 86, or at most 84. The CIE lightness L' of the bottom layer may be in the range of 72 to 94, 76 to 92, 78 to 90, 80 to 88 or 80 to 86. In one embodiment, the CIE lightness L* of the bottom layer is in the range of 76 to 92.

The CIE lightness L' of the top layer may be at least 80, at least 84, at least 86, at least 88, or at least 90. The CIE lightness L' of the top layer may be at most 98, at most 96, at most 94, at most 92, or at most 90. The CIE lightness L' of the top layer may be in the range of 80 to 98, 84 to 94, 86 to 92, or 86 to 90. In one embodiment, the CIE lightness L' of the top layer is in the range of 84 to 94. The CIE lightness L* of the top layer may be higher than the CIE lightness L* of the bottom layer by at least 0.5, at least 1.0, at least 2.0, at least 3.0, or at least 4.0. The CIE lightness L* of the top layer may be higher than the CIE lightness L* of the bottom layer by at most 12, at most 10, at most 9.0, at most 8.0, or at most 7.0. The CIE lightness L' of the top layer may be higher than the CIE lightness of the bottom layer by a value in the range of 0.5 to 12, 1.0 to 10, 2.0 to 9.0, 2.0 to 8.0 or 2.0 to 7.0. In one embodiment, the CIE lightness L* of the top layer is higher than the CIE lightness of the bottom layer by a value in the range of 2.0 to 9.0.

The CIE a* value of each layer may be at least −3.5, at least −2.2, at least −1.8, or at least 1.0. The CIE a* value of each layer may be at most 7.5, at most 6.5, at most 5.6 or at most 5.0. The CIE a* value of each layer may be in the range of −3.5 to 7.5, −2.2 to 6.6, −1.8 to 5.6 or −1.0 to 5.0. In one embodiment, the CIE a value of each layer is in the range of −2.2 to 6.5.

In one embodiment, the representative test sections, when being fully sintered by a speed sintering process, have a CIE a* value that increases layer-by-layer from the top layer to the bottom layer.

The CIE b* value of each layer may be at least 1, at least 3, at least 4, or at least 11. The CIE b* value of each layer being at most 30, at most 26, at most 24 or at most 22. The CIE b* value of each layer may be in the range of 1 to 30, 3 to 26, 4 to 24, or 11 to 22. In one embodiment, the CIE b* value of each layer may be in the range of 3 to 26.

The pre-sintered multi-layered dental mill blank may comprise the following layers:
a top layer L4,
an intermediate layer L3,
an intermediate layer L2,
a bottom layer L1, and
the representative test sections, when being fully sintered by a speed sintering process, having a CIE lightness L*, the CIE lightness L* of the layers satisfying one or more of the CIE lightness L* profiles A2.1 to J2.1 as defined herein in Table B1.

Such a set of CIE lightness L* profiles A2.1 to J2.1 (or A2.2 to J2.2), optionally in combination with other sets of profiles as described herein, is advantageous in that it provides a suitable choice of aesthetical appearance that will match an appearance, e.g. in terms of lightness, of natural teeth for most patients. The set of CIE lightness L* profiles C2.1 to H2.1 (or C2.2 to H2.2), e.g., F1.1 or G1.1 (or F1.2 or G1.2), may be seen as particularly advantageous in that it provides a suitable choice of aesthetical appearance that will match an appearance, e.g. in terms of lightness, of natural teeth for a large subgroup of all patients.

TABLE B1

| Profile | | L1 | L2 | L3 | L4 |
|---|---|---|---|---|---|
| A2.1 | CIE | 79-83 | 80-84 | 84-88 | 85-89 |
| B2.1 | lightness | 77-81 | 79-83 | 84-88 | 85-89 |

TABLE B1-continued

| Profile | | L1 | L2 | L3 | L4 |
|---|---|---|---|---|---|
| C2.1 | L*in the | 84-88 | 85-89 | 87-91 | 87-91 |
| D2.1 | range of | 84-88 | 86-90 | 88-92 | 89-93 |
| E2.1 | | 77-81 | 79-83 | 83-87 | 84-88 |
| F2.1 | | 79-83 | 82-86 | 84-88 | 85-89 |
| G2.1 | | 82-86 | 83-87 | 86-90 | 87-91 |
| H2.1 | | 85-89 | 86-90 | 88-92 | 88-92 |
| I2.1 | | 86-90 | 87-91 | 88-92 | 89-93 |
| J2.1 | | 90-94 | 90-94 | 90-94 | 90-94 |

The pre-sintered multi-layered dental mill blank may comprise the following layers:
a top layer L4,
an intermediate layer L3,
an intermediate layer L2,
a bottom layer L1, and
the representative test sections, when being fully sintered by a speed sintering process, having a CIE lightness L*, the CIE lightness L' of the layers satisfying one or more the CIE lightness L* profiles A2.2 to J2.2 as defined herein in Table B2.

TABLE B2

| Profile | | L1 | L2 | L3 | L4 |
|---|---|---|---|---|---|
| A2.2 | CIE | 80-82 | 81-83 | 85-87 | 86-88 |
| B2.2 | lightness | 78-80 | 80-82 | 85-87 | 86-88 |
| C2.2 | L*in the | 85-87 | 86-88 | 88-90 | 88-90 |
| D2.2 | range of | 85-87 | 87-89 | 89-91 | 90-92 |
| E2.2 | | 78-80 | 80-82 | 84-86 | 85-87 |
| F2.2 | | 80-82 | 83-85 | 85-87 | 86-88 |
| G2.2 | | 83-85 | 84-86 | 87-89 | 88-90 |
| H2.2 | | 86-88 | 87-89 | 89-91 | 89-91 |
| I2.2 | | 87-89 | 88-90 | 89-91 | 90-92 |
| J2.2 | | 91-93 | 91-93 | 91-93 | 91-93 |

In one embodiment, the pre-sintered multi-layered dental mill blank is composed of the following layers: a top layer L4, an intermediate layer L3, an intermediate layer L2, a bottom layer L1, and the CIE lightness L' of the layers satisfy one or more of the CIE lightness L* profiles A.2.1 to J2.1 as defined herein in Table B1 or A2.2 to J2.2 as defined herein in Table B2. In one embodiment, the pre-sintered multi-layered dental mill blank is composed of the following layers: a top layer L4, an intermediate layer L3, an intermediate layer L2, a bottom layer L1, and CIE lightness L' of the layers satisfying one or more of the CIE lightness L* profiles C2.1 to H2.1 as defined herein in Table B1 (e.g., profile F2.1 or G2.1) or C2.2 to H2.2 as defined herein in Table B2 (e.g., F2.2 or G2.2).

The pre-sintered multi-layered dental mill blank may comprise the following layers:
a top layer L4,
an intermediate layer L3,
an intermediate layer L2,
a bottom layer L1, and
the representative test sections, when being fully sintered by a speed sintering process, having a CIE a* value, the CIE a* values of the layers satisfying one or more of the CIE a*value profiles A3.1 to J3.1 as defined herein in Table C1.

TABLE C1

| Profile | | L1 | L2 | L3 | L4 |
|---|---|---|---|---|---|
| A3.1 | CIE | 0.6-2.6 | 0.1-2.1 | (−0.9)-1.1 | (−1.0)-1.0 |
| B3.1 | value | 1.4-3.4 | 0.3-2.3 | (−1.3)-0.8 | (−1.7)-0.2 |
| C3.1 | a* in the | 0.1-2.1 | (−0.5)-1.5 | (−0.9)-1.1 | (−1.3)-0.7 |
| D3.1 | range of | (−0.5)-1.5 | (−1.4)-0.6 | (−2.3)-(−0.3) | (−2.7)-(−0.7) |
| E3.1 | | 4.5-6.5 | 3.8-5.8 | 2.1-4.1 | 0.9-2.9 |
| F3.1 | | 3.8-5.8 | 2.5-4.5 | 1.0-3.0 | 0.6-2.6 |
| G3.1 | | 2.3-4.3 | 1.5-3.5 | 0.7-2.7 | (−0.2)-1.8 |
| H3.1 | | 0.5-2.5 | (−0.2)-1.8 | (−0.6)-1.4 | (−1.0)-1.0 |
| I3.1 | | (−0.5)-1.5 | (−0.5)-1.5 | (−0.4)-1.6 | (−0.5)-1.5 |
| J3.1 | | 0.6-2.6 | 0.1-2.1 | (−0.1)-1.9 | (−0.3)-1.7 |

The pre-sintered multi-layered dental mill blank may comprise the following layers:
a top layer L4,
an intermediate layer L3,
an intermediate layer L2,
a bottom layer L1, and
the representative test sections, when being fully sintered by a speed sintering process, having a CIE a* value, the CIE a* values of the layers satisfying one or more of the CIE a* value profiles A3.2 to J3.2 as defined herein in table C2.

TABLE C2

| Profile | | L1 | L2 | L3 | L4 |
|---|---|---|---|---|---|
| A3.2 | CIE | 1.1-2.1 | 0.6-1.6 | (−0.4)-0.6 | (−0.5)-0.5 |
| B3.2 | value | 1.9-2.9 | 0.8-1.8 | (−0.8)-0.3 | (−1.2)-(−0.3) |
| C3.2 | a* in the | 0.6-1.6 | 0.0-1.0 | (−0.4)-0.6 | (−0.8)-0.2 |
| D3.2 | range of | 0.0-1.0 | (−0.9)-0.1 | (−1.8)-(−0.8) | (−2.2)-(−1.2) |
| E3.2 | | 5.0-6.0 | 4.3-5.3 | 2.6-3.6 | 1.4-2.4 |
| F3.2 | | 4.3-5.3 | 3.0-4.0 | 1.5-2.5 | 1.1-2.1 |
| G3.2 | | 2.8-3.8 | 2.0-3.0 | 1.2-2.2 | 0.3-1.3 |
| H3.2 | | 1.0-2.0 | 0.3-1.3 | (−0.1)-0.9 | (−0.5)-0.5 |
| I3.2 | | 0.0-1.0 | 0.0-1.0 | 0.1-1.1 | 0.0-1.0 |
| J3.2 | | 1.1-2.1 | 0.6-1.6 | 0.4-1.4 | 0.2-1.2 |

In one embodiment, the pre-sintered multi-layered dental mill blank is composed of the following layers: a top layer L4, an intermediate layer L3, an intermediate layer L2, a bottom layer L1, and the CIE a* values of the layers satisfy one or more of the CIE a* value profiles A3.1 to J3.1 as defined herein in table C1 or A3.2 to J3.2 as defined herein in table C2.

The pre-sintered multi-layered dental mill blank may comprise the following layers:
a top layer L4,
an intermediate layer L3,
an intermediate layer L2,
a bottom layer L1, and
the representative test sections, when being fully sintered by a speed sintering process, having a CIE b* value, the CIE b* value of the layers satisfying one or more of the CIE b* value profiles A4.1 to J4.1 as defined herein in table D1.

TABLE D1

| Profile | | L1 | L2 | L3 | L4 |
|---|---|---|---|---|---|
| A4.1 | CIE | 18.6-22.6 | 15.8-19.8 | 14.4-18.4 | 13.0-17.0 |
| B4.1 | value | 18.1-22.1 | 18.6-22.6 | 19.5-23.5 | 19.1-23.1 |
| C4.1 | b* in the | 18.3-22.3 | 18.5-22.5 | 17.1-21.1 | 15.6-19.6 |
| D4.1 | range of | 13.9-17.9 | 13.8-17.8 | 12.0-16.0 | 10.9-14.9 |
| E4.1 | | 21.8-25.8 | 22.0-26.0 | 22.0-26.0 | 21.2-25.2 |
| F4.1 | | 20.1-24.1 | 20.5-24.5 | 19.7-23.7 | 19.1-23.1 |

TABLE D1-continued

| Profile | L1 | L2 | L3 | L4 |
|---|---|---|---|---|
| G4.1 | 18.9-22.9 | 18.0-22.0 | 15.8-19.8 | 14.2-18.2 |
| H4.1 | 16.0-20.0 | 15.1-19.1 | 13.3-17.3 | 12.4-16.4 |
| I4.1 | 7.8-11.8 | 7.2-11.2 | 5.4-9.4 | 5.2-9.2 |
| J4.1 | 3.9-7.9 | 3.7-7.7 | 2.7-6.7 | 2.5-6.5 |

The pre-sintered multi-layered dental mill blank may comprise the following layers:
a top layer L4,
an intermediate layer L3,
an intermediate layer L2,
a bottom layer L1, and
the representative test sections, when being fully sintered by a speed sintering process, having a CIE b* value, the CIE b* value of the layers satisfying one or more of the CIE b* value profiles A4.2 to J4.2 in table D2.

TABLE D2

| Profile | | L1 | L2 | L3 | L4 |
|---|---|---|---|---|---|
| A4.2 | CIE | 17.6-19.6 | 16.8-18.8 | 15.4-17.4 | 14.0-16.0 |
| B4.2 | value | 19.1-21.1 | 19.6-21.6 | 20.5-22.5 | 20.1-22.1 |
| C4.2 | b* in the | 19.3-21.3 | 19.5-21.5 | 18.1-20.1 | 16.6-18.6 |
| D4.2 | range of | 14.9-16.9 | 14.8-16.8 | 13.0-15.0 | 11.9-13.9 |
| E4.2 | | 22.8-24.8 | 23.0-25.0 | 23.0-25.0 | 22.2-24.2 |
| F4.2 | | 21.1-23.1 | 21.5-23.5 | 20.7-22.7 | 20.1-22.1 |
| G4.2 | | 19.9-21.9 | 19.0-21.0 | 16.8-18.8 | 15.2-17.2 |
| H4.2 | | 17.0-19.0 | 16.1-18.1 | 14.3-16.3 | 13.4-15.4 |
| I4.2 | | 8.8-10.8 | 8.2-10.2 | 6.4-8.4 | 6.2-8.2 |
| J4.2 | | 4.9-6.9 | 4.7-6.7 | 3.7-5.7 | 3.5-5.5 |

In one embodiment, the pre-sintered multi-layered dental mill blank is composed of the following layers: a top layer L4, an intermediate layer L3, an intermediate layer L2, a bottom layer L1, and the CIE b* values of the layers satisfy one or more of the CIE b* value profiles A4.1 to J4.1 as defined herein in table D1 or A4.2 to J4.2 as defined herein in table D2.

The CIE L*a*b* values of the layers may satisfy specific combinations of the CIE L*a*b* value profiles as defined herein. The pre-sintered multi-layered dental mill blank may comprise the following layers:
a top layer L4,
an intermediate layer L3,
an intermediate layer L2,
a bottom layer L1, and
the representative test sections, when being fully sintered by a speed sintering process, having CIE L*a*b* values, the CIE L*a*b* values of the layers satisfying one or more of the optical properties profiles a to j as defined herein in table E1.

TABLE E1

| Optical properties profiles | CIE lightness L* profile | CIE a* value profile | CIE b* value profile |
|---|---|---|---|
| a | A2.1 | A3.1 | A4.1 |
| b | B2.1 | B3.1 | B4.1 |
| c | C2.1 | C3.1 | C4.1 |
| d | D2.1 | D3.1 | D4.1 |
| e | E2.1 | E3.1 | E4.1 |
| f | F2.1 | F3.1 | F4.1 |
| g | G2.1 | G3.1 | G4.1 |
| h | H2.1 | H3.1 | H4.1 |
| i | I2.1 | I3.1 | I4.1 |
| j | J2.1 | J3.1 | J4.1 |

The CIE lightness L* profiles A2.1 to J2.1, the CIE a* value profiles A3.1 to J3.1, and the CIE b* value profiles A4.1 to J4.1 are as defined herein in table B1 to D1.

The pre-sintered multi-layered dental mill blank may comprise the following layers:
- a top layer L4,
- an intermediate layer L3,
- an intermediate layer L2,
- a bottom layer L1, and
- the representative test sections, when being fully sintered by a speed sintering process, having CIE L*a*b* values, the CIE L*a*b* values of the layers satisfying one or more of the optical properties profiles aa to jj as defined herein in table E2.

TABLE E2

| Optical properties profiles | CIE lightness L* profile | CIE value a* profile | CIE value b* profile |
|---|---|---|---|
| aa | A2.2 | A3.2 | A4.2 |
| ab | B2.2 | B3.2 | B4.2 |
| cc | C2.2 | C3.2 | C4.2 |
| dd | D2.2 | D3.2 | D4.2 |
| ee | E2.2 | E3.2 | E4.2 |
| ff | F2.2 | F3.2 | F4.2 |
| gg | G2.2 | G3.2 | G4.2 |
| hh | H2.2 | H3.2 | H4.2 |
| ii | I2.2 | I3.2 | I4.2 |
| jj | J2.2 | J3.2 | J4.2 |

The CIE lightness L* profiles A2.2 to J2.2, the CIE a* value profiles A3.2 to J3.2, and the CIE b* value profiles A4.2 to J4.2 are as defined herein in tables B2 to D2.

The pre-sintered multi-layered dental mill blank may comprise the following layers:
- a top layer L4,
- an intermediate layer L3,
- an intermediate layer L2,
- a bottom layer L1, and
- the representative test sections, when being fully sintered by a speed sintering process, having CIE L*a*b* values and a contrast ratio, the CIE L*a*b* values and the contrast ratio of the layers satisfying one or more of the optical properties profiles A to J in table F1.

Such a set of optical properties profiles A to J (or Aa to Jj) is advantageous in that it provides a suitable choice of aesthetical appearance that will match an appearance, e.g. in terms of translucency and color, of natural teeth for most patients. The set of optical properties profiles C to H (or Cc to Hh), e.g., F or G (or Ff or Gg), may be seen as particularly advantageous in that it provides a suitable choice of aesthetical appearance that will match an appearance, e.g. in terms of translucency and color, of natural teeth for a large subgroup of all patients.

TABLE F1

| Optical properties profiles | Contrast ratio profile | CIE lightness L* profile | CIE a* value profile | CIE b* value profile |
|---|---|---|---|---|
| A | A1.1 | A2.1 | A3.1 | A4.1 |
| B | B1.1 | B2.1 | B3.1 | B4.1 |
| C | C1.1 | C2.1 | C3.1 | C4.1 |
| D | D1.1 | D2.1 | D3.1 | D4.1 |
| E | E1.1 | E2.1 | E3.1 | E4.1 |
| F | F1.1 | F2.1 | F3.1 | F4.1 |
| G | G1.1 | G2.1 | G3.1 | G4.1 |
| H | H1.1 | H2.1 | H3.1 | H4.1 |
| I | I1.1 | I2.1 | I3.1 | I4.1 |
| J | J1.1 | J2.1 | J3.1 | J4.1 |

The contrast ratio profiles A1.1 to J1.1, the CIE lightness L* profiles A2.1 to J2.1, the CIE a* value profiles A3.1 to J3.1, and the CIE b* value profiles A4.1 to J4.1 are as defined herein in tables A1 to D1.

The pre-sintered multi-layered dental mil blank may comprise the following layers:
- a top layer L4,
- an intermediate layer L3,
- an intermediate layer L2,
- a bottom layer L1, and
- the representative test sections, when being fully sintered by a speed sintering process, having CIE L*a*b* values and a contrast ratio, the CIE L*a*b* values and the contrast ratio of the layers satisfying one or more of the optical properties profiles Aa to Jj in table F2.

TABLE F2

| Optical properties profiles | Contrast ratio profile | CIE lightness L* profile | CIE value a* profile | CIE value b* profile |
|---|---|---|---|---|
| Aa | A1.2 | A2.2 | A3.2 | A4.2 |
| Bb | B1.2 | B2.2 | B3.2 | B4.2 |
| Cc | C1.2 | C2.2 | C3.2 | C4.2 |
| Dd | D1.2 | D2.2 | D3.2 | D4.2 |
| Ee | E1.2 | E2.2 | E3.2 | E4.2 |
| Ff | F1.2 | F2.2 | F3.2 | F4.2 |
| Gg | G1.2 | G2.2 | G3.2 | G4.2 |
| Hh | H1.2 | H2.2 | H3.2 | H4.2 |
| Ii | I1.2 | I2.2 | I3.2 | I4.2 |
| Jj | J1.2 | J2.2 | J3.2 | J4.2 |

The contrast ratio profiles A1.2 to J1.2, the CIE lightness L* profiles A2.2 to J2.2, the CIE a* value profiles A3.2 to J3.2, and the CIE b* value profiles A4.2 to J4.2 are as defined herein in tables A2 to D2.

In one embodiment, the pre-sintered multi-layered dental mill blank is composed of the following layers: a top layer L4, an intermediate layer L3, an intermediate layer L2, a bottom layer L1, and the CIE L*a*b* values and the contrast ratio of the layers satisfying one or more of the optical properties profiles A to J as defined herein in table F1 or Aa to Jj as defined herein in table F2. In one embodiment, the pre-sintered multi-layered dental mill blank is composed of the following layers: a top layer L4, an intermediate layer L3, an intermediate layer L2, a bottom layer L1, and the CIE L*a*b* values and the contrast ratio of the layers satisfying one or more of the optical properties profiles C to H as defined herein in table F1 (e.g., F or G) or Cc to Hh as defined herein in table F2 (e.g., Ff or Gg).

Additionally or alternatively to the CIE L*a*b values as described herein, the representative test sections, when being fully sintered by a speed sintering process, may have further characteristics as described herein such as contrast ratios, number of pores per grain, or mechanical properties.

1.5 Number of Pores Per Grain

One embodiment of the present invention provides a pre-sintered multi-layered dental mill blank comprising a top layer,
a bottom layer, and
at least one intermediate layer,
each layer comprising zirconia and yttria, wherein the yttria content of the layers increases layer-by-layer from the bottom layer to the top layer,
the pre-sintered multi-layered dental mill blank being characterized by providing a representative test section for each layer, and the representative test section of the top layer and/or an intermediate layer being adjacent to the top layer, when being fully sintered by a speed sintering process, having a number of pores per grain of less than 0.25.

In one embodiment, the representative test section of the top layer, when being fully sintered by a speed sintering process, have a number of pores per grain of less than 0.25. In one embodiment, the representative test section of an intermediate layer being adjacent to the top layer, when being fully sintered by a speed sintering process, have a number of pores per grain of less than 0.25. In one embodiment, the representative test section of the top layer and an intermediate layer being adjacent to the top layer, when being fully sintered by a speed sintering process, have a number of pores per grain of less than 0.25.

The representative test sections of the top layer and/or an intermediate layer adjacent to the top layer is/are fully sintered by a speed sintering process to provide a fully sintered representative test section of the top layer and/or a fully sintered representative test section of an intermediate layer adjacent to the top layer, the fully sintered representative test section/s having a number of pores per grain as defined herein.

When the number of pores per grain is as low as defined herein, the pre-sintered multi-layered dental mill blank is suitable for preparing, by a speed sintering process, a dental restoration with desirable optical properties. In particular, the mill blank may be suitable for preparing, by a speed sintering process, a dental restoration having a more translucent incisal or occlusal zone (especially that part of the incisal zone that is prepared from the top layer) which is highly desirable from an aesthetical point of view. Without wishing to be bound by theory, it is believed that residual pores (e.g., as those pores that can be seen in FIGS. 7 to 9) in a fully sintered dental restoration can diffract or scatter light in an undesired way, and therefore can be detrimental to the optical properties of the fully sintered dental restoration, like to its translucency.

The number of "pores" per grain as used herein refers to the number of pores having a diameter in the range of 2 to 1000 nm. The pores may be intergranular pores or intragranular pores. An "intergranular pore" is a pore that is located between two or more different grains, e.g., located on the boundary of two or more different grains. An "intragranular pore" is a pore that is located within a grain.

The number of pores per grain or the number of intragranular pores per grain is preferably determined by microstructure analysis of a surface (also referred herein as "region of interest (ROI)") of a fully sintered representative test section using scanning-electron microscopy (SEM) as described in section "Measuring methods" herein below. The surface of the fully sintered representative test section is preferably at least 50 $\mu m^2$, like in the range of 50 to 2000 $\mu m^2$ (e.g., in the range of 500 to 2000 $\mu m^2$), in the range of 50 to 1500 $\mu m^2$ (e.g., in the range of 500 to 1500 $\mu m^2$), in the range of 50 to 1000 $\mu m^2$, in the range of 50 to 500 $\mu m^2$, or in the range of 50 to 300 $\mu m^2$. The surface may be selected such that the grains of the surface have a number-average grain size of at least 0.7 $\mu m$, at least 1.0 $\mu m$, at least 1.2 $\mu m$ (e.g., in the range of 1.2 to 2.5 $\mu m$ or 1.2 to 2.2 $\mu m$), or at least 1.4 $\mu m$ (e.g., in the range of 1.4 to 2.5 $\mu m$ or 1.4 to 2.2 $\mu m$). The number-average grain size may be determined as described herein below in the section "Measuring methods".

It is believed that yttria-stabilized zirconia grains that have a comparatively high yttria content (e.g., like in the range of a 5Y-YSZ material) grow faster during a speed sintering process (e.g., a sintering process as defined in table 5 herein), and therefore end up having a larger grain size after sintering, compared to yttria-stabilized zirconia grains having a lower yttria content. It is also possible to select several surfaces (e.g, two, three four or more surfaces that may have a surface in the range of 50 to 300 $\mu m^2$) of the fully sintered representative test section in order to determine the number or pores per grain (or the number of intragranular pores per grain) for each one of the surfaces to calculate the number of pores per grain for the combined surfaces.

The number of pores per grain of the top layer may be less than 0.20, less than 0.15, less than 0.10, less than 0.05 or less than 0.02. Likewise, the number of pores per grain of the intermediate layer being adjacent to the top layer may be less than 0.20, less than 0.15, less than 0.10, less than 0.05 or less than 0.02. In one embodiment, the pre-sintered multi-layered dental mill blank being characterized by providing a representative test section for each layer, and the representative test sections, when being fully sintered by a speed sintering process, having a number of pores per grain of less than 0.25, less than 0.20, less than 0.15, less than 0.10, less than 0.05 or less than 0.02.

The representative test section of the top layer and/or an intermediate layer being adjacent to the top layer, when being fully sintered by a speed sintering process, may have a number of intragranular pores per grain of less than 0.20, less than 0.15, less than 0.10, less than 0.05 or less than 0.02. In one embodiment, the representative test section of the top layer, when being fully sintered by a speed sintering process, has a number of intragranular pores per grain of less than 0.20, less than 0.15, less than 0.10, less than 0.05, or less than 0.02. In one embodiment, the representative test section of an intermediate layer being adjacent to the top layer, when being fully sintered by a speed sintering process, has a number of intragranular pores per grain of less than 0.20, less than 0.15, less than 0.10, less than 0.05 or less than 0.02. In one embodiment, the representative test section of the top layer and an intermediate layer being adjacent to the top layer, when being fully sintered by a speed sintering process, may have a number of intragranular pores per grain of less than 0.20, less than 0.15, less than 0.10, less than 0.05 or less than 0.02.

Additionally or alternatively to the number of pores per grain as described herein, the representative test sections, when being fully sintered by a speed sintering process, may have further characteristics as described herein such as CIE L*a*b values, contrast ratios or mechanical properties.

1.6 Mechanical Properties

The representative test sections, when being fully sintered by a speed sintering process, may be characterized by specific mechanical properties, like flexural strength and/or fracture toughness. Unless explicitly stated otherwise, the flexural strength and/or the fracture toughness as defined herein for a layer refer to the flexural strength and the fracture toughness of a representative test section, being fully sintered by a speed sintering process, of that layer. The flexural strength may be determined according to ISO 6872:2015. The fracture toughness ($K_{Ic}$) may be determined as described herein below in the section "Measuring methods".

The representative test sections, when being fully sintered by a speed sintering process, may have a specific flexural strength and/or a specific fracture toughness $K_{IC}$. The flexural strength of the top layer may be at least 500 MPa, at least 550 MPa, at least 575 MPa, or at least 600 MPa. The flexural strength of the top layer may be at most 1100 MPa, at most 1000 MPa, at most 800 MPa or at most 750 MPa. The flexural strength of the top layer may be in the range of 500 to 1100 MPa, 550 to 1000 MPa, 575 to 800 MPa or 600 to 750 MPa. The fracture toughness $K_{IC}$ of the top layer may be at least 2.5 MPa*m$^{1/2}$, at least 2.7 MPa*m$^{1/2}$, or at least 2.8 MPa*m$^{1/2}$. The fracture toughness $K_{IC}$ of the top layer may be at most 3.5 MPa*m$^{1/2}$, at most 3.3 MPa*m$^{1/2}$, or at most 3.2 MPa*m$^{1/2}$. The fracture toughness $K_{IC}$ of the top layer may be in the range of 2.5 to 3.5 MPa*m$^{1/2}$, 2.7 to 3.3 MPa*m$^{1/2}$, or 2.8 to 3.2 MPa*m$^{1/2}$. Such a strength and/or toughness is desirable to provide an incisal region of a dental restoration with adequate strength and/or toughness while a wear off of other teeth, e.g. the occlusal surface of an opposite natural tooth, may not be too high.

The flexural strength of the bottom layer may be at least 900 MPa, at least 1000 MPa, at least 1050 MPa. The flexural strength of the bottom layer may be at most 1500 MPa, at most 1300 MPa, or at most 1200 MPa. The flexural strength of the bottom layer may be in the range of 900 to 1500 MPa, 1000 to 1300 MPa, or 1050 to 1200 MPa. The fracture toughness $K_{IC}$ of the bottom layer may be at least 3.6 MPa*m$^{1/2}$, at least 3.8 MPa*m$^{1/2}$, or at least 4.0 MPa*m$^{1/2}$. The fracture toughness $K_{IC}$ of the bottom layer may be at most 5.5 MPa*m$^{1/2}$, at most 4.8 MPa*m$^{1/2}$, or at most 4.4 MPa*m$^{1/2}$. The fracture toughness $K_{IC}$ of the bottom layer may be in the range of 3.6 to 5.5 MPa*m$^{1/2}$, 3.8 to 4.8 MPa*m$^{1/2}$, or 4.0 to 4.4 MPa*m$^{1/2}$. Such a strength and/or toughness is highly desirable to provide a dental restoration with sufficient mechanical stability for most of its applications including applications where a comparable low wall thickness is desired. Said applications may be, but are not limited to, abutment supported crowns or bridges, and particularly bridges where the connector dimensions between different units of the bridge allow the realization of an esthetic clinical outcome.

In one embodiment, the fracture toughness $K_{IC}$ of the bottom layer is at least 3.8 MPa*m$^{1/2}$, at least 4.0, or in the range of 3.8 to 4.8 MPa*m$^{1/2}$, or 4.0 to 4.4 MPa*m$^{1/2}$, and the bottom layer comprises yttria in a weight amount of at least 6.0 wt. %, at least 6.4 wt. %, or in the range of 6.0 to 7.5 wt. %, or in the range of 6.4 to 7.2 wt. %, based on the total weight of the bottom layer.

The representative test sections, when being fully sintered by a speed sintering process, may have a flexural strength that decreases layer-by-layer from the bottom layer to the top layer. The representative test sections, when being fully sintered by a speed sintering process, may have a fracture toughness $K_{IC}$ that decreases layer-by-layer from the bottom layer to the top layer.

Additionally or alternatively to the properties of the fully sintered representative test sections as described herein, the pre-sintered multi-layered dental mill blank may be defined by its composition as described herein, e.g., in the following sections.

2. Composition

The pre-sintered multi-layered dental mill blank according to the present invention may be defined by its components, the composition of its layers and/or the composition of the dental mill blank as a whole, i.e., the composition of its combined layers.

One embodiment of the present invention provides a pre-sintered multi-layered dental mill blank comprising a top layer, a bottom layer, and at least one intermediate layer, each layer comprising zirconia and yttria, the yttria content of the layers increases layer-by-layer from the bottom layer to the top layer.

2.1 Zirconia ($ZrO_2$) and yttria ($Y_2O_3$)

The pre-sintered multi-layered dental mill blank may be a pre-sintered multi-layered zirconia ceramic dental mill blank. Thus, the pre-sintered multi-layered dental mill blank may comprise zirconia as a main component. The pre-sintered multi-layered dental mill blank may comprise zirconia in a weight amount of at least 80 wt. %, at least 85 wt. %, at least 89 wt. %, at most 95 wt. %, at most 93 wt. %, or at most 91 wt. %, or in the range of 80 to 95 wt. %, 85 to 93 wt. %, or 89 to 91 wt. %, of zirconia, based on the total weight of the pre-sintered multi-layered dental mill blank.

Each layer may comprise zirconia in a weight amount of at least 80 wt. %, at least 85 wt. %, at least 87 wt. % or at least 88 wt. %, based on the total weight of the respective layer of the pre-sintered multi-layered dental mill blank. Each layer may comprise zirconia in a weight amount of at most 95 wt. %, at most 94 wt. %, at most 93 wt. %, at most 92 wt. %, based on the total weight of the respective layer of the pre-sintered multi-layered dental mill blank. Each layer may comprise zirconia in a weight amount in the range of 80 to 95 wt. %, 85 to 94 wt. %, 87 to 93 wt. %, to 88 to 92 wt. %, based on the total weight of the respective layer of the pre-sintered multi-layered dental mill blank. For instance, the top layer may comprise 80 to 92 wt. %, like in the range of 85 to 91 wt. %, like in the range of 87 to 90 wt. %, of zirconia, based on the total weight of the top layer. The bottom layer may comprise 85 to 94 wt. %, like in the range of 88 to 94 wt. %, like in the range of 90 to 92 wt. %, of zirconia, based on the total weight of the bottom layer. Each one of the at least one intermediate layer may comprise 82 to 94 wt. %, like in the range of 85 to 93 wt. %, like in the range of 87 to 92 wt. %, of zirconia, based on the total weight of the respective layer of the at least one intermediate layer.

The zirconia is typically present in form of yttria-stabilized zirconia. The pre-sintered multi-layered dental mill blank may comprise yttria-stabilized zirconia in a weight amount of at least 80 wt. %, at least 90 wt. %, at least 95 wt. %, at least 97 wt. %, or in the range of 80 to 99.5 wt. %, 90 to 99.5 wt. %, 95 to 99.0 wt. %, or 97 to 98.5 wt. %, based on the total weight of the pre-sintered multi-layered dental mill blank. The pre-sintered multi-layered dental mill blank may comprise a combined weight amount of zirconia, yttria and hafnium dioxide of at least 90 wt. %, at least 95 wt. %, at least 98 wt. %, at most 99.8 wt. %, at most 99.4 wt. %, at most 99.2 wt. %, or in the range of 90 to 99.8 wt. %, 95 to 99.5 wt. %, 98 to 99.2 wt. %, based on the total weight of the pre-sintered multi-layered dental mill blank. Each layer may comprise at least 80 wt. %, at least 90 wt. %, at least 95 wt. %, or at least 96 wt. % of a combined amount of zirconia and yttria, based on the total weight of the respective layer of the pre-sintered multi-layered dental mill blank. Each layer may comprise at most 99.8 wt. %, at most 99.5 wt. %, at most 99.0 wt. %, or at most 98.5 wt. %, of a combined amount of zirconia and yttria, based on the total weight of the respective layer of the pre-sintered multi-layered dental mill blank. Each layer may comprise 80 to 99.8 wt. %, 90 to 99.5 wt. %, 95 to 99.0 wt. %, to 96 to 98.5 wt. %, of a combined amount of zirconia and yttria, based on the total weight of the respective layer of the pre-sintered multi-layered dental mill blank.

Each layer of the pre-sintered multi-layered dental mill blank typically comprises zirconia and yttria. The yttria content of the layers typically increases layer-by-layer from the bottom layer to the top layer. Thus, yttria is typically present in different layers of the pre-sintered mill blank in different weight amounts. Without wishing to be bound by theory, it is believed that the yttria content increasing layer-by-layer contributes to the final dental restoration having a natural appearance in which the translucency gradually changes from bottom to top.

The top layer may comprise at least 7.0 wt. %, at least 8.0 wt. %, at least 9.0 wt. %, or at least 9.5 wt. %, of yttria, based on the total weight of the top layer. The top layer may comprise at most 13.0 wt. %, at most 12.0 wt. %, at most 11.0 wt. %, or at most 10.5 wt. %, of yttria, based on the total weight of the top layer. The top layer may comprise yttria in a weight amount in the range of 7.0 to 13.0 wt. %, 8.0 to 12.0 wt. %, 9.0 to 11.0 wt. %, or 9.5 to 10.5 wt. %, based on the total weight of the top layer.

The bottom layer may comprise at least at least 4.0 wt. %, at least 5.0 wt. %, at least 5.5 wt. %, or at least 6.0 wt. %, of yttria, based on the total weight of the bottom layer. The bottom layer may comprise at most 8.0 wt. %, at most 7.5 wt. %, at most 7.0 wt. %, or at most 6.8 wt. % of yttria, based on the total weight of the bottom layer. The bottom layer may comprise 4.0 to 8.0 wt. %, 5.0 to 7.5 wt. %, 5.5 to 7.0 wt. %, or 6.0 to 6.8 wt. %, of yttria, based on the total weight of the bottom layer. In one embodiment, the top layer comprises yttria in a weight amount of at least 9.0 wt. %, like at least 9.5 wt. %, like in the range of 9.5 to 10.5 wt. %, based on the total weight of the top layer, and the bottom layer comprises yttria in a weight amount of at most 7.5 wt. %, like at most 7.0 wt. %, like in the range of 5.5 to 7.5 wt. %, based on the total weight of the bottom layer. In one embodiment, the top layer comprises yttria in a weight amount in the range of 9.0 to 12.0 wt. %, based on the total weight of the top layer, and the bottom layer comprises yttria in a weight amount in the range of 5.5 to 7.5 wt. %, based on the total weight of the bottom layer.

Each one of the at least one intermediate layer may comprise yttria in an amount of at least 5.0 wt. %, at least 6.0 wt. %, at least 6.5 wt. %, or at least 7.0 wt. %, based on the total weight of the respective layer of the at least one intermediate layer. Each one of the at least one intermediate layer may comprise yttria in an amount of at most 11.0 wt. %, at most 10.5 wt. %, at most 10.0 wt. %, or 9.5 wt. %, based on the total weight of the respective layer of the at least one intermediate layer. Each one of the at least one intermediate layer may comprise yttria in an amount in the range of 5.0 to 11.0 wt. %, 6.0 to 10.5 wt. %, 6.5 to 10.0 wt. %, or 7.0 to 9.5 wt. %, based on the total weight of the respective layer of the at least one intermediate layer.

The pre-sintered multi-layered dental mill blank may comprise, or may be composed of, the following layers:
  a top layer L4,
  an intermediate layer L3,
  an intermediate layer L2,
  a bottom layer L1,
  the top layer L4 comprising yttria in a weight amount in the range of 7.0 to 13.0 wt. %, 8.0 to 12.0 wt. %, 9.0 to 11.0 wt. %, or 9.5 to 10.5 wt. %, based on the total weight of the top layer,
  the intermediate layer L3 comprising yttria in a weight amount in the range of 6.0 to 11.0 wt. %, 7.5 to 10.5 wt. % or 8.5 to 10.0 wt. %, or 9.0 to 9.5 wt. %, based on the total weight of the intermediate layer L3,
  the intermediate layer L2 comprising yttria in a weight amount in the range of 4.5 to 9.0 wt. %, 5.5 to 8.0 wt. %, 6.0 to 7.5 wt. %, or 6.5 to 7.3 wt. %, based on the total weight of the intermediate layer L2, and
  the bottom layer L1 comprising yttria in a weight amount in the range of 4.0 to 9.0 wt. %, 5.0 to 8.0 wt. %, 5.5 to 7.5 wt. %, or 6.0 to 6.8 wt. %, based on the total weight of the bottom layer.

The yttria content of the layers may be defined by a difference between the weight amounts of two layers expressed by a value in percent point(s). For instance, the top layer may have an yttria content (in wt. %), based on the total weight of the top layer, that is higher by at least 1.0 percent point, at least 2.0 percent points, at least 2.5 percent points, or at least 3.0 percent points, than the yttria content (in wt. %) of the bottom layer, based on the total weight of the bottom layer. The top layer may have an yttria content (in wt. %), based on the total weight of the top layer, that is higher by at most 8.0 percent points, at most 6.0 percent points, at most 5.0 percent points, or at most 4.0 percent points, than the yttria content (in wt. %) of the bottom layer, based on the total weight of the bottom layer. The top layer having an yttria content, based on the total weight of the top layer, that is higher in the range of 1.0 to 8.0 percent points, 2.0 to 6.0 percent points, 2.5 to 5.0 percent points, or 3.0 to 4.0 percent points, than the yttria content of the bottom layer, based on the total weight of the bottom layer.

Each layer may have an yttria content (in wt. %) that differs from an yttria content (in wt. %) of an adjacent layer by at least 0.3 percent point, at least 0.5 percent point, at most 3.0 percent points, at most 2.5 percent points, or in the range of 0.3 to 3.0 percent points, or 0.5 to 2.5 percent points, wherein the yttria content of a layer is based on the total weight of that layer.

The yttria being present in a layer of the pre-sintered multi-layered dental mill blank, or in the pre-sintered multi-layered dental mill blank as whole, may be a combined yttria of a type-I-yttria and a type-II-yttria. Likewise, the yttria content of a layer of the pre-sintered multi-layered dental mill blank, or of the pre-sintered multi-layered dental mill blank as whole, may be a combined yttria content of a type-I-yttria content and a type-II-yttria content. In one embodiment, the top layer comprises yttria which is type-I-yttria, the at least one intermediate layer comprises yttria which is a combination of type-I-yttria and type-II-yttria, and the bottom layer comprises yttria which is a combination of type-I-yttria and type-II-yttria.

Each one of the layers of the pre-sintered multi-layered dental mill blank is preferably obtainable from an yttria-stabilized zirconia powder or a mixture of different yttria-stabilized zirconia powders. Each one of the layers of the pre-sintered multi-layered dental mill blank may be obtainable from a different yttria-stabilized zirconia powder or different mixtures of yttria-stabilized zirconia powders. Preferred yttria-stabilized zirconia powders are 3 mol %-yttria-stabilized zirconia powders (3Y-YSZ), 4 mol %-yttria-stabilized zirconia powders (4Y-YSZ), and ≥5 mol %-yttria stabilized zirconia powders (5Y-YSZ). In one embodiment, each one of the layers of the pre-sintered multi-layered dental mill blank is obtainable from a different yttria-stabilized zirconia powder or different mixtures of yttria-stabilized zirconia powders selected from the group consisting of 3 mol %-yttria-stabilized zirconia powders (3Y-YSZ), 4 mol %-yttria-stabilized zirconia powders (4Y-YSZ), ≥5 mol %-yttria stabilized zirconia powders (5Y-YSZ), and mixtures thereof. Such powders are commercially available, for example, under the brand name HSY-3FSD-103, HSY- 0250, and HSY-0451, respectively, available from DAIICHI KIGENSO KAGAKU KOGYO CO., LTD.

In one embodiment, the pre-sintered multi-layered dental mill blank comprises or is composed of:
- a top layer L4 obtainable from a powder P3,
- an intermediate layer L3 obtainable from a mixture of powders P2 and P3,
- an intermediate layer L2 obtainable from a mixture of powders P1 and P2,
- a bottom layer L1 obtainable from a powder P1, and
- the powders P1 to P3 being three yttria-stabilized zirconia powders with powder P1 having an yttria content in the range of 4.5 to 6.1 wt. % (like in the range of 4.9 to 6.0 wt. %), powder P2 having an yttria content in the range of 6.2 to 7.9 wt. % (like in the range of 6.5 to 7.6 wt. %), and powder P3 having an yttria content in the range of 8.0 to 11.0 wt. % (like in the range of 9.0 to 10.5 wt. %).

The layers L4 to L1 may be obtainable by pre-sintering a top powder layer of powder P3, an intermediate powder layer of powder P2 and P3, and intermediate powder layer of powder P1 and P2, and a bottom powder layer of powder P1, wherein each of powders P1 to P3 may optionally be treated with one or more additives (e.g. coloring additives, sintering activator precursor, and/or sintering inhibitor precursor).

In one embodiment, the pre-sintered multi-layered dental mill blank comprises or is composed of:
- a top layer L4, which is a pre-sintered top powder layer of powder P3,
- an intermediate layer L3, which is a pre-sintered intermediate powder layer of a mixture of powders P2/P3,
- an intermediate layer L2, which is a pre-sintered intermediate powder layer of a mixture of powders P1/P2,
- a bottom layer L1, which is a pre-sintered bottom powder layer of powder P1, and
- the powders P1 to P3 being three yttria-stabilized zirconia powders with powder P1 having an yttria content in the range of 4.5 to 6.1 wt. % (like in the range of 4.9 to 6.0 wt. %), powder P2 having an yttria content in the range of 6.2 to 7.9 wt. % (like in the range of 6.5 to 7.6 wt. %), and powder P3 having an yttria content in the range of 8.0 to 11.0 wt. % (like in the range of 9.0 to 10.5 wt. %).

The yttria content (in wt. %) of powders P1 and P2 and the yttria content (in wt. %) of powders P2 and P3 may differ by at least 0.7 percent point, at least 1.0 percent point, at least 1.2 percent points, at most 3.0 percent points, at most 2.8 percent points, at most 2.5 percent points, like in the range of 0.7 to 3.0 percent points, in the range of 1.0 to 2.8 percent points, or in the range of 1.2 to 2.5 percent points.

The mixture of powders P1/P2 may contain powders P1 and P2 in a weight ratio of powder P1 to powder P2 in the range of 10:90 to 40:60, in the range of 15:85 to 35:65, in the range of 20:80 to 30:70, or in the range of 22:78 to 28:72. The mixture of powders P2/P3 may contain powders P2 and P3 in a weight ratio of powder P2 to powder P3 in the range of 10:90 to 40:60, in the range of 15:85 to 35:65, in the range of 20:80 to 30:70, or in the range of 22:78 to 28:72. In one embodiment, the mixture of powders P1/P2 contains powders P1 and P2 in a weight ratio of powder P1 to powder P2 in the range of 10:90 to 40:60, in the range of 15:85 to 35:65, in the range of 20:80 to 30:70, or in the range of 22:78 to 28:72, and the mixture of powders P2/P3 contains powders P2 and P3 in a weight ratio of powder P2 to powder P3 in the range of 10:90 to 40:60, in the range of 15:85 to 35:65, in the range of 20:80 to 30:70, or in the range of 22:78 to 28:72.

2.2 Hafnium dioxide ($HfO_2$)

The pre-sintered multi-layered dental mill blank may comprise hafnium dioxide. Hafnium dioxide may be part of or may be derived from a ceramic base component (e.g., an yttria-stabilized zirconia powder) that is used to prepare at least a part of a powder layer of a green body of the pre-sintered multi-layered dental mill blank. For instance, hafnium dioxide may be part of an yttria-stabilized zirconia powder.

The pre-sintered multi-layered dental mill blank may comprise hafnium dioxide in a weight amount of at least 0.5 wt. %, at least 1.0 wt. % at least 1.2 wt. %, at most 5.0 wt. %, at most 3.0 wt. % or at most 2.0 wt. %, or in the range of 0.5 to 5.0 wt. %, 1.0 to 3.0 wt. %, or 1.2 to 2.0 wt. %, based on the total weight of the pre-sintered multi-layered dental mill blank.

Each layer of the pre-sintered multi-layered dental mill blank may comprise hafnium dioxide. Hafnium dioxide may be present in a specific weight ratio to zirconia. Each layer may comprise hafnium dioxide in a weight ratio to zirconia in the range of 0:100 to 5:95, 1:99 to 4:96, 2:98 to 3:97, or of 2:98, based on the total weight of hafnium dioxide and zirconia of the respective layer of the pre-sintered multi-layered dental mill blank. Each layer may comprise hafnium dioxide in an amount of at least 0.1 wt. %, at least 0.5 wt. %, at least 1.5 wt. %, at most 5.0 wt. %, at most 3.0 wt. % or at most 2.0 wt. %, like in the range of 0.1 to 5.0 wt. %, like in the range of 0.5 to 3.0 wt. %, like in the range of 1.5 to 2.0 wt. %, based on the total weight of the respective layer.

Each layer may be defined by a combined amount of zirconia, yttria and hafnium dioxide. Each layer may comprise at least 80 wt. %, at least 90 wt. %, at least 95 wt. %, or at least 98 wt. % of a combined amount of zirconia, yttria and hafnium dioxide, based on the total weight of the respective layer of the pre-sintered multi-layered dental mill blank. Each layer may comprise at most 99.8 wt. %, at most 99.6 wt. %, at most 99.4 wt. %, or at most 99.2 wt. %, of a combined amount of zirconia, yttria and hafnium dioxide, based on the total weight of the respective layer of the pre-sintered multi-layered dental mill blank. Each layer may comprise 80 to 99.8 wt. %, 90 to 99.6 wt. %, 95 to 99.4 wt. %, to 98 to 99.2 wt. %, of a combined amount of zirconia, yttria and hafnium dioxide, based on the total weight of the respective layer of the pre-sintered multi-layered dental mill blank.

2.3 Aluminum oxide ($Al_2O_3$)

The pre-sintered multi-layered dental mill blank may comprise aluminum oxide. Aluminum oxide may be part of or may be derived from a ceramic base component (e.g., an yttria-stabilized zirconia powder) that is used to prepare at least a part of a powder layer of a green body of the pre-sintered multi-layered dental mill blank.

The pre-sintered multi-layered dental mill blank may comprise aluminum oxide in a weight amount of at least 0.005 wt. %, at least 0.02 wt. %, or at least 0.05 wt. %, at most 0.4 wt. %, at most 0.2 wt. %, or at most 0.1 wt. %, or in the range of 0.005 to 0.4 wt. % (e.g., 0.005 to 0.1 wt. %), 0.02 to 0.2 wt. %, or 0.05 to 0.1 wt. %, based on the total weight of the pre-sintered multi-layered dental mill blank.

The layers of the pre-sintered multi-layered dental mill blank may have different weight contents of aluminum oxide. The top layer may comprise aluminum oxide in an amount of less than 0.05 wt. %, or less than 0.02 wt. %, or less than 0.01 wt. %, based on the total weight of the top layer. It has been found that, when the top layer comprises a particularly low amount of aluminum oxide, the top layer or part thereof (e.g., a zone of a dental restoration that is at least partially obtained from the top layer) that has been fully sintered by a speed sintering process has advantageous optical properties. Without wishing to be bound by theory, it is believed that this may be due to a reduced number of pores (i.e., intragranular pores and intergranular pores) being present in the fully sintered top layer or part thereof. Pores are believed to diffract or scatter light in an undesired way in a fully sintered dental restoration and therefore can be detrimental to the optical properties of the fully sintered dental restoration, like to its translucency.

In one embodiment, the pre-sintered multi-layered dental mill blank comprises
- a top layer,
- a bottom layer, and
- at least one intermediate layer,
- each layer comprising zirconia and yttria, wherein the yttria content of the layers increases layer-by-layer from the bottom layer to the top layer, and
- the top layer comprising aluminum oxide in an amount of less than 0.01 wt. %, based on the total weight of the top layer.

The top layer may have a weight content of aluminum oxide that is lower than a weight content of aluminum oxide of the bottom layer. The top layer may have the lowest aluminum content of all the layers. The aluminum content of the layers may increase layer-by-layer from the top layer in the direction of the bottom layer for at least 2 layers.

The bottom layer may have a weight content of aluminum oxide that is higher than a weight content of aluminum oxide of the top layer and a weight content of aluminum oxide of the intermediate layer being adjacent to the top layer.

The pre-sintered multi-layered dental mill blank may comprise, or may be composed of, the following layers:
- a top layer L4,
- an intermediate layer L3,
- an intermediate layer L2,
- a bottom layer L1,
- wherein a weight content of aluminum oxide in each one of the layers L1 and L2 is higher than a weight content of aluminum oxide in layer L3, and a weight content of aluminum oxide in layer L3 being higher than a weight content of aluminum oxide in layer L4.

The top layer may comprise aluminum oxide in an amount of less than 0.01 wt. %, based on the total weight of the top layer. The top layer may essentially be free of aluminum oxide.

The bottom layer may comprise at least 0.01 wt. %, at least 0.02 wt. %, or at least 0.05 wt. % of aluminum oxide, based on the total weight of the bottom layer. The bottom layer may comprise at most 0.50 wt. %, at most 0.40 wt. %, at most 0.20 wt. % or at most 0.15 wt. %, of aluminum oxide, based on the total weight of the bottom layer. The bottom layer may comprise 0.01 to 0.50 wt. %, 0.02 to 0.40 wt. %, 0.05 to 0.20 wt. %, or 0.05 to 0.15 wt. % of aluminum oxide, based on the total weight of the bottom layer.

Each one of the at least one intermediate layer may comprise at least 0.01 wt. %, at least 0.02 wt. %, or at least 0.05 wt. %, of aluminum oxide, based on the total weight of the respective layer of the at least one intermediate layer. Each one of the at least one intermediate layer may comprise at most 0.5 wt. %, at most 0.20 wt. %, or at most 0.15 wt. %, of aluminum oxide, based on the total weight of the respective layer of the at least one intermediate layer. Each one of the at least one intermediate layer may comprise 0.01 to 0.5 wt. %, 0.02 to 0.20 wt. %, or 0.02 to 0.15 wt. % of aluminum oxide, based on the total weight of the respective layer of the at least one intermediate layer.

An intermediate layer being adjacent to the bottom layer may comprise at least 0.01 wt. %, at least 0.02 wt. %, or at least 0.05 wt. % of aluminum oxide, based on the total weight of that intermediate layer. An intermediate layer being adjacent to the bottom layer may comprise at most 0.5 wt. %, at most 0.20 wt. % or at most 0.15 wt. %, of aluminum oxide, based on the total weight of that intermediate layer. An intermediate layer being adjacent to the bottom layer may comprise 0.01 to 0.5 wt. %, 0.02 to 0.20 wt. %, or 0.05 to 0.15 wt. % of aluminum oxide, based on the total weight of that intermediate layer.

An intermediate layer being adjacent to the top layer may comprise at least 0.01 wt. %, at least 0.02 wt. %, of aluminum oxide, based on the total weight of that intermediate layer. An intermediate layer being adjacent to the top layer may comprise at most 0.20 wt. % or at most 0.10 wt. %, of aluminum oxide, based on the total weight of that intermediate layer. An intermediate layer being adjacent to the top layer may comprise 0.01 to 0.20 wt. %, or 0.02 to 0.10 wt. % of aluminum oxide, based on the total weight of that intermediate layer.

2.4 Sintering Activator

The pre-sintered multi-layered dental mill blank may comprise a sintering activator. The sintering activator may be obtainable from a sintering activator precursor. The sintering activator may be obtainable by converting a sintering activator precursor to the sintering activator when pre-sintering a green body of the multi-layered dental mill blank. The sintering activator precursor may be present in a powder layer of a green body. For example, sintering activator precursor may be present on the surface of the powder particles of the powder layer. The sintering activator precursor may be added to an yttria-stabilized zirconia powder or a mixture of yttria-stabilized zirconia powders (e.g., by treating the surface of particles of the powder or powder mixture) as a surface-treating agent before a pre-sintering step.

The pre-sintered multi-layered dental mill blank may comprise the sintering activator in a weight amount of at least 0.02 wt. %, at least 0.05 wt. %, at least 0.10 wt. %, at least 0.15 wt. %, at most 0.8 wt. %, at most 0.45 wt. %, at most 0.30 wt. % or at most 0.25 wt. %, or in the range of 0.02 to 0.8 wt. %, 0.05 to 0.45 wt. %, 0.10 to 0.30 wt. % or 0.15 to 0.25 wt. %, based on the total weight of the pre-sintered multi-layered dental mill blank.

The top layer of the pre-sintered multi-layered dental mill blank may comprise a sintering activator. In one embodiment, the pre-sintered multi-layered dental mill blank comprises
- a top layer,
- a bottom layer, and
- at least one intermediate layer,
- each layer comprising zirconia and yttria, wherein the yttria content of the layers increases layer-by-layer from the bottom layer to the top layer, and
- the top layer comprises a sintering activator.

When the yttria content of the layers increases layer-by-layer from the bottom layer to the top layer, the top layer has the highest yttria content of all layers. Typically, the time and/or temperature that is necessary to sinter a material comprising zirconia and yttria to full density increases with increasing yttria content. Thus, when the sintering activator is comprised in the top layer, a densification of the top layer or a part prepared thereof (e.g., at least a part of an incisal zone of a dental restoration precursor), may be achieved at a lower maximum sintering temperature and/or within a shorter sintering time. The sintering curve of the top layer, or of a part prepared thereof, may be shifted to lower temperatures. When the sintering activator is present, the top layer of the part prepared thereof may be fully sintered in a short time while still achieving very good optical properties.

It is also possible that each layer of the pre-sintered multi-layered dental mill blank comprises the sintering activator. When the sintering activator is comprised in each layer, a densification of the layers, or a part prepared thereof (e.g., a dental restoration precursor), may be achieved at a lower maximum sintering temperature and/or within a shorter sintering time. The sintering curve of each one of the layers, or of a part prepared thereof, may be shifted to lower temperatures. When the sintering activator is present in each layer, the layers or the part prepared thereof may be fully sintered in a short time while still achieving good optical properties.

It has further been found that the sintering activator (e.g., zinc oxide or gallium oxide) may be combined (e.g., in the bottom layer) with a sintering inhibitor (e.g. type-II-yttria) while still achieving a shift of the sintering curve to lower temperatures, despite the presence of the sintering inhibitor, and good optical properties of a product. Without wishing to be bound by theory, it is believed that the sintering activator may be compatible with sintering inhibitor because the sintering activator may have a more pronounced influence on a higher temperature range of the sintering curve (e.g. a temperature above 1100° C.) while the sintering inhibitor may have a more pronounced influence on a lower temperature range of the sintering curve (e.g., 900 to 1100° C.).

The sintering activator is a metal oxide. The sintering activator may be zinc oxide (ZnO), gallium oxide ($Ga_2O_3$) or a combination thereof. It has been found that zinc oxide or gallium oxide, and especially zinc oxide, may be particularly useful as sintering activator in the context of the present invention. In one embodiment, the sintering activator is zinc oxide, gallium oxide, or a combination thereof. In one preferred embodiment, the sintering activator is zinc oxide. In one embodiment, the top layer comprises a sintering activator which is zinc oxide, gallium oxide, or a combination thereof. In one preferred embodiment, the top layer comprises a sintering activator which is zinc oxide. In one embodiment, the top layer comprises a sintering activator which is not aluminum oxide.

Each one of the layers of the pre-sintered multi-layered dental mill blank may comprise the sintering activator (e.g., zinc oxide, gallium oxide, or a combination thereof). In one embodiment, each one of the layers comprises a sintering activator which is zinc oxide, gallium oxide, or a combination thereof (e.g., zinc oxide).

The top layer may comprise the sintering activator in a weight amount that is higher than in the bottom layer. For instance, a weight amount [wt. %] of the sintering activator in the top layer and a weight amount [wt. %] of the sintering activator in the bottom layer may fulfill the following formula (A) or (B):

$$w(SA\text{-}BL)/w(SA\text{-}TL) \leq 0.85; \quad (A)$$

$$w(SA\text{-}BL)/w(SA\text{-}TL) \leq 0.80; \quad (B)$$

with w(SA-BL) being the weight amount of the sintering activator in the bottom layer, based on the total weight of the bottom layer, and w(SA-TL) being the weight amount of the sintering activator in the top layer, based on the total weight of the top layer.

In one embodiment, the weight amount of the sintering activator decrease layer-by-layer from the top layer to the bottom layer.

The weight amount of the sintering activator in each layer may be adjusted such that at least a part of the sintering curves is aligned to one another, like a part of the sintering curve that relates to the maximum sintering rate. The maximum sintering rate may be determined from a sintering curve of the speed sintering process. A sintering curve may be obtained by plotting the relative densification of a material as a function of the sintering temperature. The maximum sintering rate as used herein is a point of the sintering curve where a tangent line to the curve has a highest negative slope. The maximum sintering rate may be achieved at a temperature T of the speed sintering process.

In one embodiment, the pre-sintered multi-layered dental mill blank is characterized by providing a representative test section for each layer, and the weight amount of the sintering activator in each one of the layers of the pre-sintered multi-layered dental mill blank is adjusted such that each one of the representative test sections, when being fully sintered by a speed sintering process, has a maximum sintering rate at a temperature T, wherein the temperature T for the representative test sections differs by not more than 40° C. or not more than 25° C.

The layers of the pre-sintered dental mill blank may comprise the sintering activator in specific amounts. The top layer may comprise the sintering activator in an amount of at least 0.02 wt. %, at least 0.05 wt. %, at least 0.10 wt. %, or at least 0.15 wt. %, based on the total weight of the top layer. The top layer may comprise the sintering activator in an amount of at most 0.8 wt. %, at most 0.50 wt. %, at most 0.30 wt. %, or at most 0.20 wt. %, based on the total weight of the top layer. The top layer may comprise the sintering activator in an amount in the range of 0.02 to 0.8 wt. %, 0.05 to 0.50 wt. %, 0.10 to 0.30 wt. %, or 0.15 to 0.20 wt. %, based on the total weight of the top layer.

The bottom layer may comprise the sintering activator in an amount of at least 0.02 wt. %, at least 0.05 wt. %, or at least 0.10 wt. %, based on the total weight of the bottom layer. The bottom layer may comprise the sintering activator in an amount of at most 0.80 wt. %, at most 0.50 wt. %, at most 0.30 wt. %, or at most 0.17 wt. %, based on the total weight of the bottom layer. The bottom layer may comprise the sintering activator in an amount in the range of 0.02 to 0.80 wt. %, 0.02 to 0.50 wt. %, 0.05 to 0.30 wt. %, or 0.10 to 0.17 wt. %, based on the total weight of the bottom layer.

Each layer may comprise the sintering activator in an amount of at least 0.02 wt. %, at least 0.05 wt. %, or at least 0.10 wt. %, based on the total weight of the respective layer. Each layer may comprise the sintering activator in an amount of at most 0.8 wt. %, at most 0.50 wt. %, or at most 0.30 wt. %, based on the total weight of the respective layer. Each layer may comprise the sintering activator in an amount in the range of 0.02 to 0.8 wt. %, 0.05 to 0.50 wt. %, or 0.10 to 0.30 wt. %, based on the total weight of respective layer.

The top layer may comprise the sintering activator in a weight amount [wt. %], based on the total weight of the top layer, that is higher by at least 0.010 percent point, at least 0.020 percent point, or at least 0.030 percent point, than a weight amount [wt. %] of the sintering activator being present in the bottom layer, based on the total weight of the bottom layer. The top layer may comprise the sintering activator in a weight amount [wt. %], based on the total weight of the top layer, that is higher at most 0.50 percent point, at most 0.20 percent point, or at most 0.10 percent point, than a weight amount [wt. %] of the sintering activator being present in the bottom layer, based on the total weight of the bottom layer. The top layer may comprise the sintering activator in a weight amount [wt. %], based on the total weight of the top layer, that is higher by in the range of 0.010 to 0.5 percent point, 0.020 to 0.20 percent point, or 0.030 to 0.10 percent point, than a weight amount [wt. %] of the sintering activator being present in the bottom layer, based on the total weight of the bottom layer.

It is to be understood that, when the pre-sintered multi-layered dental mill blank according to an embodiment of the present invention or any one of its layers, is described herein as comprising a specific type of sintering activator (e.g., zinc oxide, gallium oxide, or a combination thereof), this does not exclude that further additional sintering activators may be present (unless explicitly stated so).

2.5 Sintering Inhibitor

The pre-sintered multi-layered dental mill blank may comprise a sintering inhibitor. The sintering inhibitor may be obtainable from a sintering inhibitor precursor. The sintering inhibitor may be obtainable by converting a sintering inhibitor precursor to the sintering inhibitor when pre-sintering a green body of the multi-layered dental mill blank. The sintering inhibitor precursor may be present in a powder layer of a green body. For example, sintering inhibitor precursor may be present on the surface of the powder particles of the powder layer. The sintering inhibitor precursor may be added to an yttria-stabilized zirconia powder or a mixture of yttria-stabilized zirconia powders (e.g., by treating the surface of grains of the powder or powder mixture) as a surface-treating agent before a pre-sintering step.

The pre-sintered multi-layered dental mill blank may comprise the sintering inhibitor in a weight amount of at least 0.1 wt. %, at least 0.2 wt. %, at least 0.3 wt. %, at least 0.5 wt. %, at most 2.5 wt. %, at most 2.0 wt. %, at most 1.5 wt. % or at most 1.2 wt. %, or in the range of 0.1 to 2.5 wt. %, 0.2 to 2.0 wt. %, 0.3 to 1.5 wt. % or 0.5 to 1.2 wt. %, based on the total weight of the pre-sintered multi-layered dental mill blank.

The sintering inhibitor may be present in one or more specific layers of the pre-sintered dental mill blank. The sintering inhibitor can influence the sintering curve of a layer, or a part prepared thereof, predominantly in a lower temperature range (e.g., in the range of 900 to 1100° C.), but also in the range of the maximum shrinkage rate. When a sintering inhibitor is present, the sintering curve of the ceramic material of the layer can be adjusted in a lower temperature range so that the sintering curve is more aligned to a sintering curve in that temperature range of the ceramic material(s) of one or more other layers.

In one embodiment, the bottom layer comprises a sintering inhibitor. In one embodiment, the bottom layer comprises a sintering inhibitor and each one of the at least one intermediate layer comprises a sintering inhibitor. It is also possible that each one of the layers comprises a sintering inhibitor. In one embodiment, a weight content of the sintering inhibitor decreases layer-by-layer from the bottom layer to the top layer.

The bottom layer may comprise the sintering inhibitor in an amount of at least 0.4 wt. %, at least 0.6 wt. %, at least 0.8 wt. %, at most 2.5 wt. %, at most 2.0 wt. %, at most 1.5 wt. %, or in the range of 0.4 to 2.5 wt. %, 0.6 to 2.0 wt. % or 0.8 to 1.5 wt. %, based on the total weight of the bottom layer.

Each one of the at least one intermediate layer may comprise the sintering inhibitor in an amount of at least 0.02 wt. %, at least 0.05 wt. %, at most 2.0 wt. %, at most 1.5 wt. %, at most 1.2, or in the range of 0.02 to 2.0 wt. %, 0.05 to 1.5 wt. % or 0.05 to 1.2 wt. %, based on the total weight of the respective layer of the at least one intermediate layer.

The top layer may comprise the sintering inhibitor in a weight amount of at least 0.01 wt. %, at least 0.02 wt. %, at least 0.05 wt. %, at most 1.0 wt. %, at most 0.8 wt. %, at most 0.5 wt. %, in the range of 0.01 to 1.0 wt. %, 0.02 to 0.8 wt. %, or 0.05 to 0.5 wt. %, based on the total weight of the top layer.

The sintering inhibitor is a metal oxide. The sintering inhibitor may be, but is not necessarily limited to, $La_2O_3$, $Yb_2O_3$, $Tm_2O_3$, type-II-yttria, erbium oxide ($Er_2O_3$), or any combination thereof. In one embodiment, the sintering inhibitor is $La_2O_3$, type-II-yttria, erbium oxide ($Er_2O_3$), or any combination thereof, optionally the sintering inhibitor is type-II-yttria, erbium oxide, or a combination thereof. Preferably, the sintering inhibitor is type-II-yttria, optionally in combination with erbium oxide. In one preferred embodiment, the sintering inhibitor is a combination of type-II-yttria and erbium oxide.

Erbium oxide is also a coloring metal oxide. A weight amount of erbium oxide in the pre-sintered multi-layered dental mill blank or in any one of its layers may vary depending on a pre-shading of the dental mill blank. The layers of a lighter pre-shaded dental mill blank may have a lower erbium oxide content than the layers of a darker pre-shaded dental mill blank. When the sintering inhibitor is a combination of a type-II-yttria and erbium oxide, the weight amount of a type-II-yttria in a layer (e.g., a bottom layer and/or each one of the at least one intermediate layers) may be adjusted to the weight amount of erbium oxide. Thereby, the sintering behavior of a layer, and particularly of the bottom layer, may advantageously be aligned with the sintering behavior of one or more other layers of the mill blank.

In one embodiment, the bottom layer comprises a sintering inhibitor, which is a combination of type-II-yttria and erbium oxide based on the total weight of the bottom layer, and wherein an amount of type-II-yttria in the bottom layer is defined by the following formula:

$$A_{II\text{-}Y\text{-}BL} = A_{BL} - (A_{E\text{-}BL} - A_{E\text{-}TL})$$

wherein
$A_{II\text{-}Y\text{-}BL}$ is the molar amount of type-II-yttria in the bottom layer, $A_{BL}$ is a molar amount of type-II-yttria in the bottom layer that is necessary to achieve a desired adjustment of the sintering curve when erbium oxide is not present (i.e., for a not pre-shaded mill blank), $A_{E\text{-}BL}$ is a molar amount of erbium dioxide in the bottom layer, and $A_{E\text{-}TL}$ is a molar amount of erbium dioxide in the top layer.

$A_{BL}$ may be a molar amount that is equivalent to a weight of type-II-yttria in the range of 0.4 to 1.5 wt. %, 0.6 to 1.2 wt. % or 0.8 to 1.1 wt. %, based on the total weight of the bottom layer. $A_{E\text{-}BL}$ and $A_{E\text{-}TL}$ may be selected to achieve a dental shade, e.g., matching a dental shade of the VITA classical A1-D4® shade guide with VITA Bleached Shades manufactured by Vita Zahnfabrik or a similar dental shade guide system. Additionally or alternatively, $A_{E-BL}$ and $A_{E-TL}$ may be selected such that the representative test sections of the bottom layer and the top layer, when being fully sintered by a speed sintering process, have CIE L*a*b* values as described herein.

The bottom layer may comprise a sintering inhibitor which is a type-II-yttria, optionally in combination with erbium oxide, and the bottom layer may comprise the type-II-yttria in an amount of at least 0.4 wt. %, at least 0.6 wt. %, at least 0.8 wt. %, at most 1.5 wt. %, at most 1.2 wt. %, at most 1.1 wt. %, or in the range of 0.4 to 1.5 wt. %, 0.6 to 1.2 wt. % or 0.8 to 1.1 wt. %, based on the total weight of the bottom layer.

Each one of the at least one intermediate layer may comprise a sintering inhibitor which is a type-II-yttria, optionally in combination with erbium oxide, and each one of the at least one intermediate layer may comprise the type-II-yttria in an amount of at least 0.02 wt. %, at least 0.05 wt. %, at most 1.0 wt. %, at most 0.6 wt. %, or in the range of 0.02 to 1.0 wt. %, 0.05 to 1.0 wt. % or 0.05 to 0.6 wt. %, based on the total weight of the respective layer of the at least one intermediate layer.

The top layer may comprise a sintering inhibitor which is type-II-yttria and/or erbium oxide, and the top layer may comprise the type-II-yttria in a weight amount in the range of 0.00 to 0.03 wt. %, 0.00 to 0.02 wt. %, or 0.00 to 0.01 wt. %, based on the total weight of the top layer. The top layer may essentially be free of type-II-yttria.

The pre-sintered multi-layered dental mill blank may comprise or may be composed of the following layers:
- a top layer L4,
- an intermediate layer L3,
- an intermediate layer L2,
- a bottom layer L1,
  wherein each one of the layers L3 to L1 comprise a sintering inhibitor which is type-II-yttria, optionally in combination with erbium oxide,
  the intermediate layer L3 comprising the type-II-yttria in a weight amount in the range of 0.02 to 0.6 wt. %, 0.05 to 0.4 wt. % or 0.06 to 0.2 wt. %, based on the total weight of the intermediate layer L3,
  the intermediate layer L2 comprising the type-II-yttria in a weight amount in the range of 0.1 to 1.0 wt. %, 0.2 to 0.8 wt. % or 0.4 to 0.6 wt. %, based on the total weight of the intermediate layer L2, and
  the bottom layer L1 comprising the type-II-yttria in a weight amount in the range of 0.4 to 1.5 wt. %, 0.6 to 1.2 wt. % or 0.8 to 1.1 wt. %, based on the total weight of the bottom layer,
  and optionally the top layer L4 comprising type-II-yttria in a weight amount in the range of 0.00 to 0.03 wt. %, 0.00 to 0.02 wt. %, or 0.00 to 0.01 wt. %, based on the total weight of the top layer, or is essentially free of type-II-yttria.

A layer of the pre-sintered multi-layered dental mill blank that comprises a specific amount of type-I-yttria and type-II-yttria may be distinguishable from a comparable layer that comprises the same specific amount of yttria in form of type-I-yttria only, for example, by comparing a fracture toughness (e.g., a fracture toughness $K_{IC}$) of representative test sections, being fully sintered by a speed sintering process as described herein, of those layers. For example, a bottom layer of a pre-sintered multi-layered dental mill blank may comprise 5.6 wt. % of type-I-yttria and 0.9 wt. % of type-II-yttria. A representative test section of that bottom layer, when fully sintered by a speed sintering process, may have a fracture toughness $K_{IC}$-A. A comparable bottom layer of a comparable pre-sintered multi-layered dental mill blank may comprise 6.5 wt. % of type-I-yttria and no type-II-yttria.

A representative test section of that comparable bottom layer, when fully sintered by the same speed sintering process, may have a fracture toughness $K_{IC}$-B. The bottom layer may be distinguishable from the comparable bottom layer in that the fracture toughness $K_{IC}$-A is higher than the fracture toughness $K_{IC}$-B.

It is to be understood that, when the pre-sintered multi-layered dental mill blank according one embodiment of the present invention or any one of its layers, is described herein as comprising a specific sintering inhibitor (e.g., type-II-yttria, erbium oxide or a combination thereof), this does not exclude that further additional sintering inhibitors may be present.

2.6 Colorants

The pre-sintered multi-layered dental mill blank is typically pre-shaded. In one embodiment, the pre-sintered multi-layered dental mill blank is a pre-shaded, pre-sintered multi-layered dental mill blank. The dental mill blank or a layer thereof may be pre-shaded to have a color (or to provide at least a part of a dental restoration prepared from the dental mill blank with a color) that matches a dental shade of the VITA classical A1-D4® shade guide with VITA Bleached Shades manufactured by Vita Zahnfabrik or a similar dental shade guide system. The dental shade may be, but is not limited to, A1, A2, A3.5, A4, B1, B2, B3, B4, C1, C2, C3, C4, D1, D2, D3, D4, BL1 or BL2. The dental shade may also be a dental shade, like a light dental shade, that is not part of the VITA classical A1-D4® shade guide with VITA Bleached Shades manufactured by Vita Zahnfabrik or a similar dental shade guide system. The dental shade may be an experimental light shade.

The pre-sintered multi-layered dental mill blank may comprise coloring metal oxides. Suitable coloring metal oxides may be, but are not limited to, the oxides of Fe, Mn, Cr, Pr, Tb, Er, Yb, Ce, Co, Ni, Nd, Cu, Bi, and any mixture thereof. The coloring metal oxides may be present in a weight amount of at least 0.01 wt. %, at least 0.02 wt. %, at least 0.05 wt. %, at most 1.5 wt. %, at most 1.0 wt. %, at most 0.8 wt. %, or in the range of 0.01 to 1.5 wt. %, 0.02 to 1.0 wt. %, or 0.05 to 0.8 wt. %, based on the total weight of the pre-sintered multi-layered dental mill blank.

The coloring metal oxides may comprise iron oxide. The pre-sintered multi-layered dental mill blank may comprise iron oxide in a weight amount of at least 0.001 wt. %, at least 0.005 wt. %, at least 0.02 wt. %, at most 0.4 wt. %, at most 0.2 wt. %, or at most 0.1 wt. %, or in the range of 0.001 to 0.4 wt. %, 0.005 to 0.2 wt. %, or 0.02 to 0.1 wt. %, based on the total weight of the pre-sintered multi-layered dental mill blank.

The coloring metal oxides may comprise erbium oxide. The pre-sintered multi-layered dental mill blank may comprise erbium oxide in a weight amount of at least 0.01 wt. %, at least 0.02 wt. %, at least 0.05 wt. %, at most 1.2 wt. %, at most 1.0 wt. %, or at most 0.7 wt. %, or in the range of 0.01 to 1.2 wt. %, 0.05 to 1.0 wt. %, or 0.05 to 0.7 wt. %, based on the total weight of the pre-sintered multi-layered dental mill blank.

Each layer of the pre-sintered multi-layered dental mill blank may comprise coloring metal oxides comprising erbium oxide, and optionally iron oxide. Each layer may comprise coloring metal oxides in an amount of at least 0.01 wt. %, 0.02 wt. %, at least 0.05 wt. %, at most 1.5 wt. %, at most 1.2 wt. %, at most 1.0 wt. %, or in the range of 0.01 to 1.5 wt. %, in the range of 0.02 to 1.2 wt. %, or in the range of 0.05 to 1.0 wt. %, based on the total weight of the respective layer.

2.7 Composition of the Combined Layers

As described herein, the pre-sintered multi-layered dental mill blank may comprise different components in different weight amounts. It is to be understood that the different components described herein, including their weight amounts, are also disclosed herein in combination.

In one embodiment, the pre-sintered multi-layered dental mill blank comprises (optionally essentially consists of or consists of)
- 80 to 95 wt. %, like in the range of 85 to 93 wt. %, like in the range of 89 to 91 wt. %, of zirconia,
- ≤5 wt. %, like ≤3 wt. %, like in the range of 0.5 to 3.0 wt. %, of hafnium dioxide,
- 5.0 to 10.0 wt. %, like in the range of 6.0 to 9.0 wt. %, like in the range of 6.5 to 8.5 wt. %, of yttria,
- ≤0.4 wt. %, like in the range of 0.02 to 0.2 wt. %, like in the range of 0.05 to 0.1 wt. %, of aluminum oxide,
- 0.01 to 1.5 wt. %, like in the range of 0.02 to 1.0 wt. %, like in the range of 0.05 to 0.8 wt. %, of coloring metal oxides,
- 0.02 to 0.8 wt. %, 0.05 to 0.45 wt. %, 0.10 to 0.30 wt. % of a sintering activator (e.g., zinc oxide, gallium oxide, or a combination thereof),
- based on the total weight of the pre-sintered multi-layered dental mill blank, and wherein the weight amounts of the components are optionally selected to add up to 100 wt. %.

In one embodiment, the pre-sintered multi-layered dental mill blank comprises (optionally essentially consists of or consists of)
- 80 to 95 wt. %, like in the range of 85 to 93 wt. %, like in the range of 89 to 91 wt. %, of zirconia,
- ≤5 wt. %, like ≤3 wt. %, like in the range of 0.5 to 3.0 wt. %, of hafnium dioxide,
- 5.0 to 10.0 wt. %, like in the range of 6.0 to 9.0 wt. %, like in the range of 6.5 to 8.5 wt. %, of yttria,
- ≤0.4 wt. %, like in the range of 0.02 to 0.2 wt. %, like in the range of 0.05 to 0.1 wt. %, of aluminum oxide,
- 0.01 to 1.5 wt. %, like in the range of 0.02 to 1.0 wt. %, like in the range of 0.05 to 0.8 wt. %, of coloring metal oxides,
- 0.02 to 0.8 wt. %, 0.05 to 0.45 wt. %, 0.10 to 0.30 wt. % of a sintering activator (e.g., zinc oxide, gallium oxide, or a combination thereof),
- 0.1 to 2.0 wt. %, like in the range of 0.2 to 1.5 wt. %, like in the range of 0.4 to 1.2 wt. %, of a sintering inhibitor,
- based on the total weight of the pre-sintered multi-layered dental mill blank, and wherein the weight amounts of the components are optionally selected to add up to 100 wt. %.

In one embodiment, the pre-sintered multi-layered dental mill blank comprises (optionally essentially consists of or consists of)
- 80 to 95 wt. %, like in the range of 85 to 93 wt. %, like in the range of 89 to 91 wt. %, of zirconia,
- ≤5 wt. %, like ≤3 wt. %, like in the range of 0.5 to 3.0 wt. %, of hafnium dioxide,
- 5.0 to 10.0 wt. %, like in the range of 6.0 to 9.0 wt. %, like in the range of 6.5 to 8.5 wt. %, of yttria,
- ≤0.4 wt. %, like in the range of 0.02 to 0.2 wt. %, like in the range of 0.05 to 0.1 wt. %, of aluminum oxide,
- 0.01 to 1.5 wt. %, like in the range of 0.02 to 1.0 wt. %, like in the range of 0.05 to 0.8 wt. %, of coloring metal oxides,
- 0.02 to 0.8 wt. %, 0.05 to 0.45 wt. %, 0.10 to 0.30 wt. % of a sintering activator (e.g., zinc oxide, gallium oxide, or a combination thereof),
- based on the total weight of the pre-sintered multi-layered dental mill blank,
- wherein the yttria comprises type-II-yttria being a sintering inhibitor,
- the pre-sintered multi-layered dental mill blank comprises the type-II-yttria in an amount of 0.1 to 1.5 wt. %, like in the range of 0.2 to 1.2 wt. %, like in the range of 0.4 to 1.0 wt. %, based on the total weight of the pre-sintered multi-layered dental mill blank, and
- wherein the weight amounts of the components are optionally selected to add up to 100 wt. %.

In one embodiment, the pre-sintered multi-layered dental mill blank comprises (optionally essentially consists of or consists of)
- 80 to 94 wt. %, like in the range of 85 to 93 wt. %, like in the range of 89 to 91 wt. %, of zirconia,
- ≤5 wt. %, like ≤3 wt. %, like in the range of 0.5 to 3.0 wt. %, of hafnium dioxide,
- 5.0 to 10.0 wt. %, like in the range of 6.0 to 9.0 wt. %, like in the range of 6.5 to 8.5 wt. %, of yttria,
- ≤0.4 wt. %, like in the range of 0.02 to 0.2 wt. %, like in the range of 0.05 to 0.1 wt. %, of aluminum oxide,
- 0.01 to 1.5 wt. %, like in the range of 0.02 to 1.0 wt. %, like in the range of 0.05 to 0.8 wt. %, of coloring metal oxides,
- 0.02 to 0.8 wt. %, 0.05 to 0.45 wt. %, 0.10 to 0.30 wt. % of a sintering activator (e.g., zinc oxide, gallium oxide, or a combination thereof),
- based on the total weight of the pre-sintered multi-layered dental mill blank,
- wherein the yttria comprises type-II-yttria being a sintering inhibitor, and the coloring metal oxides comprise erbium oxide being a sintering inhibitor, and the pre-sintered multi-layered dental mill blank comprises a combined of type-II-yttria and erbium dioxide in the range of 0.1 to 2.0 wt. %, like in the range of 0.2 to 1.5 wt. %, like in the range of 0.4 to 1.2 wt. %, based on the total weight of the pre-sintered multi-layered dental mill blank,
- wherein the weight amounts of the components are optionally selected to add up to 100 wt. %.

In one embodiment, the pre-sintered multi-layered dental mill blank comprises (optionally essentially consists of or consists of)
- 80 to 94 wt. %, like in the range of 85 to 93 wt. %, like in the range of 89 to 91 wt. %, of zirconia,
- ≤5 wt. %, like ≤3 wt. %, like in the range of 0.5 to 3.0 wt. %, of hafnium dioxide,
- 5.0 to 10.0 wt. %, like in the range of 5.5 to 8.5 wt. %, like in the range of 6.0 to 8.0 wt. %, of a type-I-yttria,
- ≤0.4 wt. %, like in the range of 0.02 to 0.2 wt. %, like in the range of 0.05 to 0.1 wt. %, of aluminum oxide,
- 0.01 to 1.5 wt. %, like in the range of 0.02 to 1.0 wt. %, like in the range of 0.05 to 0.8 wt. %, of coloring metal oxides,
- 0.02 to 0.8 wt. %, 0.05 to 0.45 wt. %, 0.10 to 0.30 wt. % of a sintering activator (e.g., zinc oxide, gallium oxide, or a combination thereof),
- 0.1 to 2.0 wt. %, like in the range of 0.2 to 1.5 wt. %, like in the range of 0.4 to 1.2 wt. %, of a sintering inhibitor (e.g., a combination of type-II-yttria and erbium oxide),
- based on the total weight of the pre-sintered multi-layered dental mill blank, wherein the weight amounts of the components are optionally selected to add up to 100 wt. %.

2.8 Composition Per Layer

As described herein, each one of the layers may comprise different components in different weight amounts. It is to be understood that the different components of each one of the layers as described herein, including their weight amounts, are also disclosed herein in combination. It is further to be understood that the different layers as described herein are also disclosed herein in combination.

As described above, the sintering activator may be combined with a sintering inhibitor in selected layers of the pre-sintered dental mill blank. By combining sintering activator and sintering inhibitor, the sintering curve of the ceramic material of a layer can be adjusted so that different parts of the sintering curve (pertaining to different temperature ranges of the sintering) are more aligned with the respective parts of the sintering curve of the ceramic material(s) of one or more of the other layers.

In one embodiment, the pre-sintered multi-layered dental mill blank is characterized by providing a representative test section for each layer, the representative test section of the top layer and the representative test section of the bottom layer, when being fully sintered by a speed sintering process as defined herein above, each has a maximum sintering rate at a temperature T of the speed sintering process, and the temperature T for the top layer ($T_{TL}$) and the bottom layer ($T_{BL}$) differing by not more than 40° C. or not more than 25° C. In one embodiment, the pre-sintered multi-layered dental mill blank is characterized by providing a representative test section for each layer, each one of the representative test sections, when being fully sintered by a speed sintering process as defined herein above, has a maximum sintering rate at a temperature T of the speed sintering process, and wherein the temperature T for each one of the layers differs by not more than 40° C. or not more than 25° C.

In one embodiment, the pre-sintered multi-layered dental mill blank comprises
 a top layer,
 a bottom layer, and
 at least one intermediate layer,
 each layer comprising a sintering activator (e.g., zinc oxide, gallium oxide, or a combination thereof), and
 the bottom layer, and optionally each one of the at least one intermediate layer, comprising a sintering inhibitor (e.g., type-II-yttria).

In one embodiment, the pre-sintered multi-layered dental mill blank comprises
 a top layer,
 a bottom layer, and
 at least one intermediate layer,
 each layer comprising zirconia and yttria, wherein the yttria content of the layers increases layer-by-layer from the bottom layer to the top layer,
 each layer comprising a sintering activator (e.g., zinc oxide, gallium oxide, or a combination thereof),
 optionally each layer comprising coloring metal oxides, and
 the bottom layer, and optionally each one of the at least one intermediate layer, comprising a sintering inhibitor (e.g., type-II-yttria).

In one embodiment, the top layer comprises (optionally essentially consists or consists of)
 80 to 92 wt. %, like in the range of 85 to 91 wt. %, like in the range of 87 to 90 wt. %, of zirconia,
 ≤5.0 wt. %, like≤3.0 wt. %, like in the range of 0.5 to 3.0 wt. %, of hafnium dioxide,
 7.0 to 13.0 wt. %, like in the range of 8.0 to 12.0 wt. %, like in the range of 9.0 to 11.0 wt. %, of yttria,
 <0.01 wt. % of aluminum oxide,
 0.01 to 1.5 wt. %, like in the range of 0.02 to 1.2 wt. %, like in the range of 0.05 to 1.0 wt. %, of coloring metal oxides,
 0.02 to 0.80 wt. %, like in the range of 0.02 to 0.50 wt. %, like in the range of 0.10 to 0.30 wt. %, of a sintering activator (e.g., zinc oxide, gallium oxide, or a combination thereof),
 based on the total weight of the top layer, wherein the weight amounts of the components are optionally selected to add up to 100 wt. %.

In one embodiment, the bottom layer comprises (optionally essentially consists of or consists of)
 85 to 94 wt. %, like in the range of 88 to 94 wt. %, like in the range of 90 to 92 wt. %, of zirconia,
 ≤5.0 wt. %, like ≤3.0 wt. %, like in the range of 0.5 to 3.0 wt. %, of hafnium dioxide,
 0.01 to 0.50 wt. %, like in the range of 0.02 to 0.40 wt. %, like in the range of 0.05 to 0.20 wt. %, of aluminum oxide,
 4.0 to 9.0 wt. %, like in the range of 5.0 to 8.0 wt. %, like in the range of 5.5 to 7.5 wt. %, of yttria,
 0.01 to 1.5 wt. %, like in the range of 0.02 to 1.2 wt. %, like in the range of 0.05 to 1.0 wt. %, of coloring metal oxides,
 0.02 to 0.80 wt. %, like in the range of 0.02 to 0.50 wt. %, like in the range of 0.05 to 0.30 wt. %, of a sintering activator (e.g., zinc oxide, gallium oxide, or a combination thereof),
 based on the total weight of the bottom layer, wherein the weight amounts of the components are optionally selected to add up to 100 wt. %.

The yttria of the bottom layer may comprise type-II-yttria being a sintering inhibitor, and the bottom layer may comprise the type-II-yttria in an amount in the range of 0.4 to 1.5 wt. %, like in the range of 0.6 to 1.2 wt. %, like in the range of 0.8 to 1.1 wt. %, based on the total weight of the bottom layer.

In one embodiment, each one of the at least one intermediate layer comprises (optionally essentially consists of or consists of)
 82 to 94 wt. %, like in the range of 85 to 93 wt. %, like in the range of 87 to 92 wt. %, of zirconia,
 ≤5.0 wt. %, like ≤3.0 wt. %, like in the range of 0.5 to 3.0 wt. %, of hafnium dioxide,
 0.01 to 0.50 wt. %, like in the range of 0.02 to 0.20 wt. %, like in the range of 0.02 to 0.15 wt. % of aluminum oxide,
 5.0 to 11.0 wt. %, like in the range of 6.0 to 10.5 wt. %, like in the range of 6.5 to 10.0 wt. %, of yttria,
 0.01 to 1.5 wt. %, like in the range of 0.02 to 1.2 wt. %, like in the range of 0.05 to 1.0 wt. %, of coloring metal oxides,
 0.02 to 0.80 wt. %, like in the range of 0.02 to 0.50 wt. %, like in the range of 0.05 to 0.30 wt. %, of zinc oxide, gallium oxide, or a combination thereof,
 based on the total weight of the respective layer of the at least one intermediate layer, wherein the weight amounts of the components are optionally selected to add up to 100 wt. %.

The yttria in each one of the at least one intermediate layer may comprise type-II-yttria being a sintering inhibitor, and each one of the at least one intermediate layer may comprise the type-II-yttria in an amount in the range of 0.02 to 1.0 wt. %, like in the range of 0.05 to 1.0 wt. %, like in the range of 0.05 to 0.6 wt. %, based on the total weight of the respective layer of the at least one intermediate layer.

In one embodiment, the pre-sintered multi-layered dental mill blank comprises the following layers:
a top layer L4,
an intermediate layer L3,
an intermediate layer L2, and
a bottom layer L1,
and the layers L4 to L1 comprise the components as defined in Table I herein below, wherein the indicated weight amounts are based on the total weight of the respective layer.

TABLE I

| Layer | Combined amount of $ZrO_2$ and $HfO_2$ [wt. %] | $Al_2O_3$ [wt. %] | $Y_2O_3$ [wt. %] | Coloring metal oxides [wt. %] | ZnO [wt. %] |
|---|---|---|---|---|---|
| L4 | >87 | <0.01 | 9-12 | 0.02-1.5 | 0.02-0.80 |
| L3 | >88 | 0.02-0.20 | 8-10 | 0.02-1.5 | 0.02-0.80 |
| L2 | >90 | 0.05-0.50 | 6-8 | 0.02-1.5 | 0.02-0.80 |
| L1 | >90 | 0.05-0.50 | 5-7 | 0.02-1.5 | 0.02-0.80 |

In one embodiment, the pre-sintered multi-layered dental mill blank comprises the following layers:
a top layer L4,
an intermediate layer L3,
an intermediate layer L2, and
a bottom layer L1,
and the layers L4 to L1 comprise the components as defined in Table II herein below, wherein the indicated weight amounts are based on the total weight of the respective layer.

TABLE II

| Layer | Combined amount of $ZrO_2$ and $HfO_2$ [wt. %] | $Al_2O_3$ [wt. %] | $Y_2O_3$ [wt. %] | Coloring metal oxides [wt. %] | ZnO [wt. %] |
|---|---|---|---|---|---|
| L4 | >87 | <0.01 | 9-12 | 0.02-1.0 | 0.05-0.50 |
| L3 | >88 | 0.02-0.20 | 8-10 | 0.02-1.0 | 0.05-0.50 |
| L2 | >90 | 0.05-0.30 | 6-8 | 0.02-1.0 | 0.05-0.50 |
| L1 | >90 | 0.05-0.30 | 5-7 | 0.02-1.0 | 0.05-0.50 |

In one embodiment, the pre-sintered multi-layered dental mill blank comprises the following layers:
a top layer L4,
an intermediate layer L3,
an intermediate layer L2, and
a bottom layer L1,
and the layers L4 to L1 comprising the components as defined in Table III herein below, wherein the indicated weight amounts are based on the total weight of the respective layer.

TABLE III

| Layer | $ZrO_2$ [wt. %] | $HfO_2$ [wt. %] | $Al_2O_3$ [wt. %] | $Y_2O_3$ [wt. %] | Coloring metal oxides [wt. %] | ZnO [wt. %] |
|---|---|---|---|---|---|---|
| L4 | 87.5-89.0 | 1.5-2.0 | <0.01 | 9.2-10.2 | 0.05-0.7 | 0.10-0.30 |
| L3 | 88.0-89.5 | 1.5-2.0 | 0.02-0.10 | 8.7-9.7 | 0.05-0.7 | 0.10-0.30 |
| L2 | 90.0-91.5 | 1.5-2.0 | 0.05-0.20 | 6.5-7.5 | 0.05-0.7 | 0.05-0.25 |
| L1 | 90.5-92.0 | 1.5-2.0 | 0.05-0.20 | 6.0-7.0 | 0.05-0.8 | 0.05-0.25 |

The weight amounts of the components being present in each one of layers L1 to L4 as defined in any one of tables I to III may be selected to add up to 100 wt. %.

The layers L4 to L1 as defined in any one of tables I and II may have an yttria content that increases layer-by-layer from layer L1 to layer L4.

The layers L4 to L1 as defined in any one of tables I to III may essentially consist of or may consist of the components defined in the respective table.

The coloring metal oxides being present in each one of the layers L4 to L1 as defined in any one of tables I and II may comprise erbium oxide being a sintering inhibitor.

The yttria being present in each one of layers L3 to L1 as defined in any one of table I to III may comprise type-II-yttria being a sintering inhibitor, and optionally wherein
the intermediate layer L3 comprises the type-II-yttria in a weight amount in the range of 0.02 to 0.6 wt. %, 0.05 to 0.4 wt. % or 0.06 to 0.2 wt. %, based on the total weight of the intermediate layer L3,
the intermediate layer L2 comprises the type-II-yttria in a weight amount in the range of 0.1 to 1.0 wt. %, 0.2 to 0.8 wt. % or 0.4 to 0.6 wt. %, based on the total weight of the intermediate layer L2,
the bottom layer L1 comprises the type-II-yttria in a weight amount in the range of 0.4 to 1.5 wt. %, 0.6 to 1.2 wt. % or 0.8 to 1.1 wt. %, based on the total weight of the bottom layer L1, and
the type-II-yttria content decreases layer-by-layer from layer L3 to layer L1.

Any one of the layers may comprise unavoidable impurities (e.g., $SiO_2$, CaO, $TiO_2$, or $Na_2O$), e.g., in a combined amount below 0.1 wt. %, based on the total weight of the respective layer.

3. Form, Structure and Layering

The pre-sintered multi-layered dental mill blank according to the present invention comprises a top layer, a bottom layer, and at least one intermediate layer.

The number of the at least one intermediate layer may be in the range of from 1 to 10 intermediate layers, like in the range of from 1 to 5 intermediate layers. For instance, the pre-sintered multi-layered dental mill blank may comprise one, two or three intermediate layers. In one embodiment, the pre-sintered multi-layered dental mill blank comprises two intermediate layers.

For instance, the pre-sintered multi-layered dental mill blank may comprise the following layers: a top layer L4, an intermediate layer L3, an intermediate layer L2, and a bottom layer L1. The numbering of the layers L4 to L1 is to be understood as defining the stacking order of the layers in the pre-sintered multi-layered dental mill blank (i.e., the order of layers L4 to L1 is L4 then L3 then L2 then L1). The term "comprise" in this context is to be understood in that the pre-sintered multi-layered dental mill blank may contain one or more additional intermediate layers that are located, e.g., between layer L4 and L3, between layer L3 and L2, etc. The pre-sintered multi-layered dental mill blank may be composed of the following layers: a top layer L4, an intermediate layer L3, an intermediate layer L2, and a bottom layer L1. The term "composed of" in this context is to be understood that the pre-sintered multi-layered dental mill blank only contains said layers L4 to L1.

The layers of the pre-sintered multi-layered dental mill blank are not particularly limited in terms of their dimensions and shapes as long as the dental mill blank is suitable for use for preparing a dental restoration precursor (e.g., using a CAD/CAM process). One or more of the layers may be non-planar. For example, one or more layers may have one or two faces (e.g., an interface between two layers or an outside surface depending on the location of the layer in the mill blank) that are curved, e.g., that have a positive or negative curvature (e.g., being convex or concave). It is also possible that one or more of the layers have a height that increases uniformly or non-uniformly over at least a part of the layer (e.g., in a conical form).

One or more of the layers, optionally all of the layers, may be substantially planar. In that context, "substantially planar" means that a layer is planar, subject to a tolerance of 5% of an average thickness of the layer. One or more of the layers, optionally all of the layers, may be substantially planar over a width and length of at least 70%, at least 80% at least 90%, or at least 95%, relative the total width and length (x- and y-direction) of the layer. Due to an inevitable, imperfect pressing of a green body, it may be possible that a layer that is substantially planar over a main part of its width and length shows a curving on an outer part being located on the surface of the dental mill blank. Such a curving may be seen in the comparative mill blank on the left of FIG. 2.

The layers of the pre-sintered multi-layered dental mill blank may be arranged such that the boundaries of the layers are substantially parallel to each other.

Each one of the layers of the pre-sintered multi-layered dental mill blank may have a specific height relative to the overall height of the dental mill blank. The overall height of the dental mill blank can be understood as the dimension of the dental mill blank in stacking direction (z-direction) of the layers. For example, for rectangular or disc-shaped dental mill blanks, and the like, the overall height can be determined as a distance of a perpendicular line between an outer surface of the top layer to an opposing outer surface of the bottom layer, the perpendicular line intersecting all layers of the dental mill blank. The height of a layer is to be understood as a maximum height of a layer in the stacking direction (z-direction) of the layers. This is irrespective of whether a relative height or an absolute height is defined herein. Thus, the definition of a height of a layer (e.g., a relative height or an absolute height) as used herein does not necessarily mean that the height of the layer is constant, although this is possible.

Each one of the layers may have a substantially constant height. A "substantially constant height" means that the height of a layer does not vary by more than 5%, relative to an average height of the layer.

The bottom layer may have a height of at least 30%, at least 40%, at least 45%, at least 50%, or at least 52%, relative to the overall height of the pre-sintered multi-layered dental mill blank. The bottom layer may have a height of at most 75%, at most 70%, at most 68%, or at most 66%, relative to the overall height of the pre-sintered multi-layered dental mill blank. The bottom layer may have a height in the range of 30 to 75%, 40 to 75%, 45 to 70%, 50 to 68%, or 52 to 66%, relative to the overall height of the pre-sintered multi-layered dental mill blank. In one embodiment, the bottom layer has a height of 52 to 66%, relative to the overall height of the pre-sintered multi-layered dental mill blank.

The sum of the height of the bottom layer and an adjacent intermediate layer may be at least 55%, at least 60%, or at least 65%, relative to the overall height of the pre-sintered multi-layered dental mill blank. The sum of the height of the bottom layer and an adjacent intermediate layer may be at most 85%, at most 80% or at most 75%, relative to the overall height of the pre-sintered multi-layered dental mill blank. The sum of the height of the bottom layer and an adjacent intermediate layer may be in the range of 55 to 85%, 60 to 80%, 65 to 75%, relative to the overall height of the pre-sintered multi-layered dental mill blank. In one embodiment, the sum of the height of the bottom layer and an adjacent intermediate layer may be in the range of 60 to 80%, relative to the overall height of the pre-sintered multi-layered dental mill blank.

The top layer may have a height of at least 8%, at least 10%, at least 12%, at least 15%, or at least 17%, relative to the overall height of the pre-sintered multi-layered dental mill blank. The top layer may have a height of at most 35%, at most 30%, at most 28%, at most 25%, or at most 23%, relative to the overall height of the pre-sintered multi-layered dental mill blank. The top layer may have a height in the range of 8 to 35%, 10 to 30%, 12 to 28%, 15 to 25%, or 17 to 23%, relative to the overall height of the pre-sintered multi-layered dental mill blank. In one embodiment, the top layer has a height in the range of 17 to 23%, relative to the overall height of the pre-sintered multi-layered dental mill blank.

Each one of the at least one intermediate layer may have a height of at least 2%, at least 4%, at least 6%, or at least 8%, relative to the overall height of the pre-sintered multi-layered dental mill blank. Each one of the at least one intermediate layer may have a height of at most 25%, at most 20%, at most 15%, or at most 12%, relative to the overall height of the pre-sintered multi-layered dental mill blank. Each of the at least one intermediate layer may have a height in the range of 2 to 25%, 4 to 20%, 6 to 15% or 8 to 12%, relative to the overall height of the pre-sintered multi-layered dental mill blank. In one embodiment, each one of the at least one intermediate layer has a height in the range of 8 to 12%, relative to the overall height of the pre-sintered multi-layered dental mill blank.

The combined intermediate layers may have a height of at least 5%, at least 10%, at least 14% or at least 16%, relative to the overall height of the pre-sintered multi-layered dental mill blank. The combined intermediate layers may have a height of at most 40%, at most 30%, at most 26% or at most 25%, relative to the overall height of the pre-sintered multi-layered dental mill blank. The combined intermediate layers may have a height in the range of 5 to 40%, 10 to 30%, 14 to 26% or 16 to 25%, relative to the overall height of the pre-sintered multi-layered dental mill blank. In one embodiment, the combined intermediate layers have a height in the range of 16 to 25%, relative to the overall height of the pre-sintered multi-layered dental mill blank.

According to one embodiment, the pre-sintered multi-layered dental mill blank is composed of the following layers:
  a top layer L4 having a height in the range of 12 to 28%, like in the range of 15 to 25%, like in the range of 17.5 to 23.5%,
  an intermediate layer L3 having a height in the range of 4 to 20%, like in the range of 6 to 15%, like in the range of 8.5 to 12%, an intermediate layer L2 having a height in the range of 4 to 20%, like in the range of 6 to 15%, like in the range of 8.5 to 12%, and a bottom layer L1 having a height in the range of 45 to 70%, like in the range of 50 to 68%, like in the range of 52.5 to 65.5%, wherein the heights of the layers are all relative to the overall height of the pre-sintered multi-layered dental mill blank and are selected to sum up to 100%.

Additionally or alternatively, each one of the layers of the pre-sintered dental mill blank may be defined by an absolute height, e.g., expressed in millimeters.

The bottom layer may have a height of at least 5 mm, at least 7 mm, or at least 9 mm. The bottom layer may have a height of at most 20 mm, at most 15 mm, or at most 12 mm. The bottom layer may have a height in the range of 5 to 20 mm, 7 to 15 mm, 9 to 12 mm. The top layer may have a height of at least 1 mm, at least 2 mm, or at least 3 mm. The top layer may have a height of at most 8 mm, at most 5 mm, or at most 4 mm. The top layer may have a height in the range of 1 to 8 mm, 2 to 5 mm, or 3 to 4 mm. Each one of the at least one intermediate layer may have a height in the range of 1 to 3 mm, like in the range of 1.5 to 2.0 mm. The combined intermediate layers may have a height of at least 2 mm, at least 3 mm, at most 6 mm or at most 4 mm, like in a range of 2 to 6 mm or 3 to 4 mm.

According to one embodiment, the pre-sintered multi-layered dental mill blank is composed of the following layers:

a top layer L4 having a height in the range of 2 to 5 mm (e.g., 3 to 4 mm), an intermediate layer L3 having a height in the range of 1 to 3 mm (e.g., about 1.5 mm or about 2 mm), an intermediate layer L2 having a height in the range of 1 to 3 mm (e.g., about 1.5 mm or about 2 mm), a bottom layer L1 having a height in the range of 5 to 20 mm (e.g. in the range of 7 to 15 mm).

The pre-sintered multi-layered dental mill blank is not particularly limited as regards its shape or its dimensions as long as it is suitable for use for preparing a dental restoration precursor (e.g., using a CAD/CAM process). The pre-sintered multi-layered dental mill blank may have, but is not limited to, the form of rectangular block, a disc, a cylinder, a dental preform (e.g., an abutment preform or a tooth sector), a cone, a cone segment, a pyramid, or a pyramid segment. In one embodiment, the pre-sintered multi-layered dental mill blank has the form of a disc, a cylinder or a rectangular block. For example, the pre-sintered multi-layered dental mill blank may be, but is not limited to, a disc with a height in the range of 8 to 30 mm (e.g., about 10 mm, 12 mm, 14 mm, 16 mm, 18 mm, 20 mm, 25 mm), like in the range of 14 to 22 mm, and a diameter in the range of 70 to 150 mm, like in the range of 90 to 110 mm, like about 98 mm.

The pre-sintered multi-layered dental mill blank may be porous or may have a porous structure, and in particular may be open-porous or may have an open-porous structure. The density of the pre-sintered multi-layered dental mill blank, relative to its theoretical density, may be at least 45%, at least 50% at least 52%, at most 70%, at most 60%, at most 55%, like in a range of 45 to 70% (e.g., 45 to 55%), 50 to 60%, or 52 to 55% (e.g., about 52% or about 53%). In one embodiment, the density of the pre-sintered multi-layered dental mill blank, relative to its theoretical density, is in the range of 45 to 55%. In one embodiment, the density of the pre-sintered multi-layered dental mill blank, relative to its theoretical density, is equal to or less than 53% (e.g., 45 to 53% or 45 to 52%).

The pre-sintered multi-layered dental mill blank may be obtainable by pre-sintering a green body of the pre-sintered multi-layered dental mill blank at a maximum pre-sintering temperature of at least 700° C., at least 750° ° C., at least 800° C., at least 825° C., at most 1100° C., at most 1000° C., at most 950° C., at most 900° C., like in the range of 700 to 1100° C., in the range of 750 to 1000° C., in the range of 800 to 950° C. or in the range of 825 to 900° C. In one embodiment, the pre-sintered multi-layered dental mill blank may be obtainable by pre-sintering a green body of the pre-sintered multi-layered dental mill blank at a maximum pre-sintering temperature in the range of 800 to 950° C., like in the range of 825 to 900° C. The maximum pre-sintering temperature may be achieved by heating the green body over a time period of at least 30 hours or at least 40 hours, like in the range of 40 to 50 hours. Thus, the heating is typically carried out using a low heating rate, e.g., in the range of 0.05 to 2K/min or in the range of 0.1 to 1.5 K/min. The heating may be carried out stepwise using different heating steps with different heating rates in the range of 0.05 to 2K/min or in the range of 0.1 to 1.5 K/min. The maximum pre-sintering temperature may be held for a time period in the range of 1 to 5 hours, like in the range of 2 to 3 hours.

The green body may be a compacted green body, like a pressed green body (e.g., uniaxially pressed green body) that is obtainable using a compacting pressure in the range of 200 to 400 MPa, like in a range of 250 to 350 MPa.

One embodiment of the present invention provides a pre-sintered multi-layered dental mill blank that is obtainable by a process for preparing a pre-sintered multi-layered dental mill blank according to one embodiment of the present invention. The process is described in further detail in the following section.

II. Process for Preparing a Pre-Sintered Multi-Layered Dental Mill Blank

One aspect of the present invention provides a process for preparing a pre-sintered multi-layered dental mill blank, the process comprising the steps of:

a) providing three yttria-stabilized zirconia powders P1 to P3, powder P1 having an yttria content in the range of 4.5 to 6.1 wt. %, powder P2 having an yttria content in the range of 6.2 to 7.9 wt. %, and powder P3 having an yttria content in the range of 8.0 to 11.0 wt. %, b) preparing a green body comprising:

a top powder layer of powder P3, at least one intermediate powder layer of a powder mixture being selected from a mixture of powders P2/P3 and a mixture of powders P1/P2, a bottom powder layer of powder P1 or of a mixture of powders P1/P2, c) pre-sintering the green body to provide a pre-sintered multi-layered dental mill blank.

It has been found that a pre-sintered multi-layered dental mill blank that is based on the mixing pattern of powders P1 to P3 of the process according to an embodiment of the present invention may be particularly suitable for preparing a dental restoration having a desirable optical appearance and a comparatively large difference in one or more properties between an incisal or occlusal zone and a dentin zone of the dental restoration.

The expression "a top powder layer of powder P3" is to be understood in that the top powder layer does not contain a yttria-stabilized zirconia powder having a different yttria content than a powder P3. This does not exclude that a powder P3 may be a blend of different yttria-stabilized zirconia powder having an yttria content in the range of 8.0 to 11.0 wt. %. The expressions "an intermediate powder layer of a mixture of powders P2/P3", "a bottom powder layer of powder P1", and so on, are to be understood in the same way mutatis mutandis.

In one embodiment, the green body is composed of:
a top powder layer of powder P3,
at least one intermediate powder layer of a powder mixture being selected from a mixture of powders P2/P3 and a mixture of powders P1/P2,
a bottom powder layer of powder P1 or of a mixture of powders P1/P2.

In one embodiment, the green body is composed of:
a top powder layer of powder P3,
an intermediate powder layer of a mixture of powders P2/P3,
an intermediate powder layer of a mixture of powders P1/P2,
a bottom powder layer of powder P1.

Each one of powders P1 to P3 may have a combined amount of zirconia, yttria and hafnium dioxide of at least 95 wt. %, at least 98 wt. %, at least 99 wt. %, or in the range of 95 to 99.9 wt. %, in the range of 98 to 99.9 wt. %, or in the range of 99 to 99.8 wt. %, based on the total weight of the respective powder. Powder P1 and/or P2 may comprise aluminum oxide in an amount of at most 0.40 wt. %, at most 0.30 wt. %, or at most 0.20 wt. %, or in the range of 0.01 to 0.40 wt. %, in the range of 0.02 to 0.30 wt. % or in the range of 0.04 to 0.20 wt. %, based on the total weight of the respective powder. Powder P3 may comprise aluminum oxide in an amount of less than 0.05 wt. %, like less than 0.02 wt. %, like less than 0.01 wt. %, based on the total weight of powder P3.

The yttria content (in wt. %) of powders P1 and P2 and the yttria content (in wt. %) of powders P2 and P3 may differ by at least 0.7 percent point, at least 1.0 percent point, at least 1.2 percent points, at most 3.0 percent points, at most 2.8 percent points, at most 2.5 percent points, in the range of 0.7 to 3.0 percent points, in the range of 1.0 to 2.8 percent points, or in the range of 1.2 to 2.5 percent points. Powder P1 may have an yttria content in the range of 4.9 to 6.0 wt. %. Powder P2 may have an yttria content in the range of 6.5 to 7.6 wt. %. Powder P3 may have an yttria content in the range of 9.0 to 10.5 wt. %.

The mixture of powders P2/P3 may contain powders P2 and P3 in a weight ratio [powder P2:powder P3] in the range of 10:90 to 40:60, in the range of 15:85 to 35:65, or in the range of 20:80 to 30:70. The mixture of powders P1/P2 may contain powders P1 and P2 in a weight ratio [powder P1:powder P2] in the range of 10:90 to 40:60, in the range of 15:85 to 35:65, or in the range of 20:80 to 30:70. In one embodiment, the mixture of powders P2/P3 may contain powders P2 and P3 in a weight ratio [powder P2:powder P3] in the range of 10:90 to 40:60, in the range of 15:85 to 35:65, or in the range of 20:80 to 30:70, and the mixture of powders P1/P2 may contain powders P1 and P2 in a weight ratio [powder P1:powder P2] in the range of 10:90 to 40:60, in the range of 15:85 to 35:65, or in the range of 20:80 to 30:70.

The process may comprise adding one or more additives selected from the group consisting of sintering inhibitor precursors, sintering inhibitor precursors, and coloring additives, to the powders P1 to P3 or to the mixtures thereof. Thus, the powders P1 to P3 or the mixtures thereof being present in the different powder layers of the green body may be or may have been treated, e.g., surface-treated, with one or more additives selected from the group consisting of sintering inhibitor precursors, sintering inhibitor precursors, and coloring additives. The one or more additives may be added in form of an aqueous suspension, typically in form of an aqueous solution.

The one or more additives may be added at different stages of the process. For example, the one or more additives may be added to the powders P1 to P3 before preparing the powder mixtures of powders P1/P2 and powders P2/P3. However, it is also possible to first prepare the powder mixtures of powders P1/P2 and powders P2/P3, and then add the one or more additives to the powder mixtures of powders P1/P2 and powders P2/P3 and to powders P1 and/or P3. In one embodiment, the one or more additives are added to the powders P1 to P3 before preparing powder mixtures of powders P1/P2 and powders P2/P3.

The process may comprise adding a sintering activator precursor to at least powder P3 or a mixture thereof. The process may comprise adding a sintering activator precursor to the powders P1 to P3 or to the mixtures thereof, typically before preparing the green body. Thus, the powders P1 to P3 or the mixtures thereof being present in the different powder layers of the green body may have been treated, e.g., surface-treated, with a sintering activator precursors. The sintering activator precursor may be added to the powders in form of an aqueous suspension, typically in form of an aqueous solution.

Hence, each one of the powder layers of the green body may contain a sintering activator precursor. The sintering activator precursor may be added such that the powder layers have a weight content of the sintering activator precursor being different from one another. For instance, the top powder layer having a weight content of the sintering activator precursor that is higher than a weight content of the sintering activator precursor in the bottom layer. The weight content of the sintering activator precursor may increase layer-by-layer from the bottom powder layer to the top powder layer. Hence, the weight amount of the sintering activator precursor that is added to the powders may increase from P1 to P2 to P3.

Each one of the powder layers of the green body may contain a sintering activator precursor in a weight amount that is suitable to obtain the sintering activator in each one of the layers of the pre-sintered multi-layered dental mill blank prepared by the process in a weight amount of at least 0.02 wt. %, at least 0.05 wt. %, at least 0.10 wt. %, at most 0.8 wt. %, at most 0.50 wt. %, at most 0.30 wt. %, or in the range of 0.02 to 0.8 wt. %, 0.05 to 0.50 wt. %, or 0.10 to 0.30 wt. %, based on the total weight of respective layer of the pre-sintered multi-layered dental mill blank. Based on the target amount of the sintering activator, a skilled person can calculate the amount of the sintering activator precursor that needs to be included into a powder layer for a given pair of sintering activator precursor and sintering activator (e.g., for a pair of a zinc nitrate as sintering activator precursor and zinc oxide as sintering activator) in order to achieve a desired amount of sintering activator.

The sintering activator precursor may be a metal salt that can be converted into an oxide of the metal in the pre-sintering step of the process to provide a metal oxide which is a sintering activator. The metal salt may be a water-soluble metal salt. The metal salt may be an organic acid metal salt or an inorganic metal salt. Suitable inorganic metal salts may be, but are not limited to, metal phosphates, metal nitrates, metal sulfates, or metal halogens.

In one embodiment, the sintering activator precursor is a zinc salt, a gallium salt, or a combination thereof. Thus, the sintering activator precursor may be a zinc salt, a gallium salt, or a combination thereof that can be converted into a sintering activator which is zinc oxide, gallium oxide or a combination thereof, in the pre-sintering step of the process. In one embodiment, the process comprises adding a sintering activator precursor to the powders P1 to P3 or to the mixtures thereof, the sintering activator precursor being a zinc salt, a gallium salt, or a combination thereof.

In one preferred embodiment, the sintering activator precursor is a zinc salt. The zinc salt may be an inorganic zinc salt, like a zinc nitrate. The zinc salt may be water-soluble.

Each one of the powder layers of the green body may contain a sintering activator precursor, which is a zinc salt, a gallium salt, or a combination thereof, in a weight amount that is suitable to obtain the sintering activator, which is zinc oxide, gallium oxide, or a combination thereof, in each one of the layers of the pre-sintered multi-layered dental mill blank prepared by the process in a weight amount of at least 0.02 wt. %, at least 0.05 wt. %, at least 0.10 wt. %, at most 0.8 wt. %, at most 0.50 wt. %, at most 0.30 wt. %, or in the range of 0.02 to 0.8 wt. %, 0.05 to 0.50 wt. %, or 0.10 to 0.30 wt. %, based on the total weight of respective layer of the pre-sintered multi-layered dental mill blank.

The process may comprise adding a sintering inhibitor precursor to at least powder P1 or a mixture thereof. The process may comprise adding a sintering inhibitor precursor to the powders P1 and P2 or to the mixtures thereof, typically before preparing the green body. Thus, powders P1 and P2 or the mixtures thereof being present in the different powder layers of the green body may be or may have been treated, e.g., surface-treated, with a sintering inhibitor precursors. The expression "adding a sintering inhibitor precursor to the powders P1 and P2 or to the mixtures thereof" is to be understood in a broad sense in that it encompasses the alternatives of adding one or more additives to the individual powders P1 and P2 or to any mixture comprising one of the powders P1 and P2 (including a mixture of powders P2/P3). The sintering inhibitor precursor may be added to the powders in form of an aqueous suspension, typically in form of an aqueous solution.

Hence, the bottom powder layer, and optionally an intermediate powder layer being adjacent to the bottom layer, of the green body may contain a sintering inhibitor precursor. The sintering inhibitor precursor may be added such that the powder layers have a weight content of the sintering inhibitor precursor being different from one another. For instance, the bottom powder layer may have a weight content of the sintering inhibitor precursor that is higher than a weight content of the sintering inhibitor precursor in the top powder layer. The weight content of the sintering inhibitor precursor may decrease layer-by-layer from the bottom powder layer to the top powder layer. Hence, the weight amount of the sintering inhibitor precursor that is added to the powders may decrease from P1 to P2 to P3.

The bottom powder layer of powder P1 of the green body may contain a sintering inhibitor precursor in a weight amount that is suitable to obtain the sintering inhibitor in the bottom layer of the pre-sintered multi-layered dental mill blank prepared by the process in a weight amount of at least 0.4 wt. %, at least 0.6 wt. %, at least 0.8 wt. %, at most 2.5 wt. %, at most 2.0 wt. %, at most 1.5 wt. %, or in the range of 0.4 to 2.5 wt. %, 0.6 to 2.0 wt. % or 0.8 to 1.5 wt. %, based on the total weight of the bottom layer of the pre-sintered multi-layered dental mill blank.

The intermediate powder layer of a mixture of powders P1/P2 of the green body may contain a sintering inhibitor precursor in a weight amount that is suitable to obtain the sintering inhibitor in a respective intermediate layer of the pre-sintered multi-layered dental mill blank prepared by the process in a weight amount of at least 0.02 wt. %, at least 0.05 wt. %, at most 2.0 wt. %, at most 1.5 wt. %, at most 1.2, or in the range of 0.02 to 2.0 wt. %, 0.05 to 1.5 wt. % or 0.05 to 1.2 wt. %, based on the total weight of the respective intermediate layer of the pre-sintered multi-layered dental mill blank.

The intermediate powder layer of a mixture of powders P2/P3 of the green body may contain a sintering inhibitor precursor in a weight amount that is suitable to obtain the sintering inhibitor in a respective intermediate layer of the pre-sintered multi-layered dental mill blank prepared by the process in a weight amount of at least 0.02 wt. %, at least 0.05 wt. %, at most 2.0 wt. %, at most 1.5 wt. %, at most 1.2, or in the range of 0.02 to 2.0 wt. %, 0.05 to 1.5 wt. % or 0.05 to 1.2 wt. %, based on the total weight of the respective intermediate layer of the pre-sintered multi-layered dental mill blank.

The sintering inhibitor precursor may be a metal salt that can be converted into an oxide of the metal in the pre-sintering step of the process to provide a metal oxide which is a sintering inhibitor. The metal salt may be a water-soluble metal salt. The metal salt may be an organic acid metal salt or an inorganic metal salt. Suitable inorganic metal salts may be, but are not limited to, metal phosphates, metal nitrates, metal sulfates, or metal halogens. The metal salt may be an yttrium salt, an erbium salt, a lanthanum salt, ytterbium salt, a thulium salt, or any combination thereof. In one embodiment, the sintering inhibitor is an yttrium salt, an erbium salt, a lanthanum salt, or any combination thereof, optionally the sintering inhibitor is an yttrium salt, an erbium salt, or a combination thereof.

In one preferred embodiment, the sintering inhibitor precursor is an yttrium salt, optionally in combination with an erbium salt. Thus, the sintering inhibitor precursor may be an yttrium salt that can be converted into a sintering inhibitor, which is type-II-yttria, in the pre-sintering step of the process. In one embodiment, the process comprises adding a sintering inhibitor precursor to the powders P1 and P2 or to the mixture thereof, the sintering inhibitor precursor being an yttrium salt. The yttrium salt may be an inorganic yttrium salt, like an yttrium nitrate. The yttrium salt may be water-soluble.

The bottom powder layer of powder P1 of the green body may contain a sintering inhibitor precursor, which is an yttrium salt, in a weight amount that is suitable to obtain the sintering inhibitor, which is type-II-yttria, in the bottom layer of the pre-sintered multi-layered dental mill blank prepared by the process in a weight amount of least 0.4 wt. %, at least 0.6 wt. %, at least 0.8 wt. %, at most 1.5 wt. %, at most 1.2 wt. %, at most 1.1 wt. %, or in the range of 0.4 to 1.5 wt. %, 0.6 to 1.2 wt. % or 0.8 to 1.1 wt. %, based on the total weight of the bottom layer of the pre-sintered multi-layered dental mill blank.

The intermediate powder layer of a mixture of powders P1/P2 of the green body may contain a sintering inhibitor precursor, which is an yttrium salt, in a weight amount that is suitable to obtain the sintering inhibitor, which is type-II-yttria, in a respective intermediate layer of the pre-sintered multi-layered dental mill blank prepared by the process in a weight amount of at least 0.1 wt. %, at least 0.2 wt. %, at least 0.3 wt. %, at most 1.2 wt. %, at most 0.8 wt. %, at most 0.6 wt. %, or in the range of 0.1 to 1.2 wt. %, 0.2 to 0.8 wt. % or 0.2 to 0.6 wt. %, based on the total weight of the respective intermediate layer of the pre-sintered multi-layered dental mill blank.

The intermediate powder layer of a mixture of powders P2/P3 of the green body may contain a sintering inhibitor precursor, which is an yttrium salt, in a weight amount that is suitable to obtain the sintering inhibitor, which is type-II-yttria, in a respective intermediate layer of the pre-sintered multi-layered dental mill blank prepared by the process in an amount of at least 0.02 wt. %, at least 0.05 wt. %, at most 0.5 wt. %, at most 0.2 wt. %, or in the range of 0.02 to 0.5 wt. %, or in the range of 0.05 to 0.2 wt. %, based on the total weight of the respective intermediate layer of the pre-sintered multi-layered dental mill blank.

The process may contain not adding an yttrium salt as a sintering inhibitor precursor to the powder P3. Thus, the top powder layer may essentially be free of an yttrium salt being a sintering inhibitor precursor.

The process may contain adding a specific combinations of a sintering activator precursor and a sintering inhibitor precursor to the powders P1 to P3 or to the mixtures thereof. In one embodiment, the process comprises adding a sintering activator precursor (e.g., a zinc salt, a gallium salt, or a combination thereof) to powders P1 to P3 or to the mixtures thereof, and adding a sintering inhibitor precursor (e.g., an yttrium salt) to powder P1 or to a mixture thereof. In one embodiment, the process comprises adding a sintering activator precursor (e.g., a zinc salt, a gallium salt, or a combination thereof) to powders P1 to P3 or to the mixtures thereof, and adding a sintering inhibitor precursor (e.g., an yttrium salt) to powder P1 and P2 or to the mixtures thereof.

The process may comprise adding coloring additives to the powders P1 to P3 or to the mixtures thereof. The coloring additives may be added in form of an aqueous solution. Suitable coloring additives may be, but are not limited to, polyvalent ions of 3d- and/of 4f-elements in different valence states, like e.g. $Fe^{3+}$, $Mn^{2+}$, $Pr^{3+}$, $Tb^{3+}$, $Cr^{3+}$, and $Er^{3+}$, like salts of those compounds. In one embodiment, the coloring additives comprise an erbium compound and an iron compound.

The green body may comprise a binder. The binder may be an organic binder or inorganic binder. The binder may be an inorganic binder such as water or residual moisture. The process may comprise a debinding of the green body. The debinding may be carried out separately or together with the pre-sintering, and is typically carried out together with the pre-sintering.

The preparation of the green body may comprise layering the powder layers in a mold. The preparation of the green body may comprise compacting the powder layers. Thus, the green body may be a compacted green body. The compacting may be a pressing such as, but not limited to, an uniaxial pressing. The compacting may be carried out with a pressure in the range of 200 to 400 MPa, like in a range of 250 to 350 MPa.

One or more of the powder layers, optionally all of the powder layers, of the green body may be substantially planar. Each one of the powder layers may have a substantially constant height. The powder layers of the green body may be arranged such that the boundaries of the powder layers are substantially parallel to each other. In one embodiment, the powder layers are substantially planar and arranged such that the boundaries of the layers are substantially parallel to each other.

The pre-sintering of the green body may have a maximum temperature of at least 700° C., at least 750° C., at least 800° C., at least 825° C., at most 1100° C., at most 1000° C., at most 950° C., at most 900° C., or in the range of 700 to 1100° C., in the range of 750 to 1000° C., in the range of 800 to 950° C. or in the range of 825 to 900° C. The maximum temperature of the pre-sintering may be hold in for a certain time, like in the range of 1 to 5 hours, like in the range of 2 to 3 hours.

The pre-sintering may be a pre-sintering process having a total duration in the range of 50 to 70 hours, like in the range of 55 to 65 hours. The pre-sintering process may comprise one or more heating steps having a heating rate in the range of 0.05 to 2 K/min or in the range of 0.1 to 1.5 K/min. The pre-sintering process typically comprises more than one heating step, e.g., more than three or more than four heating steps, having different heating rates in the range of 0.05 to 2 K/min or in the range of 0.1 to 1.5 K/min. The pre-sintering process may comprise a heating step having a heating rate in the range of 0.05 to 0.2 K/min or 0.10 to 0.15 K/min in a temperature range where the debinding of the green body takes place. For example, a suitable pre-sintering process for pre-sintering the green body may be, but is not limited to, the pre-sintering process as described herein in table IV.

TABLE IV

| Step | | Duration [h] | Start temperature [° C.] | End temperature [° C.] |
| --- | --- | --- | --- | --- |
| 1 | Heating | 2.5 | 25 | 100 |
| 2 | | 5 | 100 | 180 |
| 3 | | 20 | 180 | 320 |
| 4 | | 10 | 320 | 450 |
| 5 | | 7 | 450 | 850 |
| 6 | Holding | 2 | 850 | 850 |
| 7 | Cooling | 11 | 850 | 600 |
| 8 | | 4 | 600 | 25 |

The process may comprise one or more additional steps that are typical in the art. Additional steps may be, but are not limited to, mixing the powders in a mixing device, adjusting the particle size distribution of the powders (e.g., by sieving), preparing the surface of the green body and/or pre-sintered dental mill blank (e.g., by grinding or polishing).

The process may be a process for preparing a pre-sintered multi-layered dental mill blank according to any one of the embodiments according to the present invention.

III. Process for Preparing a Dental Restoration and Dental Restoration as Such One aspect of the present invention provides a process for preparing a dental restoration, the process comprising the steps of:
  machining a pre-sintered multi-layered dental mill blank according to any one of the embodiments of the present invention to provide a dental restoration precursor;
  optionally surface-treating the dental restoration precursor;
  sintering the dental restoration precursor to provide a dental restoration.

The machining of the pre-sintered multi-layered dental mill blank may be carried out by any conventional process for machining a dental mill blank, e.g., by a CAD/CAM process. The machining may include, but is not limited to, cutting, drilling and grinding, the dental mill blank. The dental restoration precursor may be open-porous.

The sintering is not particularly limited and may be carried out by a sintering process known in the art for sintering a dental restoration precursor, and specifically for sintering zirconia ceramic dental restoration precursor. The sintering is typically a fully sintering to provide a fully sintered dental restoration. The sintering may be carried out at a maximum sintering temperature in the range of 1300 to 1650° C., like in the range of 1400 to 1600° C. The maximum sintering temperature may be hold for 2 minutes to 2 hours. The total duration of the sintering may be less than 45 minutes, e.g., in the range of 10 to 45 minutes or in the range of 10 to 30 minutes. The sintering may be a sintering process having a total duration of a speed sintering process as defined herein. Although a short sintering will typically be preferred to save time for preparing the dental restoration, it is also possible to carry out the sintering over a longer time such as above 45 minutes, like in the range of 1 to 10 hours or 2 to 8 hours.

In one embodiment, the sintering is a sintering process according to any one of the embodiments of the present invention, e.g., as described in the following section.

The process may comprise further steps known in the art such as, but not limited to, surface-treating the dental restoration precursor (e.g., by polishing) or surface-treating the dental restoration (e.g., applying a staining, glazing or a veneering). In one embodiment, the process comprises the step of surface-treating the dental restoration precursor, like manually surface-treating the dental restoration precursor (e.g., manually surface polishing using a rotating dental polishing tool).

In one embodiment, the process comprises the steps of:
machining a pre-sintered multi-layered dental mill blank according to any one of the embodiments of the present invention to provide a dental restoration precursor;
surface-treating (e.g., manually surface-treating) the dental restoration precursor;
sintering the surface-treated dental restoration precursor to provide a dental restoration.

Another aspect of the present invention provides a dental restoration that is obtainable by the process for preparing a dental restoration according to any one of the embodiments of the present invention.

The dental restoration may comprise a plurality of zones, like two or more or three or more different zones. A zone may have different composition and/or one or more different properties (e.g., physical/mechanical properties, optical properties, or a combination thereof) than one or more of the other zones. The zones may correspond to one or more layers of the pre-sintered multi-layered dental mill blank from which the dental restoration is made. The dental restoration may comprise an incisal zone, a transition zone, and a dentin zone. The transition zone may be disposed between the incisal zone and the dentin zone and/or the incisal zone is adjacent to the transition zone, and the transition zone is adjacent to the dentin zone. The incisal zone may at least partially be made from the top layer of the pre-sintered multi-layered dental mill blank. The transition zone may at least partially be made from the at least one intermediate layer of the pre-sintered multi-layered dental mill blank. The dentin zone may at least partially be made from the bottom layer of the pre-sintered multi-layered dental mill blank.

The dental restoration may have a desirable color. At least of the dental restoration, or a zone thereof, may have a color that matches a shade of by the VITA classical A1-D4® shade guide with VITA Bleached Shades manufactured by Vita Zahnfabrik. A shade may be, but is not limited to, A1, A2, A3.5, A4, B1, B2, B3, B4, C1, C2, C3, C4, D1, D2, D3, D4, BL1 or BL2. The shade may also be a dental shade, like a light dental shade, that is not part of the VITA classical A1-D4® shade guide with VITA Bleached Shades manufactured by Vita Zahnfabrik. The shade may be an experimental light shade.

The dental restoration may be, but is not limited to, a crown, a partial crown, an abutment, an abutment crown, an inlay, an onlay, a veneer, a shell, or a multi-unit framework, or a bridge (e.g., 2-, 3- or 4-unit bridge) an implant bridge, and the like.

IV. Sintering Process

Another aspect of the present invention provides a process for sintering a dental restoration precursor, the process having a total duration of less than 25 minutes and a maximum sintering temperature in the range of 1350 to 1650° C.,
the process comprising subjecting the dental restoration precursor to
(i) a heating treatment, and
(ii) a cooling treatment,
the cooling treatment comprising a cooling step A,
the cooling step A starting and ending within a temperature range between 1100° C. and the maximum sintering temperature, and having a cooling rate A that is at least 75 K/min.

It has been found that the process for sintering a dental restoration precursor according to an embodiment of the present invention (also referred to as "the sintering process" in this section) is suitable for preparing a dental restoration with desirable properties, and in particular desirable optical properties (e.g., a desirable translucency) in a short time.

The process may consist of subjecting the dental restoration precursor to the heating treatment and the cooling treatment.

The process may have a total duration of less than 20 minutes, less than 18 minutes, less than 16 minutes, or less than 15 minutes. The process may have a total duration of at least 5, 8, 10 or 12 minutes. The process may have a total duration in the range of 5 to less than 20 minutes, 8 to less than 18 minutes, 10 to less than 16 minutes, or 12 to less than 15 minutes. "Total duration" is to be understood as defined in the section "Definitions". The process may have a maximum sintering temperature in the range of 1400 to 1600° C., in the range 1400 to 1560° C., in the range of 1400 to 1500° C., or in the range of 1425 to 1475° C. For instance, the process may have a maximum sintering temperature of about 1450° C. A total duration as specified above allows for a convenient preparation of dental restorations and in particular is believed to enable a chairside preparation by which the patient can be provided with the restoration in a single visit.

The sintering process comprises a cooling treatment. The cooling treatment starts at the maximum sintering temperature and ends at a final temperature that is below the maximum sintering temperature. The cooling treatment comprises one or more cooling steps, and typically more than one cooling step (e.g., two or three cooling steps). The cooling treatment may be followed by a cool down as defined herein. A cool down is not part of the cooling treatment or the sintering process.

The cooling treatment comprises a cooling step A. The cooling step A has a cooling rate A that is at least 75 K/min. The cooling rate determines the drop in temperature (K) per minute (min). The cooling rate A may be at least 100 K/min, at least 110 K/min, at least 120 K/min, at most 250 K/min, at most 200 K/min, at most 160 K/min, in the range of 100 to 250 K/min, in the range of 110 to 180 K/min, or in the range of 120 to 160 K/min (e.g., in the range of 125 to 140 K/min). For instance, the cooling rate A may be about 130 K/min.

The cooling step A is starting and ending within a temperature range between 1100° C. and the maximum sintering temperature. This means that cooling step A has a start temperature and an end temperature that fall within the temperature range between 1100° C. and the maximum sintering temperature. The cooling step A may start and end within a temperature range between 1200° C. and the maximum sintering temperature, or within a temperature range between 1250° C. and the maximum sintering temperature, or within a temperature range between 1300° C. and the maximum sintering temperature, or within a temperature range between 1325° C. and the maximum sintering temperature. In one embodiment, the cooling step A starts and ends within a temperature range between 1200° C. and the maximum sintering temperature, and having a cooling rate A that is at least 100 K/min. Cooling step A may be carried out for a time period of at least 20 seconds, at least 30 seconds, at least 40 seconds, at most 3 minutes, at most 2 minutes, or at most 1 minute 30 seconds, like in the range of 20 seconds to 3 minutes, 30 seconds to 2 minutes, or 40 seconds to 1 minute 30 seconds.

Cooling step A may be the first cooling step of the cooling treatment. Thus, cooling step A may have a start temperature being the maximum sintering temperature. For instance, cooling step A may have a start temperature of 1450° C. and an end temperature of 1350° C.

The cooling treatment may comprise a cooling step B that is carried out before or after, and typically after, cooling step A and that has a cooling rate B being lower than cooling rate A. It has been found that, when the sintering process comprises a cooling step B as defined herein (optionally in addition with a cooling step C as defined herein), a dental restoration may be obtained having advantageous optical properties. For example, cooling step B may be advantageous when sintering a pre-shaded dental restoration precursor to achieve more favorable color properties, and particularly when sintering a pre-shaded dental restoration that contains iron oxide as main component or one of the main components of the coloring oxides.

The cooling rate B may be at least 30 K/min, at least 50 K/min, at least 60 K/min, at most 110 K/min, at most 90 K/min, at most 80 K/min, in the range of 30 to 110 K/min, in the range of 50 to 90 K/min, or in the range of 60 to 80 K/min.

The cooling step B may start and end within a temperature range between 1000° C. and an end temperature of the cooling step A. This means that cooling step B may have a start temperature and an end temperature that falls within the temperature range between 1000° C. and the end temperature of cooling step A. Typically, the cooling step B is carried out within a temperature range between 1100° C. and an end temperature of the cooling step A, or within a temperature range between 1150° C. and an end temperature of the cooling step A, or within a temperature range between 1200° C. and an end temperature of the cooling step A. For instance, cooling step B may have a start temperature of 1350° C. and an end temperature of 1200° C. Cooling step B may be carried out for a time period of at least 45 seconds, at least 1 minute, at least 1 minute 30 seconds, at most 6 minutes, at most 4 minutes, or at most 3 minutes, like in the range 45 seconds to 6 minutes, 1 to 4 minutes, or 1 minute 30 seconds to 3 minutes.

The cooling step B may be carried out directly after the cooling step A, i.e., the start temperature of cooling step B may be the end temperature of cooling step A. It is however also possible that there is an intermediate cooling step between cooling steps A and B such as, but not limited to, a cooling step C as defined herein.

Thus, the cooling treatment may comprise a cooling step C. The cooling step C may be carried out after the cooling step A and/or after the cooling step B. The cooling step C may start and end within a temperature range between a final temperature of the cooling treatment (e.g. 1000° C., 1100° C., or 1150° C.) and the end temperature of cooling step A (e.g., 1200° C., 1250° C., or 1300° C. The cooling step C may have a cooling rate C that is at most 20 K/min, at most 10 K/min, at most 5 K/min, or is about 0 K/min. Thus, cooling step C may be a holding step (i.e., a step in which the temperature is kept substantially constant). Cooling step C may be carried out for a time period of at least 45 seconds, at least 1 minute, at least 1 minute 30 seconds, at most 5 minutes, at most 4 minutes, or at most 3 minutes, like in the range 45 seconds to 5 minutes, 1 to 4 minutes, or 1 minute 30 seconds to 3 minutes. It may be advantageous to carry out cooling step C when the dental restoration precursor is a pre-shaded dental restoration precursor, e.g., comprising two or more units such as, but not limited to, a bridge.

The cooling treatment may comprise one or more additional cooling steps (including holding steps) that are carried out before or after any one of cooling steps A to C as defined herein. In one embodiment, the cooling treatment consists of the cooling step A and the cooling step B, optionally in combination with the cooling step C.

The final temperature of the cooling treatment may be at least 1000° C., at least 1100° C., at least 1150° C., at most 1300° C., at most 1280° C., or at most 1250° C., like in the range of 1000 to 1300° C., in the range of 1100 to 1280° C., or in the range of 1150 to 1250° C. For instance, the final temperature of the cooling treatment may be 1200° C. The cooling treatment may be carried out for a time period of at least 1 minute, at least 2 minutes, at least 2 minutes 30 seconds, at most 8 minutes, at most 6 minutes, or at most 4 minutes, like in the range of 1 to 8 minutes, 2 to 6 minutes, or 2 minutes 30 seconds to 4 minutes. The cooling treatment is typically followed by a cool down. The cool down may at least partially be carried out with an opened sinter furnace. The cool down may be considered to be completed at a temperature of about 400° C. The cool down may take less than 10 minutes, like less than 5 minutes, like less than 3 minutes.

The sintering process comprises a heating treatment. The heating treatment starts at a start temperature and ends at the maximum sintering temperature. The start temperature of the heating treatment may be a temperature in the range of 5 to 30° C., e.g., 25° C.

The heating treatment comprises one or more heating steps up to the maximum sintering temperature. The heating treatment typically comprises a heating step A having a heating rate A of at least 150 K/min, at least 170 K/min, at least 190 K/min, at most 300 K/min, at most 250 K/min, or at most 220 K/min, like in the range of 150 to 300 K/min, in the range of 170 to 250 K/min, or in the range of 190 to 220 K/min. The heating rate determines the increase in temperature (K) per minute (min). For instance, the heating rate A may be 200 K/min. The heating step A may start and end within a temperature range between a start temperature of the heating treatment (e.g., 25° C.) and the maximum sintering temperature. The heating step A may start and end within a temperature range between the start temperature of the heating treatment and a temperature below the maximum sintering temperature. The heating step A may start and end within a temperature range between a start temperature of the heating treatment and a temperature of 1300° C., or within a temperature range between a start temperature and a temperature of 1200° C., or within a temperature range between a start temperature and a temperature of 1100° C. For instance, the heating step A may start at 25° C. and end at 1050° C. The heating step A may be carried out for a time period of at least 3 minutes, at least 4 minutes, at most 7 minutes, at most 6 minutes, like in the in the range of 3 to 7 minutes or 4 to 6 minutes.

The heating treatment may comprise two or more heating steps. The heating treatment may comprise a heating step B after the heating step A, the heating step B having a heating rate B that is lower than the heating rate A. The heating rate B may be at least 50 K/min, at least 70 K/min, at least 90 K/min, at most 200 K/min, at most 150 K/min, at most 120 K/min, in the range of 50 to 200 K/min, in the range of 70 to 150 K/min, or in the range of 90 to 120 K/min. For instance, the heating rate B may be 100 K/min. In one embodiment, the heating treatment comprises a heating step A having a heating rate A of at least 170 K/min, and a heating step B after the heating step A, the heating step B having a heating rate B of at least 70 K/min and being lower than the heating rate A.

The heating step B may start and end within a temperature range between the end temperature of heating step A and the maximum sintering temperature. The heating step B may start directly after heating step A, i.e., the heating step B may have a start temperature being the end temperature of heating step A. Heating step B may end at the maximum sintering temperature. For instance, heating step B may start at a temperature of 1050° C. and may end at a maximum sintering temperature of 1450° C. The heating step B may be carried out for a time period of at least 1 minute, at least 2 minutes, at least 3 minutes, at most 7 minutes, at most 6 minutes, or at most 5 minutes, like in the range of 1 to 7 minutes, 2 to 6 minutes, or 3 to 5 minutes.

Furthermore, the heating treatment may comprise a heating step C after the heating step B, the heating step C having a heating rate C that is lower than the heating rate B. The heating step C may have a heating rate C that is at most 40 K/min, at most 20 K/min, at most 10 K/min. Heating step C may end at the maximum sintering temperature. Typically, heating step C is carried out at the maximum sintering temperature and has a heating rate C that is about 0 K/min. Thus, heating step C is typically a holding step (i.e., a step in which the temperature is kept substantially constant) at the maximum sintering temperature. The maximum sintering temperature may be held for at least 30 seconds, at least 1 minute, at most 5 minutes, at most 3 minutes, in the range of 30 seconds to 5 minutes, or in the range of 1 to 3 minutes. For instance, the maximum sintering temperature may be held for about 2 minutes. At the end of the heating treatment, the dental restoration precursor is typically fully sintered.

The heating treatment may comprise one or more additional heating steps (including holding steps) being carried out before or after any one of heating steps A and B as defined herein. The heating treatment may also comprise one or more additional controlled heating steps (including holding steps) being carried out before or after heating step C. When heating step C is a holding step at the maximum sintering temperature, then there is no additional heating step after heating step C. In one embodiment, the heating treatment consists of the heating steps A to C. The heating treatment may be carried out for a time period of at least 5 minutes, at least 7 minutes, at least 8 minutes, at most 16 minutes, at most 14 minutes, or at most 12 minutes, like in the range of 5 to 16 minutes, 7 to 14 minutes, or 8 to 12 minutes.

The heating treatment may be at least partially carried out at a lower pressure than the pressure being applied in other parts of the sintering process, e.g., during the cooling treatment. The lower pressure may be a pressure of 500 mbar or less, 200 mbar or less, 150 mbar or less, or 100 mbar or less, like in the range of 0.1 to 500 mbar, in the range of 1 to 200 mbar, in the range of 10 to 150 mbar, or in the range of 50 to 100 mbar. The pressure may be adjusted by applying a vacuum. The vacuum may be applied before starting the heating treatment or during the heating treatment, like in a temperature range between 25 to 500° C. or 25 to 100° C. When the heating treatment is carried out at least partially at a lower pressure as described herein, a property of a dental restoration such as density or contrast ratio may be further optimized.

The heating treatment may be partially carried out at the lower pressure. The lower pressure may be applied in a temperature range between the start temperature and a temperature below the maximum sintering temperature. For instance, the lower pressure may be applied in a temperature range between the start temperature and a temperature that is 50 C below the maximum sintering temperature. The heating treatment may comprise a heating step A and a heating step B as defined herein, wherein the heating step A is partially or fully, optionally fully, carried out at the lower pressure, and the heating step B is partially carried out at the lower pressure. When a part of the heating treatment is carried out at the lower pressure, the remaining parts of the sintering process may be carried out at a pressure of above 900 mbar, like ambient pressure. The heating treatment, and particularly the part(s) of the heating treatment that is not carried at the lower pressure, may be carried out under a flow of a gas, like air, oxygen-enriched air, or oxygen. The flow of gas may have a flow rate in the range of 0.1 to 50 l/min, like in the range of 1 to 10 l/min, like in the range of 2 to 5 l/min.

The dental restoration precursor may be a porous ceramic material, in particular an open-porous ceramic material. The dental restoration precursor may have a density, relative to its theoretical density, at least 45%, at least 50% at least 52%, at most 70%, at most 60%, at most 55%, like in a range of 45 to 70% (e.g., 45 to 55%), 50 to 60%, or 52 to 55% (e.g., about 52% or about 53%). In one embodiment, the density of the pre-sintered multi-layered dental mill blank, relative to its theoretical density, is in the range of 45 to 55%. The dental restoration precursor may be a pre-sintered ceramic material. Thus, the dental restoration precursor may be a ceramic material that has been pre-sintered before being subjected to the sintering process. For instance, the dental restoration precursor may be a ceramic material that has been pre-sintered at a maximum pre-sintering temperature of at least 700° C., at least 750° C., at least 800° C., at least 825° C., at most 1100° C., at most 1000° ° C., at most 950° C., at most 900° C., like in the range of 700 to 1100° C., in the range of 750 to 1000° C., in the range of 800 to 950° C. or in the range of 825 to 900° C.

The dental restoration precursor may be, but is not limited to, a precursor of a crown, a partial crown, an abutment, an abutment crown, an inlay, an onlay, a veneer, a shell, or a multi-unit framework, or a bridge (e.g., 2-, 3- or 4-unit bridge) an implant bridge, and the like.

The dental restoration precursor may be pre-shaded, e.g., the dental restoration precursor may comprise coloring metal oxides. Suitable coloring metal oxides may be, but are not limited to, the oxides of Fe, Mn, Cr, Pr, Tb, Er, Yb, Ce, Co, Ni, Nd, Cu, Bi, and any combination thereof. The coloring oxides may comprise iron oxide, typically in combination with other coloring metal oxides. It has been found that the sintering process according to an embodiment of the invention is particularly suitable for preparing dental restorations that comprise coloring metal oxides, and particularly iron oxide, in a very short time.

The dental restoration precursor may be a zirconia dental restoration precursor, i.e., it may be based on zirconia as a main component. The dental restoration precursor may comprise zirconia and yttria. The dental restoration precursor may comprise different sections, like at least 3 sections, comprising zirconia and yttria, and each section having a different yttria content. The different sections may be a top section (e.g., at least partially forming an incisal zone of the dental restoration), at least one intermediate section (e.g., at least partially forming a transition zone of the dental restoration), and a bottom section (e.g., at least partially forming a dentin zone of the dental restoration). The yttria content may increase from the bottom section to the intermediate section to the top section. The sintering process is suitable for sintering a multi-sectional dental restoration precursor and/or a dental restoration precursor obtained from multi-layered dental mill blanks, and therefore may provide a dental restoration with a desirable optical appearance in a short time period.

The dental restoration precursor may be prepared from a multi-layered dental mill blank, like a pre-sintered multi-layered dental mill blank. The multi-layered dental mill blank, like the pre-sintered multi-layered dental mill blank, may be pre-shaded. The multi-layered dental mill blank, like the pre-sintered multi-layered dental mill blank, may comprise a top layer, a bottom layer, and at least one intermediate layer, each layer comprising zirconia and yttria, the yttria content of the layers may increase layer-by-layer from the bottom layer to the top layer.

The dental restoration precursor may be prepared from a pre-sintered multi-layered dental mill blank according to any one of the embodiments of the present invention. When the dental restoration precursor is prepared from a pre-sintered multi-layered dental mill blank according to one of the embodiment of the present invention, a dental restoration having natural and high aesthetics can be obtained in a very short time.

V. Non-Limiting Aspects and Embodiments of the Present Invention

Further non-limiting embodiments of the present invention are defined in the following numbered items:

[1] A pre-sintered multi-layered dental mill blank comprising
a top layer,
a bottom layer, and
at least one intermediate layer,
the pre-sintered multi-layered dental mill blank being characterized by providing a representative test section for each layer,
the representative test sections, when being fully sintered by a speed sintering process, having a contrast ratio that increases layer-by-layer from the top layer to the bottom layer.

[2] The pre-sintered multi-layered dental mill blank according to item [1], the contrast ratio [%] of each layer being at least 56%, at least 61%, at least 62%, or at least 64%, and/or the contrast ratio [%] of each layer being at most 88%, at most 83%, at most 82%, or at most 79%.

[3] The pre-sintered multi-layered dental mill blank according to item [1] or [2], the contrast ratio [%] of each layer being in the range of 56 to 88%, 61 to 83%, 62 to 82%, or 64 to 79%.

[4] The pre-sintered multi-layered dental mill blank according to any one of items [1] to [3], the contrast ratio [%] of the bottom layer differing from the contrast ratio [%] of the top layer by least 2 percent points, at least 3 percent points, at least 5 percent points, at least 8 percent points or at least 10 percent points, and/or the contrast ratio [%] of the bottom layer differing from the contrast ratio [%] of the top layer by at most 24 percent points, at most 22 percent points, at most 19 percent points, at most 18 percent points, or at most 16 percent points.

[5] The pre-sintered multi-layered dental mill blank according to any one of items [1] to [4], the contrast ratio [%] of the bottom layer differing from the contrast ratio [%] of the top layer by in the range of 2 to 24 percent points, 3 to 22 percent points, 5 to 19 percent points, 8 to 18 percent points or 10 to 16 percent points.

[6] The pre-sintered multi-layered dental mill blank according to any one of items [1] to [5], the contrast ratio of the bottom layer being at least 66%, at least 70%, at least 71%, or at least 74%, and/or the contrast ratio of the bottom layer being at most 88%, at most 83%, at most 81%, or at most 80%.

[7] The pre-sintered multi-layered dental mill blank according to any one of items [1] to [6], the contrast ratio of the bottom layer being in the range of 66% to 88%, 70 to 83%, 71 to 81%, or 74 to 80%.

[8] The pre-sintered multi-layered dental mill blank according to any one of items [1] to [7], the contrast ratio of the top layer being at least 56%, at least 61%, at least 62% or at least 64%, and/or the contrast ratio of the top layer being at most 72%, at most 68%, at most 67% or at most 66%.

[9] The pre-sintered multi-layered dental mill blank according to any one of items [1] to [8], the contrast ratio of the top layer being in the range of 56% to 72%, 61 to 68%, 62 to 67% or 64 to 66%.

[10] The pre-sintered multi-layered dental mill blank according to any one of items [1] to [9], the contrast ratio of the at least one intermediate layer being at least 62% at least 66%, at least 67% or at least 68%, and/or the contrast ratio of the at least one intermediate layer being at most 83%, at most 79%, at most 78% or at most 76%.

[11] The pre-sintered multi-layered dental mill blank according to any one of items [1] to [10], the contrast ratio of the at least one intermediate layer being in the range of 62 to 83%, 66 to 79%, 67 to 78% or in the range of 68 to 76%.

[12] The pre-sintered multi-layered dental mill blank according to any one of items [1] to [11], the contrast ratio [%] of each pair of two adjacent layers differing by at least 0.3 percent point, at least 0.5 percent point, at least 1.0 percent point, or at least 2.0 percent points.

[13] The pre-sintered multi-layered dental mill blank according to any one of items [1] to [12], comprising at least two intermediate layers,
the contrast ratio [%] of one intermediate layer differing from the contrast ratio of another intermediate layer by at least 0.2 percent point, at least 0.5 percent point, at least 3.0 percent points, or at least 4.0 percent points, and/or at most 12 percent points, at most 10.0 percent points, at most 9.0 percent points, or at most 8.0 percent points.

[14] The pre-sintered multi-layered dental mill blank according to any one of items [1] to [13], comprising, or being composed of, the following layers:
a top layer L4,
an intermediate layer L3,
an intermediate layer L2,
a bottom layer L1, and
the contrast ratio of the layers satisfying one or more of the contrast ratio profiles A1.1 to J1.1 (optionally one or more of the contrast ratio profiles C1.1 to H1.1) as defined herein in table A1 or contrast ratio profiles A1.2 to J1.2 (optionally one or more of the contrast ratio profiles C1.2 to H1.2) as defined herein in table A2.

[15] The pre-sintered multi-layered dental mill blank according to any one of items [1] to [14], the representative test sections, when being fully sintered by a speed sintering process, having a CIE lightness L* that increases layer-by-layer from the bottom layer to the top layer.

[16] A pre-sintered multi-layered dental mill blank comprising
a top layer,
a bottom layer, and
at least one intermediate layer,
the pre-sintered multi-layered dental mill blank being characterized by providing a representative test section for each layer,
the representative test sections, when being fully sintered by a speed sintering process, having a CIE lightness L* that increases layer-by-layer from the bottom layer to the top layer.

[17] The pre-sintered multi-layered dental mill blank according to any one of items [15] to [16], the CIE lightness L' of each layer being at least 72, at least 76, at least 78 or at least 79, and/or the CIE lightness L* of each layer being at most 98, at most 94, at most 92 or at most 91.

[18] The pre-sintered multi-layered dental mill blank according to any one of items [15] to [17], the CIE lightness L' of each layer being in the range of 72 to 98, 76 to 94, 78 to 92 or 79 to 91.

[19] The pre-sintered multi-layered dental mill blank according to any one of items [15] to [18], the CIE lightness L* of each pair of two adjacent layers differing by at least 0.05, at least 0.4, at least 0.6, or at least 0.8.

[20] The pre-sintered multi-layered dental mill blank according to any one of items [15] to [19], the CIE lightness L* of the bottom layer may be at least 72, at least 76, at least 78, at least 80, at least 82, or at least 84, and/or the CIE lightness L* of the bottom layer may be at most 94, at most 92, at most 90, at most 88, at most 86, or at most 84.

[21] The pre-sintered multi-layered dental mill blank according to any one of items [15] to [20], the CIE lightness L* of the bottom layer being in the range of 72 to 94, 76 to 92, 78 to 90, 80 to 88 or 80 to 86.

[22] The pre-sintered multi-layered dental mill blank according to any one of items [15] to [21], the CIE lightness L* of the top layer being at least 80, at least 84, at least 86, at least 88, or at least 90, and/or the CIE lightness L* of the top layer being at most 98, at most 96, at most 94, at most 92, or at most 90.

[23] The pre-sintered multi-layered dental mill blank according to any one of items [15] to [22], the CIE lightness L* of the top layer being in the range of 80 to 98, 84 to 94, 86 to 92, or 86 to 90.

[24] The pre-sintered multi-layered dental mill blank according to any one of items [15] to [23], the CIE lightness L* of the top layer being higher than the CIE lightness L* of the bottom layer by at least 0.5, at least 1.0, at least 2.0, at least 3.0, or at least 4.0, and/or the CIE lightness L' of the top layer being higher than the CIE lightness of the bottom layer by at most 12, at most 10, at most 9.0, at most 8.0, or at most 7.0.

[25] The pre-sintered multi-layered dental mill blank according to any one of items [15] to [24], the CIE lightness L* of the top layer being higher than the CIE lightness L* of the bottom layer by a value in the range of 0.5 to 12, 1.0 to 10, 2.0 to 9.0, 2.0 to 8.0 or 2.0 to 7.0.

[26] The pre-sintered multi-layered dental mill blank according to any one of items [1] to [25], the representative test sections, when being fully sintered by a speed sintering process, having a CIE a* value, the CIE a* value of each layer being in the range of −3.5 to 7.5, −2.2 to 6.0, −1.8 to 5.6 or −1.0 to 5.0.

[27] The pre-sintered multi-layered dental mill blank according to any one of items [1] to [26], the representative test sections, when being fully sintered by a speed sintering process, having a CIE a* value, the CIE a value of each layer being at least −3.5, at least −2.2, at least −1.8, or at least −1.0, and/or the CIE a* value of each layer being at most 7.5, at most 6.0, at most 5.6 or at most 5.0.

[28] The pre-sintered multi-layered dental mill blank according to any one of items [1] to [27], the representative test sections, when being fully sintered by a speed sintering process, having a CIE a* value that increases layer-by-layer from the top layer to the bottom layer.

[29] The pre-sintered multi-layered dental mill blank according to any one of items [1] to [28], the representative test sections, when being fully sintered by a speed sintering process, having a CIE b* value, the CIE b* value of each layer being in the range of 1 to 30, 3 to 26, 4 to 24, or 11 to 22.

[30] The pre-sintered multi-layered dental mill blank according to any one of items [1] to [29], the representative test sections, when being fully sintered by a speed sintering process, having a CIE b* value, the CIE b* value of each layer being at least 1, at least 3, at least 4, or at least 11, and/or the CIE b* value of each layer being at most 30, at most 26, at most 24 or at most 22.

[31] The pre-sintered multi-layered dental mill blank according to any one of items [1] to [30], comprising, or being composed of, the following layers:
a top layer L4,
an intermediate layer L3,
an intermediate layer L2,
a bottom layer L1, and
the representative test sections, when being fully sintered by a speed sintering process, having a CIE lightness L*, the CIE lightness L' of the layers satisfying one or more of the CIE lightness L* profiles A2.1 to J2.1 (optionally one or more of the CIE lightness L* profiles C2.1 to H2.1) as defined herein in table B1 or one or more of the CIE lightness L* profiles A2.2 to J2.2 (optionally one or more of the CIE lightness L* profiles C2.2 to H2.2) as defined herein in table B2.

[32] The pre-sintered multi-layered dental mill blank according to any one of items [1] to [31], comprising, or being composed of, the following layers:
a top layer L4,
an intermediate layer L3,
an intermediate layer L2,
a bottom layer L1, and
the representative test sections, when being fully sintered by a speed sintering process, having a CIE a* value, the CIE a* values of the layers satisfying one or more of the CIE a value profiles A3.1 to J3.1 as defined herein in table C1 or one or more of the CIE a* value profiles A3.2 to J3.2 as defined herein in table C2.

[33] The pre-sintered multi-layered dental mill blank according to any one of items [1] to [32], comprising, or being composed of, the following layers:
a top layer L4,
an intermediate layer L3,
an intermediate layer L2,
a bottom layer L1, and
the representative test sections, when being fully sintered by a speed sintering process, having a CIE b* value, the CIE b* value of the layers satisfying one or more of the CIE b* value profiles A4.1 to J4.1 as defined herein in table D1 or one or more of the CIE b* value profiles A4.2 to J4.2 as defined herein in table D2.

[34] The pre-sintered multi-layered dental mill blank according to any one of items [1] to [33], comprising, or being composed of, the following layers:
a top layer L4,
an intermediate layer L3,
an intermediate layer L2,
a bottom layer L1, and
the representative test sections, when being fully sintered by a speed sintering process, having CIE L*a*b* values and a contrast ratio, the CIE L*a*b* values and the contrast ratio of the layers satisfying one or more of the optical properties profiles A to J (optionally one or more of the optical properties profiles C to H) as defined in table F1 or one or more of the optical properties profiles Aa to Jj (optionally one or more of the optical properties profiles Cc to Hh) as defined herein in table F2.

[35] The pre-sintered multi-layered dental mill blank according to any one of items [1] to [34], which is a pre-sintered multi-layered zirconia ceramic dental mill blank.

[36] The pre-sintered multi-layered dental mill blank according to any one of items [1] to [35], each layer comprising zirconia and yttria, wherein the yttria content of the layers increases layer-by-layer from the bottom layer to the top layer.

[37] A pre-sintered multi-layered dental mill blank comprising
a top layer,
a bottom layer, and
at least one intermediate layer,
each layer comprising zirconia and yttria, wherein the yttria content of the layers increases layer-by-layer from the bottom layer to the top layer,
the pre-sintered multi-layered dental mill blank being characterized by providing a representative test section for each layer, and
the representative test section of the top layer and/or an intermediate layer being adjacent to the top layer, when being fully sintered by a speed sintering process, having a number of pores per grain of less than 0.25, less than 0.20, less than 0.15, less than 0.10, less than 0.05, or less than 0.02.

[38] The pre-sintered multi-layered dental mill blank according to any one of items [1] to [37], the representative test section of the top layer, when being fully sintered by a speed sintering process, having a number of pores per grain of less than 0.25, less than 0.20, less than 0.15, less than 0.10, less than 0.05 or less than 0.02.

[39] The pre-sintered multi-layered dental mill blank according to any one of items [1] to [38], the representative test section of an intermediate layer being adjacent to the top layer, when being fully sintered by a speed sintering process, having a number of pores per grain of less than 0.25, less than 0.20, less than 0.15, less than 0.10, less than 0.05, or less than 0.02.

[40] The pre-sintered multi-layered dental mill blank according to any one of items [1] to [39], the representative test section of the top layer and/or an intermediate layer being adjacent to the top layer, when being fully sintered by a speed sintering process, having a number of intragranular pores per grain of less than 0.20, less than 0.15, less than 0.10, less than 0.05, or less than 0.02.

[41] The pre-sintered multi-layered dental mill blank according to any one of items [1] to [40], the top layer comprising a sintering activator.

[42] A pre-sintered multi-layered dental mill blank comprising
a top layer,
a bottom layer, and
at least one intermediate layer,
each layer comprising zirconia and yttria, wherein the yttria content of the layers increases layer-by-layer from the bottom layer to the top layer, and
the top layer comprising a sintering activator.

[43] The pre-sintered multi-layered dental mill blank according to any one of items [1] to [42], the top layer comprising aluminum oxide in an amount of less than 0.05 wt. %, or less than 0.02 wt. %, or less than 0.01 wt. %, based on the total weight of the top layer.

[44] A pre-sintered multi-layered dental mill blank comprising
a top layer,
a bottom layer, and
at least one intermediate layer,
each layer comprising zirconia and yttria, wherein the yttria content of the layers increases layer-by-layer from the bottom layer to the top layer, and
the top layer comprising aluminum oxide in an amount of less than 0.01 wt. %, based on the total weight of the top layer.

[45] The pre-sintered multi-layered dental mill blank according to any one of items [1] to [44], each layer comprising a sintering activator.

[46] The pre-sintered multi-layered dental mill blank according to item [45], the top layer comprising the sintering activator in an amount that is higher than in the bottom layer, and
optionally the content of the sintering activator decreasing layer-by-layer from the top layer to the bottom layer.

[47] The pre-sintered multi-layered dental mill blank according to item or [46],
the pre-sintered multi-layered dental mill blank being characterized by providing a representative test section for each layer,
the weight amount of the sintering activator in each one of the layers of the pre-sintered multi-layered dental mill blank being adjusted such that each one of the representative test sections, when being fully sintered by a speed sintering process, has a maximum sintering rate at a temperature T, wherein the temperature T for the representative test sections differs by not more than 40° C. or not more than 25° C.

[48] The pre-sintered multi-layered dental mill blank according to any one of items [41] to [47], the top layer comprising the sintering activator in an amount of at least 0.02 wt. %, at least 0.05 wt. %, at least 0.10 wt. %, or at least 0.15 wt. %, based on the total weight of the top layer, and/or the top layer comprising the sintering activator in an amount of at most 0.8 wt. %, at most 0.50 wt. %, at most 0.30 wt. %, or at most 0.20 wt. %, based on the total weight of the top layer.

[49] The pre-sintered multi-layered dental mill blank according to any one of items [41] to [48], the top layer comprising the sintering activator in an amount in the range of 0.02 to 0.8 wt. %, 0.05 to 0.50 wt. %, 0.10 to 0.30 wt. %, or 0.15 to 0.20 wt. %, based on the total weight of the top layer.

[50] The pre-sintered multi-layered dental mill blank according to any one of items [45] to [49], each layer comprising the sintering activator in an amount of at least 0.02 wt. %, at least 0.05 wt. %, or at least 0.10 wt. %, based on the total weight of the respective layer, and/or each layer comprising the sintering activator in an amount of at most 0.8 wt. %, at most 0.50 wt. %, or at most 0.30 wt. %, based on the total weight of the respective layer.

[51] The pre-sintered multi-layered dental mill blank according to any one of items [45] to [50], each layer comprising the sintering activator in an amount in the range of 0.02 to 0.8 wt. %, 0.05 to 0.50 wt. %, or 0.10 to 0.30 wt. %, based on the total weight of respective layer.

[52] The pre-sintered multi-layered dental mill blank according to any one of items [41] to [51], the sintering activator being obtainable by converting a sintering activator precursor into the sintering activator when pre-sintering a green body of the multi-layered dental mill blank.

[53] The pre-sintered multi-layered dental mill blank according to any one of items [41] to [52], the sintering activator being zinc oxide, gallium oxide, or a combination thereof.

[54] The pre-sintered multi-layered dental mill blank according to any one of items [41] to [53], the sintering activator being zinc oxide.

[55] The pre-sintered multi-layered dental mill blank according to any one of items [1] to [54],
each layer comprising at least 80 wt. %, at least 90 wt. %, at least 95 wt. %, or at least 98 wt. % of a combined amount of zirconia, yttria and hafnium dioxide, based on the total weight of the respective layer of the pre-sintered multi-layered dental mill blank, and/or each layer comprising at most 99.8 wt. %, at most 99.6 wt. %, at most 99.4 wt. %, or at most 99.2 wt. %, of a combined amount of zirconia, yttria and hafnium dioxide, based on the total weight of the respective layer of the pre-sintered multi-layered dental mill blank.

[56] The pre-sintered multi-layered dental mill blank according to any one of items [1] to [55], each layer comprising 80 to 99.8 wt. %, 90 to 99.6 wt. %, 95 to 99.4 wt. %, to 98 to 99.2 wt. %, of a combined amount of zirconia, yttria and hafnium dioxide, based on the total weight of the respective layer of the pre-sintered multi-layered dental mill blank.

[57] The pre-sintered multi-layered dental mill blank according to any one of items [1] to [56],
each layer comprising zirconia in a weight amount of at least 80 wt. %, at least 85 wt. %, at least 87 wt. % or at least 88 wt. %, based on the total weight of the respective layer of the pre-sintered multi-layered dental mill blank, and/or each layer comprising zirconia in a weight amount of at most 95 wt. %, at most 94 wt. %, at most 93 wt. %, or at most 92 wt. %, based on the total weight of the respective layer of the pre-sintered multi-layered dental mill blank,
or each layer comprising zirconia in a weight amount in the range of 80 to 95 wt. %, 85 to 94 wt. %, 87 to 93 wt. %, to 88 to 92 wt. %, based on the total weight of the respective layer of the pre-sintered multi-layered dental mill blank.

[58] The pre-sintered multi-layered dental mill blank according to any one of items [1] to [57], each layer comprising hafnium dioxide in a weight ratio to zirconia in the range of 0:100 to 5:95, 1:99 to 4:96, 2:98 to 3:97, or of 2:98, based on the total weight of hafnium dioxide and zirconia of the respective layer of the pre-sintered multi-layered dental mill blank.

[59] The pre-sintered multi-layered dental mill blank according to any one of items [1] to [58], the top layer comprising at least 7.0 wt. %, at least 8.0 wt. %, at least 9.0 wt. %, or at least 9.5 wt. %, of yttria, based on the total weight of the top layer,
and/or the top layer comprising at most 13.0 wt. %, at most 12.0 wt. %, at most 11.0 wt. %, or at most 10.5 wt. %, of yttria, based on the total weight of the top layer.

[60] The pre-sintered multi-layered dental mill blank according to any one of items [1] to [59], the top layer comprising yttria in a weight amount in the range of 7.0 to 13.0 wt. %, 8.0 to 12.0 wt. % (e.g., in the range of 9.0 to 12.0 wt. %), 9.0 to 11.0 wt. %, or 9.5 to 10.5 wt. %, based on the total weight of the top layer.

[61] The pre-sintered multi-layered dental mill blank according to any one of items [1] to [60], the bottom layer comprising at least 4.0 wt. %, at least 5.0 wt. %, at least 5.5 wt. %, or at least 6.0 wt. %, of yttria, based on the total weight of the bottom layer, and/or the bottom layer comprising at most 8.0 wt. %, at most 7.5 wt. %, at most 7.0 wt. %, or at most 6.8 wt. % of yttria, based on the total weight of the bottom layer.

[62] The pre-sintered multi-layered dental mill blank according to any one of items [1] to [61], the bottom layer comprising 4.0 to 8.0 wt. %, 5.0 to 7.5 wt. %, 5.5 to 7.0 wt. %, or 6.0 to 6.8 wt. %, of yttria, based on the total weight of the bottom layer.

[63] The pre-sintered multi-layered dental mill blank according to any one of items [1] to [62], the top layer comprising yttria in a weight amount of at least 9.0 wt. % (e.g., in the range of 9.0 to 12.0 wt. %), like at least 9.5 wt. %, like in the range of 9.5 to 10.5 wt. %, based on the total weight of the top layer, and the bottom layer comprising yttria in a weight amount of at most 7.5 wt. %, like at most 7.0 wt. %, like in the range of 5.5 to 7.5 wt. %, based on the total weight of the bottom layer.

[64] The pre-sintered multi-layered dental mill blank according to any one of items [1] to [63], each one of the at least one intermediate layer comprising 5.0 to 11.0 wt. %, 6.0 to 10.5 wt. %, 6.5 to 10.0 wt. %, or 7.0 to 9.5 wt. % of yttria, based on the total weight of the respective layer of the at least one intermediate layer.

[65] The pre-sintered multi-layered dental mill blank according to any one of items [1] to [64], each one of the at least one intermediate layer comprising at least 5.0 wt. %, at least 6.0 wt. %, at least 6.5 wt. %, or at least 7.0 wt. %, based on the total weight of the respective layer of the at least one intermediate layer, and/or the at least one intermediate layer comprising at most 11.0 wt. %, at most 10.5 wt. %, at most 10.0 wt. %, or 9.5 wt. %, based on the total weight of the respective layer of the at least one intermediate layer.

[66] The pre-sintered multi-layered dental mill blank according to any one of items [1] to [65], comprising, or being composed of, the following layers:
a top layer L4,
an intermediate layer L3,
an intermediate layer L2, a bottom layer L1, and the top layer L4 comprising yttria in a weight amount in the range of 7.0 to 13.0 wt. %, 8.0 to 12.0 wt. %, 9.0 to 11.0 wt. %, or 9.5 to 10.5 wt. %, based on the total weight of the top layer, the intermediate layer L3 comprising yttria in a weight amount in the range of 6.0 to 11.0 wt. %, 7.5 to 10.5 wt. % or 8.5 to 10.0 wt. %, or 9.0 to 9.5 wt. %, based on the total weight of the intermediate layer L3, the intermediate layer L2 comprising yttria in a weight amount in the range of 4.5 to 9.0 wt. %, 5.5 to 8.0 wt. %, 6.0 to 7.5 wt. %, or 6.5 to 7.3 wt. %, based on the total weight of the intermediate layer L2, and the bottom layer L1 comprising yttria in a weight amount in the range of 4.0 to 9.0 wt. %, 5.0 to 8.0 wt. %, 5.5 to 7.5 wt. %, or 6.0 to 6.8 wt. %, based on the total weight of the bottom layer L1.

[67] The pre-sintered multi-layered dental mill blank according to any one of items [1] to [66], the top layer having an yttria content, based on the total weight of the top layer, that is higher by at least 1.0 percent point, at least 2.0 percent points, at least 2.5 percent points, or at least 3.0 percent points, than the yttria content of the bottom layer, based on the total weight of the bottom layer, and/or the top layer having an yttria content, based on the total weight of the top layer, that is higher by at most 8.0 percent points, at most 6.0 percent points, at most 5.0 percent points, or at most 4.0 percent points, than the yttria content of the bottom layer, based on the total weight of the bottom layer.

[68] The pre-sintered multi-layered dental mill blank according to any one of items [1] to [67], the top layer having an yttria content, based on the total weight of the top layer, that is higher in the range of 1.0 to 8.0 percent points, 2.0 to 6.0 percent points, 2.5 to 5.0 percent points, or 3.0 to 4.0 percent points, than the yttria content of the bottom layer, based on the total weight of the bottom layer.

[69] The pre-sintered multi-layered dental mill blank according to any one of items [1] to [68], each layer having an yttria content that differs from an yttria content of an adjacent layer by at least 0.3 percent point, at least 0.5 percent point, at most 3.0 percent points, at most 2.5 percent points, or in the range of 0.3 to 3.0 percent points, or 0.5 to 2.5 percent points, wherein the yttria content of a layer is based on the total weight of that layer.

[70] The pre-sintered multi-layered dental mill blank according to any one of items [1] to [69], comprising, or being composed of:

a top layer L4 obtainable from an yttria-stabilized zirconia powder P3, an intermediate layer L3 obtainable from a mixture of yttria-stabilized zirconia powders P2 and P3, an intermediate layer L2 obtainable from a mixture of yttria-stabilized zirconia powders P1 and P2, a bottom layer L1 obtainable from an yttria-stabilized zirconia powder P1, and the powders P1 to P3 being three yttria-stabilized zirconia powders with powder P1 having an yttria content in the range of 4.5 to 6.1 wt. %, powder P2 having an yttria content in the range of 6.2 to 7.9 wt. %, and powder P3 having an yttria content in the range of 8.0 to 11.0 wt. %.

[71] The pre-sintered multi-layered dental mill blank according to any one of items [1] to [70], comprising, or being composed of:

a top layer L4, which is a pre-sintered top powder layer of powder P3, an intermediate layer L3, which is a pre-sintered intermediate powder layer of a mixture of powders P2/P3, an intermediate layer L2, which is a pre-sintered intermediate powder layer of a mixture of powders P1/P2, a bottom layer L1, which is a pre-sintered bottom powder layer of powder P1, and the powders P1 to P3 being three yttria-stabilized zirconia powders with powder P1 having an yttria content in the range of 4.5 to 6.1 wt. %, powder P2 having an yttria content in the range of 6.2 to 7.9 wt. %, and powder P3 having an yttria content in the range of 8.0 to 11.0 wt. %.

[72] The pre-sintered multi-layered dental mill blank according to any one of items and [71], the yttria content of powders P1 and P2 differing by at least 0.7 percent point, at least 1.0 percent point, at least 1.2 percent points, at most 3.0 percent points, at most 2.8 percent points, at most 2.5 percent points, in the range of 0.7 to 3.0 percent points, in the range of 1.0 to 2.8 percent points, or in the range of 1.2 to 2.5 percent points, and the yttria content of powders P2 and P3 differing by at least 0.7 percent point, at least 1.0 percent point, at least 1.2 percent points, at most 3.0 percent points, at most 2.8 percent points, at most 2.5 percent points, in the range of 0.7 to 3.0 percent points, in the range of 1.0 to 2.8 percent points, or in the range of 1.2 to 2.5 percent points.

[73] The pre-sintered multi-layered dental mill blank according to any one of items [70] to [72], the mixture of powders P1/P2 containing powders P1 and P2 in a weight ratio of powder P1 to powder P2 in the range of 10:90 to 40:60, in the range of 15:85 to 35:65, in the range of 20:80 to 30:70, or in the range of 22:78 to 28:72, and/or the mixture of powders P2/P3 containing powders P2 and P3 in a weight ratio of powder P2 to powder P3 in the range of 10:90 to 40:60, in the range of 15:85 to 35:65, in the range of 20:80 to 30:70, or in the range of 22:78 to 28:72.

[71] The pre-sintered multi-layered dental mill blank according to any one of items [1] to [73], the bottom layer comprising a sintering inhibitor, and optionally each one of the at least one intermediate layer comprising a sintering inhibitor.

[75] The pre-sintered multi-layered dental mill blank according to item [74], the bottom layer comprising the sintering inhibitor in an amount that is higher than an amount of the sintering inhibitor in the top layer, and optionally the amount of the sintering inhibitor decreasing layer-by-layer from the bottom layer to the top layer.

[73] The pre-sintered multi-layered dental mill blank according to any one of items and [75], the bottom layer comprising the sintering inhibitor in an amount of at least 0.4 wt. %, at least 0.6 wt. %, at least 0.8 wt. %, at most 2.5 wt. %, at most 2.0 wt. %, at most 1.5 wt. %, or in the range of 0.4 to 2.5 wt. %, 0.6 to 2.0 wt. % or 0.8 to 1.5 wt. %, based on the total weight of the bottom layer.

[77] The pre-sintered multi-layered dental mill blank according to any one of items [1] to [76], each of the at least one intermediate layer comprising a sintering inhibitor in an amount of at least 0.02 wt. %, at least 0.05 wt. %, at most 2.0 wt. %, at most 1.5 wt. %, at most 1.2, or in the range of 0.02 to 2.0 wt. %, 0.05 to 1.5 wt. % or 0.05 to 1.2 wt. %, based on the total weight of the respective layer of the at least one intermediate layer.

[78] The pre-sintered multi-layered dental mill blank according to any one of items [1] to [77], the top layer comprising a sintering inhibitor in a weight amount of at least 0.01 wt. %, at least 0.02 wt. %, at least 0.05 wt. %, at most 1.0 wt. %, at most 0.8 wt. %, at most 0.5 wt. %, in the range of 0.01 to 1.0 wt. %, 0.02 to 0.8 wt. %, or 0.05 to 0.5 wt. %, based on the total weight of the top layer.

[79] The pre-sintered multi-layered dental mill blank according to any one of items [74] to [78], the sintering inhibitor being obtainable by converting a sintering inhibitor precursor into the sintering inhibitor when pre-sintering a green body of the multi-layered dental mill blank.

[80] The pre-sintered multi-layered dental mill blank according to any one of items [1] to [79], each layer comprising a sintering activator (e.g., zinc oxide, gallium oxide, or a combination thereof), and the bottom layer, and optionally each one of the at least one intermediate layer, comprising a sintering inhibitor (e.g., type-II-yttria).

[81] The pre-sintered multi-layered dental mill blank according to any one of items [74] to [80], the sintering inhibitor being $La_2O_3$, $Yb_2O_3$, $Tm_2O_3$, type-II-yttria, erbium oxide, or any combination thereof, optionally the sintering inhibitor being $La_2O_3$, type-II-yttria, erbium oxide, or any combination thereof, and optionally the sintering inhibitor being type-II-yttria, erbium oxide, or a combination thereof.

[82] The pre-sintered multi-layered dental mill blank according to any one of items [74] to [81], the sintering inhibitor being type-II-yttria, optionally in combination with erbium oxide.

[83] The pre-sintered multi-layered dental mill blank according to any one of items [1] to [82], the top layer having an aluminum content that is the lowest aluminum content of all the layers,
   optionally the aluminum content of the layers increases layer-by-layer from the top layer in the direction of the bottom layer for at least two layers.

[84] The pre-sintered multi-layered dental mill blank according to any one of items [1] to [83], comprising, or being composed of, the following layers:
   a top layer L4,
   an intermediate layer L3,
   an intermediate layer L2,
   a bottom layer L1,
   wherein a weight content of aluminum oxide in each one of the layers L1 and L2 is higher than a weight content of aluminum oxide in layer L3, and a weight content of aluminum oxide in layer L3 is higher than a weight content of aluminum oxide in layer L4,
   the weight content of aluminum oxide of a layer being determined on the total weight of the respective layer.

[85] The pre-sintered multi-layered dental mill blank according to any one of items [1] to [84], the bottom layer comprising at least 0.01 wt. %, at least 0.02 wt. %, or at least 0.05 wt. % of aluminum oxide, based on the total weight of the bottom layer, and/or at most 0.50 wt. %, at most 0.40 wt. %, at most 0.20 wt. % or at most 0.15 wt. %, of aluminum oxide, based on the total weight of the bottom layer.

[86] The pre-sintered multi-layered dental mill blank according to any one of items [1] to [85], the bottom layer comprising 0.01 to 0.50 wt. %, 0.02 to 0.40 wt. %, or 0.05 to 0.20 wt. % of aluminum oxide, based on the total weight of the bottom layer.

[87] The pre-sintered multi-layered dental mill blank according to any one of items [1] to [86], each layer comprising coloring metal oxides.

[88] The pre-sintered multi-layered dental mill blank according to item [87], each layer comprising the coloring metal oxides in an amount of at least 0.01 wt. %, 0.02 wt. %, at least 0.05 wt. %, at most 1.5 wt. %, at most 1.2 wt. %, at most 1.0 wt. %, or in the range of 0.01 to 1.5 wt. %, in the range of 0.02 to 1.2 wt. %, or in the range of 0.05 to 1.0 wt. %, based on the total weight of the respective layer.

[89] The pre-sintered multi-layered dental mill blank according to item or [88], the coloring metal oxides comprising iron oxide, manganese oxide, praseodymium oxide, chromium oxide, erbium oxide, terbium oxide, or mixtures thereof.

[90] The pre-sintered multi-layered dental mill blank according to any one of items [1] to [89], the bottom layer comprising
   85 to 94 wt. %, like in the range of 88 to 94 wt. %, like in the range of 90 to 92 wt. %, of zirconia,
   ≤5.0 wt. %, like ≤3.0 wt. %, like in the range of 0.5 to 3.0 wt. %, of hafnium dioxide,
   0.01 to 0.50 wt. %, like in the range of 0.02 to 0.40 wt. %, like in the range of 0.05 to 0.20 wt. %, of aluminum oxide,
   4.0 to 9.0 wt. %, like in the range of 5.0 to 8.0 wt. %, like in the range of 5.5 to 7.5 wt. %, of yttria,
   0.01 to 1.5 wt. %, like in the range of 0.02 to 1.2 wt. %, like in the range of 0.05 to 1.0 wt. %, of coloring metal oxides,
   0.02 to 0.80 wt. %, like in the range of 0.02 to 0.50 wt. %, like in the range of 0.05 to 0.30 wt. %, of a sintering activator (e.g., zinc oxide, gallium oxide, or a combination thereof),
   based on the total weight of the bottom layer, wherein the weight amounts of the components are optionally selected to add up to 100 wt. %.

[91] The pre-sintered multi-layered dental mill blank according to any one of items [1] to [90], the top layer comprising
   80 to 92 wt. %, like in the range of 85 to 91 wt. %, like in the range of 87 to 90 wt. %, of zirconia,
   ≤5.0 wt. %, like ≤3.0 wt. %, like in the range of 0.5 to 3.0 wt. %, of hafnium dioxide,
   7.0 to 13.0 wt. %, like in the range of 8.0 to 12.0 wt. %, like in the range of 9.0 to 11.0 wt. %, of yttria,
   <0.01 wt. % of aluminum oxide,
   0.01 to 1.5 wt. %, like in the range of 0.02 to 1.2 wt. %, like in the range of 0.05 to 1.0 wt. %, of coloring metal oxides,
   0.02 to 0.80 wt. %, like in the range of 0.02 to 0.50 wt. %, like in the range of 0.10 to 0.30 wt. %, of a sintering activator (e.g., zinc oxide, gallium oxide, or a combination thereof),
   based on the total weight of the top layer, wherein the weight amounts of the components are optionally selected to add up to 100 wt. %.

[92] The pre-sintered multi-layered dental mill blank according to any one of items [1] to [91], each one of the at least one intermediate layer comprising
   82 to 94 wt. %, like in the range of 85 to 93 wt. %, like in the range of 87 to 92 wt. %, of zirconia,
   ≤5.0 wt. %, like ≤3.0 wt. %, like in the range of 0.5 to 3.0 wt. %, of hafnium dioxide,
   0.01 to 0.50 wt. %, like in the range of 0.02 to 0.20 wt. %, like in the range of 0.02 to 0.15 wt. % of aluminum oxide,
   5.0 to 11.0 wt. %, like in the range of 6.0 to 10.5 wt. %, like in the range of 6.5 to 10.0 wt. %, of yttria,
   0.01 to 1.5 wt. %, like in the range of 0.02 to 1.2 wt. %, like in the range of 0.05 to 1.0 wt. %, of coloring metal oxides, 0.02 to 0.80 wt. %, like in the range of 0.02 to 0.50 wt. %, like in the range of 0.05 to 0.30 wt. %, of a sintering activator (e.g., zinc oxide, gallium oxide, or a combination thereof), based on the total weight of the respective layer of the at least one intermediate layer, wherein the weight amounts of the components are optionally selected to add up to 100 wt. %.

[93] The pre-sintered multi-layered dental mill blank according to any one of items [1] to [92], comprising, or being composed of, the following layers:

a top layer L4,
an intermediate layer L3,
an intermediate layer L2, and
a bottom layer L1,
and the layers L4 to L1 comprising the components as defined herein in one of tables I to III.

[94] The pre-sintered multi-layered dental mill blank according to any one of items [1] to [93], comprising yttria-stabilized zirconia in a weight amount of at least 80 wt. %, at least 90 wt. %, at least 95 wt. %, at least 97 wt. %, or in the range of 80 to 99.5 wt. %, 90 to 99.5 wt. %, 95 to 99.0 wt. %, or 97 to 98.5 wt. %, based on the total weight of the pre-sintered multi-layered dental mill blank.

[95] The pre-sintered multi-layered dental mill blank according to any one of items [1] to [94], comprising a combined weight amount of zirconia, yttria and hafnium dioxide of at least 90 wt. %, at least 95 wt. %, at least 98 wt. %, at most 99.8 wt. %, at most 99.4 wt. %, at most 99.2 wt. %, or in the range of 90 to 99.8 wt. %, 95 to 99.5 wt. %, 98 to 99.2 wt. %, based on the total weight of the pre-sintered multi-layered dental mill blank.

[96] The pre-sintered multi-layered dental mill blank according to any one of items [1] to [95], comprising aluminum oxide in a weight amount of at least 0.005 wt. %, at least 0.02 wt. %, or at least 0.05 wt. %, at most 0.4 wt. %, at most 0.2 wt. %, or at most 0.1 wt. %, or in the range of 0.005 to 0.4 wt. %, 0.02 to 0.2 wt. %, or 0.05 to 0.1 wt. %, based on the total weight of the pre-sintered multi-layered dental mill blank.

[97] The pre-sintered multi-layered dental mill blank according to any one of items [1] to [96], being pre-shaded, and optionally comprising coloring metal oxides in a weight amount of at least 0.01 wt. %, at least 0.02 wt. %, at least 0.05 wt. %, at most 1.5 wt. %, at most 1.0 wt. %, at most 0.8 wt. %, or in the range of 0.01 to 1.5 wt. %, 0.02 to 1.0 wt. %, or 0.05 to 0.8 wt. %, based on the total weight of the pre-sintered multi-layered dental mill blank.

[98] The pre-sintered multi-layered dental mill blank according to any one of items [1] to [97], comprising a sintering activator (e.g., zinc oxide, gallium oxide, or a combination thereof), in a weight amount of at least 0.02 wt. %, at least 0.05 wt. %, at least 0.10 wt. %, at least 0.15 wt. %, at most 0.8 wt. %, at most 0.45 wt. %, at most 0.30 wt. % or at most 0.25 wt. %, or in the range of 0.02 to 0.8 wt. %, 0.05 to 0.45 wt. %, 0.10 to 0.30 wt. % or 0.15 to 0.25 wt. %, based on the total weight of the pre-sintered multi-layered dental mill blank.

[99] The pre-sintered multi-layered dental mill blank according to any one of items [1] to [98], comprising a sintering inhibitor (e.g., type-II-yttria, optionally in combination with erbium oxide) in a weight amount of at least 0.1 wt. %, at least 0.2 wt. %, at least 0.3 wt. %, at least 0.5 wt. %, at most 2.5 wt. %, at most 2.0 wt. %, at most 1.5 wt. % or at most 1.2 wt. %, or in the range of 0.1 to 2.5 wt. %, 0.2 to 2.0 wt. %, 0.3 to 1.5 wt. % or 0.5 to 1.2 wt. %, based on the total weight of the pre-sintered multi-layered dental mill blank.

[100] The pre-sintered multi-layered dental mill blank according to any one of items [1] to [99], comprising
80 to 95 wt. %, like in the range of 85 to 93 wt. %, like in the range of 89 to 91 wt. %, of zirconia,
≤5 wt. %, like ≤3 wt. %, like in the range of 0.5 to 3.0 wt. %, of hafnium dioxide,
5.0 to 10.0 wt. %, like in the range of 6.0 to 9.0 wt. %, like in the range of 6.5 to 8.5 wt. %, of yttria,
≤0.4 wt. %, like in the range of 0.02 to 0.2 wt. %, like in the range of 0.05 to 0.1 wt. %, of aluminum oxide,
0.01 to 1.5 wt. %, like in the range of 0.02 to 1.0 wt. %, like in the range of 0.05 to 0.8 wt. %, of coloring metal oxides,
0.02 to 0.8 wt. %, 0.05 to 0.45 wt. %, 0.10 to 0.30 wt. % of a sintering activator (e.g., zinc oxide, gallium oxide, or a combination thereof),
based on the total weight of the pre-sintered multi-layered dental mill blank, and wherein the weight amounts of the components are optionally selected to add up to 100 wt. %.

[101] The pre-sintered multi-layered dental mill blank according to any one of items [1] to [100], being characterized by providing a representative test section for each layer, the representative test section of the top layer and the representative test section of the bottom layer, when being fully sintered by a speed sintering process, each has a maximum sintering rate at a temperature T of the speed sintering process, and the temperature T for the top layer ($T_{TL}$) and the bottom layer ($T_{BL}$) differing by not more than 40° C. or not more than 25° C., optionally the representative test section of each layer, when being fully sintered by a speed sintering process, has a maximum sintering rate at a temperature T of the speed sintering process, and the temperature T for each one of the layers differing by not more than 40° C. or not more than 25° C.

[102] The pre-sintered multi-layered dental mill blank according to any one of items [1] to [101], being characterized by providing a test section for the top layer, the representative test section of the top layer, when being fully sintered by a speed sintering process, having a flexural strength of at least 500 MPa, at least 550 MPa, at least 575 MPa, at least 600 MPa, at most 1100 MPa, at most 1000 MPa, at most 800 MPa, or at most 750 MPa, or in the range of 500 to 1100 MPa, 550 to 1000 MPa, 575 to 800 MPa, or 600 to 750 MPa.

[103] The pre-sintered multi-layered dental mill blank according to any one of items [1] to [102], being characterized by providing a test section for the bottom layer, the representative test section of the bottom layer, when being fully sintered by a speed sintering process, having a flexural strength of at least 900 MPa, at least 1000 MPa, at least 1050 MPa, at most 1500 MPa, at most 1300 MPa, at most 1200 MPa, or in the range of 900 to 1500 MPa, 1000 to 1300 MPa, or 1050 to 1200 MPa.

[104] The pre-sintered multi-layered dental mill blank according to any one of items [1] to [103], being characterized by providing a test section for the top layer, the representative test section of the top layer, when being fully sintered by a speed sintering process, having a fracture toughness $K_{IC}$ of at least 2.5 MPa*m$^{1/2}$, at least 2.7 MPa*m$^{1/2}$, at least 2.8 MPa*m$^{1/2}$, at most 3.5 MPa*m$^{1/2}$, at most 3.3 MPa*m$^{1/2}$, or at most 3.2 MPa*m$^{1/2}$, or in the range of 2.5 to 3.5 MPa*m$^{1/2}$, 2.7 to 3.3 MPa*m$^{1/2}$, or 2.8 to 3.2 MPa*m$^{1/2}$.

[105] The pre-sintered multi-layered dental mill blank according to any one of items [1] to [104], being characterized by providing a test section for the bottom layer, the representative test section of the bottom layer, when being fully sintered by a speed sintering process, having a fracture toughness $K_{IC}$ of at least 3.6 MPa*m$^{1/2}$, at least 3.8 MPa*m$^{1/2}$, at least 4.0 MPa*m$^{1/2}$, at most 5.5 MPa*m$^{1/2}$, at most 4.8 MPa*m$^{1/2}$, or at most 4.4 MPa*m$^{1/2}$, or in the range of 3.6 to 5.5 MPa*m$^{1/2}$, 3.8 to 4.8 MPa*m$^{1/2}$, or 4.0 to 4.4 MPa*m$^{1/2}$.

[106] The pre-sintered multi-layered dental mill blank according to any one of items [1] to [105], said speed sintering process being a sintering process having a total duration of less than 25 minutes and having a maximum sintering temperature in the range of 1350 to 1650° C.

[107] The pre-sintered multi-layered dental mill blank according to any one of items [1] to [106], said speed sintering process being a sintering process consisting of the following steps:
  a first heating step starting at 25° C. and ending at 1050° C. with a heating rate of 200 K/min,
  a second heating step starting at 1050° C. and ending at 1450° C. with a heating rate of 100 K/min,
  a holding step maintaining the temperature at 1450° C. for 2 min,
  a first cooling step starting at 1450° C. and ending at 1350° C. with a cooling rate of 130 K/min,
  a second cooling step starting at 1350° C. and ending at 1200° ° C. with a cooling rate of 70 K/min, followed by a cool down, and
  wherein said first and second heating steps are carried out at a pressure in the range of 50 to 100 mbar (e.g., 80 mbar) by applying a vacuum until a temperature of 1400° C. is reached, and once the temperature of 1400° C. is reached the vacuum is exchanged with air.

[108] The pre-sintered multi-layered dental mill blank according to any one of items [1] to [107], comprising at least two intermediate layers, and
  optionally being composed of a top layer L4, an intermediate layer L3, an intermediate layer L2, and a bottom layer L1.

[109] The pre-sintered multi-layered dental mill blank according to any one of items [1] to [108], the bottom layer having a height of at least 30%, at least 40%, at least 45%, at least 50%, or at least 52%, relative to the overall height of the pre-sintered multi-layered dental mill blank, and/or a height of at most 75%, at most 70%, at most 68%, or at most 66%, relative to the overall height of the pre-sintered multi-layered dental mill blank,
  or the bottom layer having a height in the range of 30 to 75%, 40 to 75%, 45 to 70%, 50 to 68%, or 52 to 66%, relative to the overall height of the pre-sintered multi-layered dental mill blank.

[110] The pre-sintered multi-layered dental mill blank according to any one of items [1] to [109], the top layer having a height in the range of 8 to 35%, 10 to 30%, 12% to 28%, 15 to 25%, or 17 to 23%, relative to the overall height of the pre-sintered multi-layered dental mill blank, or
  the top layer having a height of at least 8%, at least 10%, at least 12%, at least 15%, or at least 17%, relative to the overall height of the pre-sintered multi-layered dental mill blank, and/or the top layer having a height of at most 35%, at most 30%, at most 28%, at most 25%, at most 23%, relative to the overall height of the pre-sintered multi-layered dental mill blank.

[111] The pre-sintered multi-layered dental mill blank according to any one of items [1] to [110], each of the at least one intermediate layer having a height in the range of 2 to 25%, 4 to 20%, 6 to 15%, or 8 to 12%, relative to the overall height of the pre-sintered multi-layered dental mill blank, and/or the combined intermediate layers having a height in the range of 5 to 40%, 10 to 30%, 14 to 26%, or 16 to 25%, relative to the overall height of the pre-sintered multi-layered dental mill blank.

[112] The pre-sintered multi-layered dental mill blank according to any one of items [1] to [111], having a density, relative to its theoretical density, of at least 45%, at least 50% at least 52%, at most 70%, at most 60%, at most 55%, like in a range of 45 to 70%, 50 to 60%, or 52 to 55%.

[113] The pre-sintered multi-layered dental mill blank according to any one of items [1] to [112], being obtainable by pre-sintering a green body of the pre-sintered multi-layered dental mill blank at a maximum pre-sintering temperature of at least 700° C., at least 750° C., at least 800° C., at least 825° C., at most 1100° C., at most 1000° C., at most 950° C., at most 900° C., like in the range of 700 to 1100° C., in the range of 750 to 1000° C., in the range of 800 to 950° C. or in the range of 825 to 900° C.

[114] A pre-sintered multi-layered dental mill blank being obtainable by a process according to any one of items [115] to [133].

[115] A process for preparing a pre-sintered multi-layered dental mill blank, the process comprising the steps of:
  a) providing three yttria-stabilized zirconia powders P1 to P3, powder P1 having an yttria content in the range of 4.5 to 6.1 wt. %, powder P2 having an yttria content in the range of 6.2 to 7.9 wt. %, and powder P3 having an yttria content in the range of 8.0 to 11.0 wt. %,
  b) preparing a green body comprising or being composed of:
  a top powder layer of powder P3,
  at least one intermediate powder layer of a powder mixture being selected from a mixture of powders P2/P3 and a mixture of powders P1/P2,
  a bottom powder layer of powder P1 or of a mixture of powders P1/P2,
  c) pre-sintering the green body to provide a pre-sintered multi-layered dental mill blank.

[116] The process according to item [115], the green body being composed of:
  a top powder layer of powder P3,
  an intermediate powder layer of a mixture of powders P2/P3,
  an intermediate powder layer of a mixture of powders P1/P2,
  a bottom powder layer of powder P1.

[117] The process according to any one of items [115] and [116], the yttria content of powders P1 and P2 differing by at least 0.7 percent point, at least 1.0 percent point, at least 1.2 percent points, at most 3.0 percent points, at most 2.8 percent points, at most 2.5 percent points, in the range of 0.7 to 3.0 percent points, in the range of 1.0 to 2.8 percent points, or in the range of 1.2 to 2.5 percent points, and the yttria content of powders P2 and P3 differing by at least 0.7 percent point, at least 1.0 percent point, at least 1.2 percent points, at most 3.0 percent points, at most 2.8 percent points, at most 2.5 percent points, in the range of 0.7 to 3.0 percent points, in the range of 1.0 to 2.8 percent points, or in the range of 1.2 to 2.5 percent points.

[118] The process according to any one of items [115] to [117], the powder P1 having an yttria content in the range of 4.9 to 6.0 wt. %, or powder P2 having an yttria content in the range of 6.5 to 7.6 wt. %, or powder P3 having an yttria content in the range of 9.0 to 10.5 wt. %,
optionally powder P1 having an yttria content in the range of 4.9 to 6.0 wt. %, powder P2 having an yttria content in the range of 6.5 to 7.6 wt. %, and powder P3 having an yttria content in the range of 9.0 to 10.5 wt. %.

[119] The process according to any one of items [115] to [118], the mixture of powders P2/P3 containing powders P2 and P3 in a weight ratio [powder P2:powder P3] in the range of 10:90 to 40:60, in the range of 15:85 to 35:65, or in the range of 20:80 to 30:70, and/or
the mixture of powders P1/P2 containing powders P1 and P2 in a weight ratio [powder P1:powder P2] in the range of 10:90 to 40:60, in the range of 15:85 to 35:65, or in the range of 20:80 to 30:70.

[120] The process according to any one of items [115] to [119], the process comprising adding one or more additives selected from the group consisting of sintering inhibitor precursors, sintering inhibitor precursors, and coloring additives, to the powders P1 to P3 or to the mixtures thereof.

[121] The process according to item [120], the one or more additives being added to the powders P1 to P3 before preparing the powder mixtures of powders P1/P2 and powders P2/P3.

[122] The process according to any one of items [115] to [121], the process comprising adding a sintering activator precursor to at least powder P3 or a mixture thereof, optionally to the powders P1 to P3 or to the mixtures thereof.

[123] The process according to item [122], the top powder layer having a weight content of the sintering activator precursor that is higher than a weight content of the sintering activator precursor in the bottom layer, optionally the weight content of the sintering activator precursor increases layer-by-layer from the bottom powder layer to the top powder layer.

[124] The process according to any one of items [122] and [123], the sintering activator precursor being a zinc salt, a gallium salt, or a combination thereof.

[125] The process according to any one of items [115] to [124], the process comprising adding a sintering inhibitor precursor at least to powder P1 or to the mixture thereof, optionally to the powders P1 and P2 or to the mixtures thereof.

[126] The process according to item [125], the bottom powder layer having a weight content of the sintering inhibitor precursor that is higher than a weight content of the sintering inhibitor precursor in the top layer,
optionally the weight content of the sintering inhibitor precursor decreases layer-by-layer from the bottom powder layer to the top powder layer.

[127] The process according to any one of items [125] and [126], the sintering inhibitor precursor being an yttrium salt, an erbium salt, a lanthanum salt, ytterbium salt, a thulium salt, or any combination thereof, optionally the sintering inhibitor precursor being an yttrium salt, an erbium salt, a lanthanum salt, or any combination thereof, and optionally the sintering inhibitor precursor being an yttrium salt, an erbium salt, or any combination thereof.

[128] The process according to any one of items [125] to [127], the sintering inhibitor precursor being an yttrium salt, optionally in combination with an erbium salt.

[129] The process according to any one of items [115] to [128], wherein the process does not contain adding an yttrium salt to the powder P3.

[130] The process according to any one of items [115] to [129], the process comprising adding coloring additives to the powders P1 to P3 or to the mixtures thereof.

[131] The process according to item [130], the coloring additives comprising an erbium compound and an iron compound.

[132] The process according to any one of items [115] to [131], the preparation of the green body comprising compacting (e.g., pressing) the powder layers, optionally with a pressure in the range of 200 to 400 MPa, like in a range of 250 to 350 MPa.

[133] The process according to any one of items [115] to [132], the pre-sintering having a maximum temperature of at least 700° C., at least 750° C., at least 800° C., at least 825° C., at most 1100° C., at most 1000° C., at most 950° C., at most 900° C., or in the range of 700 to 1100° C., in the range of 750 to 1000° C., in the range of 800 to 950° ° C. or in the range of 825 to 900° C.

[134] The process according to any one of items [115] to [133], the process being a process for preparing a pre-sintered multi-layered dental mill blank according to any one of items [1] to [113].

[135] A process for preparing a dental restoration, the process comprising the steps of:
machining a pre-sintered multi-layered dental mill blank according to any one of items [1] to to provide a dental restoration precursor;
optionally surface-treating the dental restoration precursor; and
sintering the dental restoration precursor to provide a dental restoration.

[136] The process according to item [135], the machining being carried out using a CAD/CAM process.

[137] A dental restoration obtainable by a process for preparing a dental restoration according to item or item [136].

[138] A process for sintering a dental restoration precursor,
the process having a total duration of less than 25 minutes and a maximum sintering temperature in the range of 1350 to 1650° C.,
the process comprising subjecting the dental restoration precursor to
(i) a heating treatment, and
(ii) a cooling treatment,
the cooling treatment comprising a cooling step A,
the cooling step A starting and ending within a temperature range between 1100° C. and the maximum sintering temperature, and having a cooling rate A that is at least 75 K/min.

[139] The process according to item [138], having a total duration of less than 20 minutes, less than 18 minutes, less than 16 minutes, or less than 15 minutes, like in the range of 5 to less than 20 minutes, 8 to less than 18 minutes, 10 to less than 16 minutes, or 12 to less than 15 minutes.

[140] The process according to item or [139], having a maximum sintering temperature in the range of 1400 to 1600° C., in the range 1400 to 1560° C., in the range of 1400 to 1500° C., or in the range of 1425 to 1475° C.

[141] The process according to any one of items [138] to [140], the cooling rate A being at least 100 K/min, at least 110 K/min, at least 120 K/min, at most 250 K/min, at most 200 K/min, at most 160 K/min, in the range of 100 to 250 K/min, in the range of 110 to 180 K/min, or in the range of 120 to 160 K/min.

[142] The process according to any one of items [138] to [141], the cooling step A starting and ending within a temperature range between 1200° C. and the maximum sintering temperature, or within a temperature range between 1250° C. and the maximum sintering temperature, or within a temperature range between 1300° C. and the maximum sintering temperature.

[143] The process according to any one of items [138] to [142], the cooling treatment comprising a cooling step B after the cooling step A, the cooling step B having a cooling rate B that is lower than cooling step A.

[144] The process according to item [143], the cooling rate B being at least 30 K/min, at least 50 K/min, at least 60 K/min, at most 110 K/min, at most 90 K/min, at most 80 K/min, in the range of 30 to 110 K/min, in the range of 50 to 90 K/min, or in the range of 60 to 80 K/min.

[145] The process according to any one of items [143] and [144], the cooling step B starting and ending within a temperature range between 1000° C. and an end temperature of the cooling step A, or within a temperature range between 1100° C. and an end temperature of the cooling step A, or within a temperature range between 1150° C. and an end temperature of the cooling step A, or within a temperature range between 1200° C. and an end temperature of the cooling step A.

[146] The process according to any one of items [138] to [145], the cooling treatment comprising a cooling step C after the cooling step A or after the cooling step B, the cooling step C having a cooling rate C that is at most 20 K/min, at most 10 K/min, at most 5 K/min, or is about 0 K/min (i.e., cooling step C is a holding step).

[147] The process according to any one of items [138] to [146], the cooling treatment ending at a final temperature, and being followed by a cool down, the final temperature of the cooling treatment being, at least 1000° C., at least 1100° C., at least 1150° C., at most 1300° C., at most 1280° C., at most 1250° C., in the range of 1000 to 1300° C., in the range of 1100 to 1280° C., or in the range of 1150 to 1250° C.

[148] The process according to any one of items [138] to [147], the heating treatment comprising a heating step A having a heating rate A of at least 150 K/min, at least 170 K/min, at least 190 K/min, at most 300 K/min, at most 250 K/min, at most 220 K/min, in the range of 150 to 300 K/min, in the range of 170 to 250 K/min, or in the range of 190 to 220 K/min.

[149] The process according to item [148], the heating treatment comprising a heating step B after the heating step A, the heating step B having a heating rate B being lower than the heating rate A, and the heating rate B being at least 50 K/min, at least 70 K/min, at least 90 K/min, at most 200 K/min, at most 150 K/min, at most 120 K/min, in the range of 50 to 200 K/min, in the range of 70 to 150 K/min, or in the range of 90 to 120 K/min.

[150] The process according to any one of items [138] to [149], the heating treatment comprising a heating step C being carried out at the maximum sintering temperature and having a heating rate of about 0 K/min (i.e., heating step C being a holding step at the maximum sintering temperature), and optionally the maximum sintering temperature being held in heating step C for at least 30 seconds, at least 1 minute, at most 5 minutes, at most 3 minutes, in the range of 30 seconds to 5 minutes, or in the range of 1 to 3 minutes.

[151] The process according to any one of items [138] to [150], the heating treatment being at least partially carried out at a pressure of 500 mbar or less, 200 mbar or less, 150 mbar or less, 100 mbar or less, in the range of 0.1 to 500 mbar, in the range of 1 to 200 mbar, in the range of 10 to 150 mbar, or in the range of 50 to 100 mbar.

[152] The process according to any one of items [138] to [151], the dental restoration precursor being pre-sintered, and/or having a density, relative to its theoretical density, of at least 45%, at least 50% at least 52%, at most 70%, at most 60%, at most 55%, like in a range of 45 to 70%, 50 to 60%, or 52 to 55%.

[153] The process according to any one of items [138] to [152], the dental restoration precursor comprising zirconia and yttria, and
optionally the dental restoration precursor comprising at least three sections, and each section comprising zirconia and yttria, and each section having a different yttria content.

[154] The process according to any one of items [138] to [153], the dental restoration precursor comprising coloring oxides, and optionally the coloring oxides comprising iron oxide.

[155] The process according to any one of items [138] to [154], the dental restoration precursor being prepared from a pre-sintered multi-layered dental mill blank that is optionally pre-shaded.

[156] The process according to item [155], the pre-sintered multi-layered dental mill blank comprising a top layer, a bottom layer, and at least one intermediate layer, each layer comprising zirconia and yttria, wherein the yttria content of the layers increases layer-by-layer from the bottom layer to the top layer.

[157] The process according to any one of items [138] to [156], the dental restoration precursor being prepared from a pre-sintered multi-layered dental mill blank according to any one of items [1] to [114].

VI. Example Section

1. Measuring Methods 1.1 Contrast Ratio (CR) and Colors (CIE L*, a*, b*)

Contrast ratio (CR) was measured according to BS 5612 on a specimen having a thickness of 0.80 mm (±0.02 mm). Colors (CIE L*, a*, b*) were measured according to DIN 6174 on a specimen having a thickness of 0.80 mm (±0.02 mm). Colors (CIE L*, a*, b*) were measured against a background of: L*=93.1; a*=(−0.64); b*=4.22. The measurements were made using a spectrophotometer CM 3700-D (Konica-Minolta). Prior to the measurement, the specimen were wet ground to a thickness of 0.80 mm (±0.02 mm) using a rotating diamond grinding disc and 1000 SiC grinding paper, followed by a final surface wet-polishing using a diamond grind disc (20 μm).

1.2 Flexural Strength and Fracture Toughness

Flexural strength was determined according to ISO 6872: 2015.

Fracture toughness ($K_{Ic}$) was determined following the experimental conditions and the procedure described in chapters 5, 6 and 7 of ISO14627 and was calculated using the Niihara equation for palmquist cracks. The indentation load of the Vickers indenter was 2.5-5 kg (top layer), 2.5-10 kg (intermediate layer(s)), and 10-20 kg (bottom layer). Vickers indentation loads for powders 1 to 3 are 10-20 kg (powder 1), 5-10 kg (powder 2), and 2.5-5 kg (powder 3). The Niihara equation for palmquist cracks is as follows:

$$\left(\frac{K_{Ic}\phi}{Ha^{\frac{1}{2}}}\right)\left(\frac{H}{E\phi}\right)^{\frac{2}{5}} = 0.035\left(\frac{L}{a}\right)^{-1/2}$$

wherein $K_{Ic}$ is the Mode I critical stress intensity factor; φ is the constraint factor, His the hardness, E is the Young's modulus, a is the half-diagonal of the Vickers indent and L is as follows:

$$L = \left(\frac{c}{a} - 1\right) * a$$

wherein a is the half-diagonal of the Vickers indent and c is the radius of the surface crack. The Niihara equation for palmquist cracks is also described in detail in K. Niihara et al, *Journal of Materials Science Letters*, 1 (1982) 13-16, which is incorporated herein by reference.

1.3 Number of Pores Per Grain

Number of pores per grain (including number of intragranular pores per grain) were determined according to the following test protocol:

subject a surface of a fully sintered representative test section to a polishing sequence using a series of polishing steps (1) to (3): (1) diamond polishing 20 μm; (2) polishing with a polishing tool with size 70, 15, 6 and 0.5 μm (e.g., Apex polishing tool); (3) polishing with a dispersion of nanosilica (e.g., 2 min), and rinsing with water (e.g., 2 min);

prepare an image of the polished surface by scanning electron microscopy (SEM);

select a surface area of the SEM image (also referred herein as ROI, i.e., region of interest) using an image analysis software (e.g., Olympus software): the ROI is of at least 50 μm² (e.g., in the range of 50 to 2000 μm², in the range of 50 to 1500 μm², in the range of 50 to 1000 μm², in the range of 50 to 500 μm², or in the range of 50 to 300 μm²) and shows at least 50 grains (e.g., 50 to 400 grains);

determine the number-average grain size for the grains shown in the ROI: (1) determining a preliminary number-average grain size using the line intersection method according to DIN EN 623-3 or ASTM E 112, (2) multiplying the obtained value with a proportionality constant of 1.56 to obtain the number-average grain size in the three-dimensional microstructure according to M. I. Mendelson, J. Am. Ceram. Soc. 1969, 52(8), 443-446, which is incorporated herein by reference;

identify and count grains and pores (including intergranular pores and intragranular pores) and calculate number of pores per grain.

2. Screening Methods

Screening or orientation experiments, e.g., for testing a sintering behavior of sintering activators or inhibitors, raw materials and/or coloring oxides, may be carried out starting from mono-layer pressed powders as green bodies, and using one continuous sintering process, i.e., without a separate preparation of a pre-sintered body.

An exemplary test protocol may be as follows. A raw material, which has optionally been treated with a sintering additive and/or a coloring additive, is provided and sieved using a 200 μm mesh screen. A specimen is prepared by pressing the respective powder material using an uniaxial laboratory press and a stainless steel mold, e.g., having a diameter Ø 24 mm. The amount of the respective powder material per specimen is 1.2 g-1.4 g. The pressing height of the green ingot is 1.75 mm. The applied pressing pressure is 300 MPa (60 kN) for 10 sec. The pressed specimen are ground using 1000 SiC paper prior to thermal treatment. The upper and lower surface of the specimen is reduced by at least 0.2 mm to a final thickness in the green state of 1.35 mm. The pressed specimen are fully sintered in a sinter furnace according to the sintering process comprising a pre-sintering (including debindering) step at about 900° C. for about 120 min, followed by fully sintering at a maximum sintering temperature between 1350 to 1500° C., e.g., 1450° C. Densification/sintering shrinkage may be followed during sintering as is known in the art and the values may be plotted against the temperature to provide a sintering curve. After the sintering, the specimen are wet ground using a grinding machine and a diamonds grinding disc (15 μm) to provide specimen with a thickness of 1.00±0.02 mm. Contrast ratio (CR) and optical properties are measured as described above with specimen having a thickness of 1.00±0.02 mm.

3. Materials 3.1 Yttria-Stabilized Zirconia Powders

Three different yttria-stabilized zirconia powders with a composition as described in table 1 were used as raw materials for preparing the pre-sintered multi-layered mill blanks according to embodiments of the present invention. Powders 1 to 3 were commercially obtained from DAIICHI KIGENSO KAGAKU KOGYO CO., LTD. The product HSY-3FSD-103 was used as powder 1, the product HSY-0250 was used as powder 2, and the product HSY-0451 was used as powder 3.

TABLE 1

|  |  | Powder 1 | Powder 2 | Powder 3 |
| --- | --- | --- | --- | --- |
| Y-TZP type |  | 3Y-TZP-LA | 4Y-TZP-LA | 5Y-TZP-NA |
| Zirconia (ZrO$_2$) | [wt. %] | 92.5 | 91.1 | 88.5 |
| Hafnium oxide (HfO$_2$) | [wt. %] | 1.8 | 1.8 | 1.7 |
| Yttria (Y$_2$O$_3$) | [wt. %] | 5.6 | 7.0 | 9.8 |
| Aluminum oxide (Al$_2$O$_3$) | [wt. %] | 0.1 | 0.1 | ≤0.005 |
| other oxides | [wt. %] | <0.2 | <0.2 | <0.2 |

3.2 Additives

Y(NO$_3$)$_3$*6H$_2$O was used as a sintering inhibitor precursor and Zn(NO$_3$)$_3$*6H$_2$O was used as a sintering activator precursor.

As coloring additives, an aqueous nitrate salt coloring solution was used comprising polyvalent metal cations of Fe, Mn, Pr, Tb, Cr, and Er.

3.3 Comparative Dental Mill Blank

A commercially available pre-shaded (A3 shade) multi-layered dental mill blank was used as a comparative dental mill blank.

The comparative dental mill blank was prepared using powders 4 and 5 as described in table 2 below as raw starting materials. Powder 4 was commercially available as product TZ-PX-471 (TOSOH Corp) and powder 5 was commercially available as product Zpex smile (TOSOH Corp). The composition and structure of the comparative dental mill blank is shown in table 2. The layers contain additives of the type and amounts as indicated below the table. No further additives were used, i.e., the layers of the mill blank did not contain zinc oxide as sintering activator and type-II-yttria as sintering inhibitor.

TABLE 2

Raw starting materials

| | | Powder 4 | Powder 5 |
|---|---|---|---|
| Y-TZP type | | 4Y-TZP-LA | 5Y-TZP-LA |
| Zirconia (ZrO$_2$) | [wt. %] | 90.75 ± 0.5 | 88.7 ± 0.5 |
| Hafnium oxide (HfO$_2$) | [wt. %] | 1.85 ± 0.5 | 1.85 ± 0.5 |
| Yttria (Y2O$_3$) | [wt. %] | 7.35 ± 0.15 | 9.35 ± 0.15 |
| Aluminum oxide (Al$_2$O$_3$) | [wt. %] | 0.05 ± 0.01 | 0.05 ± 0.01 |
| other oxides | [wt. %] | <0.1 | <0.1 |

Composition and structure of comparative dental mill blank

| Layer | Y-TZP base type of powder | Material | Yttria content |
|---|---|---|---|
| Top layer L4 | 5Y | Powder 5** | L3 < L4 |
| Intermediate layer L3 | 4Y/5Y | Powder 4*/powder 5** (25:75) | L2 < L3 |
| Intermediate layer L2 | 4Y/5Y | Powder 4*/powder 5** (60:40) | L1 < L2 |
| Bottom layer L1 | 4Y | Powder 4* | |

*including coloring oxides in an amount of about 0.76 wt. % and La$_2$O$_3$ as sintering inhibitor in an amount of 0.14 wt. %, based on the total weight of powder 4;
**including coloring oxides in an amount of 0.33 wt. %, based on the total weight of powder 5.

4. Examples

4.1 Preparation of Pre-Sintered Multi-Layered Mill Blanks

Pre-sintered multi-layered dental mill blanks according to embodiments of the present invention were prepared as follows: different aqueous solutions were prepared, each of which comprising a selected concentration and combination of additives (sintering activator precursor, sintering inhibitor precursor, and coloring additives). An aqueous solution comprising a selected amount of additives was sprayed on each one of the powders 1 to 3 in a mixing device to provide treated powders 1 to 3. Thereafter, each one of the treated powders 1 to 3 was mixed for 30 minutes. In a next step, powder mixtures were prepared by mixing the treated powders 1 to 3 as shown in table 3.

TABLE 3

| Powder mixture | Y-TZP mix type | | Treated powder 1 | Treated powder 2 | Treated powder 3 |
|---|---|---|---|---|---|
| ½ | 3Y/4Y | [wt. %] | 25 | 75 | — |
| ⅔ | 4Y/5Y | [wt. %] | — | 25 | 75 |

Each one of treated powders 1 to 3 and powder mixtures ½ and ⅔ was screened on 200 μm mesh size. Powder layers were arranged in a mold by layering treated powders and powder mixtures as shown in table 4. The arranged powder layers were uniaxial pressed (about 325 MPa) to provide a pressed 4-layered green body. The pressed 4-layered green body was pre-sintered at a maximum pre-sintering temperature of about 850° C. with a holding time of 2-3 h to provide a pre-sintered multi-layered dental mill blank.

TABLE 4

| Layer | Y-TZP base type of powder | Material | Approx. amount [wt. %] | Layer thickness* [mm] |
|---|---|---|---|---|
| Top layer L4 | 5Y | Treated powder 3 | 23.5 | 4 |
| Intermediate layer L3 | 4Y/5Y | Treated mixture ⅔ | 8.8 | 1.5 |

TABLE 4-continued

| Layer | Y-TZP base type of powder | Material | Approx. amount [wt. %] | Layer thickness* [mm] |
|---|---|---|---|---|
| Intermediate layer L2 | 3Y/4Y | Treated mixture ½ | 8.8 | 1.5 |
| Bottom layer L1 | 3Y | Treated powder 1 | 58.9 | 10 |
| Total | | | 100 | |

*after pre-sintering

Different pre-sintered 4-layered dental mill blanks were prepared by the process as described above. For each one of the pre-sintered 4-layered dental mill blanks, the composition of the different layers was adjusted by adding a calculated amount of colorants, sintering activator precursor, and/or sintering inhibitor precursor to each one of powders 1 to 3. Based on the starting materials, target compositions per layer in the final pre-sintered 4-layered dental mill blank were calculated as shown for the mill blanks no. 1 to 11 in tables 7A to 7D below.

4.2 Speed Sintering Process

Speed sintering was carried out by the sintering process as described in table 5. The sintering was carried out in a Programat CS6 sintering furnace, which is commercially available from Ivoclar Vivadent AG. The total duration was about 14 minutes.

TABLE 5

| Step | T(start) [° C.] | T(end) [° C.] | Heating rate [K/min] | Time | Pressure |
|---|---|---|---|---|---|
| 1 | RT | 1050 | 200 | about 5 min. | Vacuum applied (about 80 mbar) |
| 2 | 1050 | 1450 | 100 | 4 min. | Vacuum applied until a temperature of 1400° C. is reached, followed by a vacuum air exchange under ambient pressure |
| 3 | 1450 | 1450 | 0 | 2 min. | |
| 4 | 1450 | 1350 | −130 | 46 sec. | |
| 5 | 1350 | 1200 | −70 | 2 min. 9 sec. | |
| Cool down | 1200 | RT | | Furnace opening at a temperature of 1200° C. (opening time about 1 min) | |

4.3 Optical Properties when being Speed Sintered

To test the pre-sintered 4-layered dental mill blanks no. 1, 2 and 4 to 11 for their optical properties after speed sintering, a test section was cut from each layer L1 to L4 of the respective pre-sintered 4-layered dental mill blank. Each test section was cut parallel to the boundaries of the respective layer using a precision diamond cutting saw to obtain a test section having a thickness of about 1.3-1.5 mm and edge lengths of about 19-22 mm. The upper and lower surface of each test section was plane ground to ±0.05 mm using a 1000 SiC grinding paper and cleaned. Each test section was subjected to speed sintering according to the sintering process as described in table 5.

Figure 2:
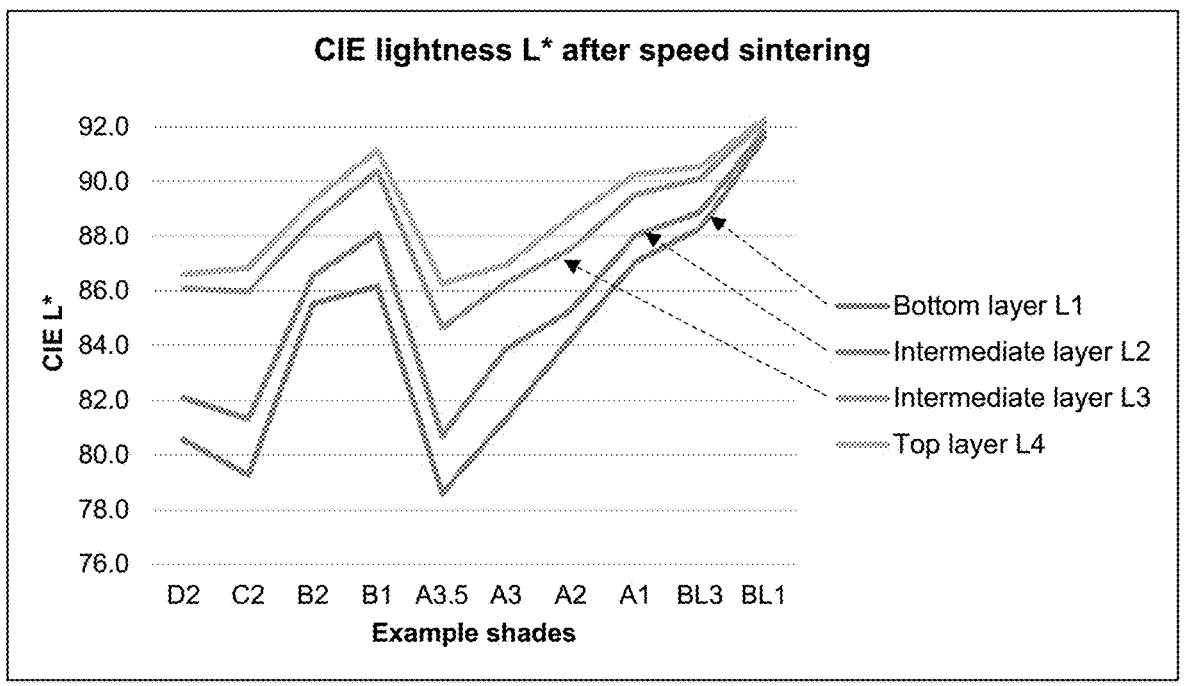
FIG. 2 shows a graphic representation of CIE L* values for layers L1 to L4 provided in tables 8A and 8B of the example section.

After the sintering process was completed, each test section was wet ground to a thickness of 0.8±0.02 mm using a rotating diamond grinding disc and 1000 SiC grinding paper, followed by a final surface wet-polishing using a diamond grind disc (20 μm). The color (CIE L*, a*, b*) and the contrast ratio of the obtained fully sintered test sections were measured as described above under "Measuring methods". Tables 8A and 8B show the optical properties that were determined for each fully sintered test section cut out from each one of the layers L1 to L4 of the different pre-sintered 4-layered dental mill blanks. Contrast ratios and CIE L* values are also depicted in FIG. 1 and FIG. 2.

4.4 Number of Pores Per Grain when Speed Sintered

Figure 3:
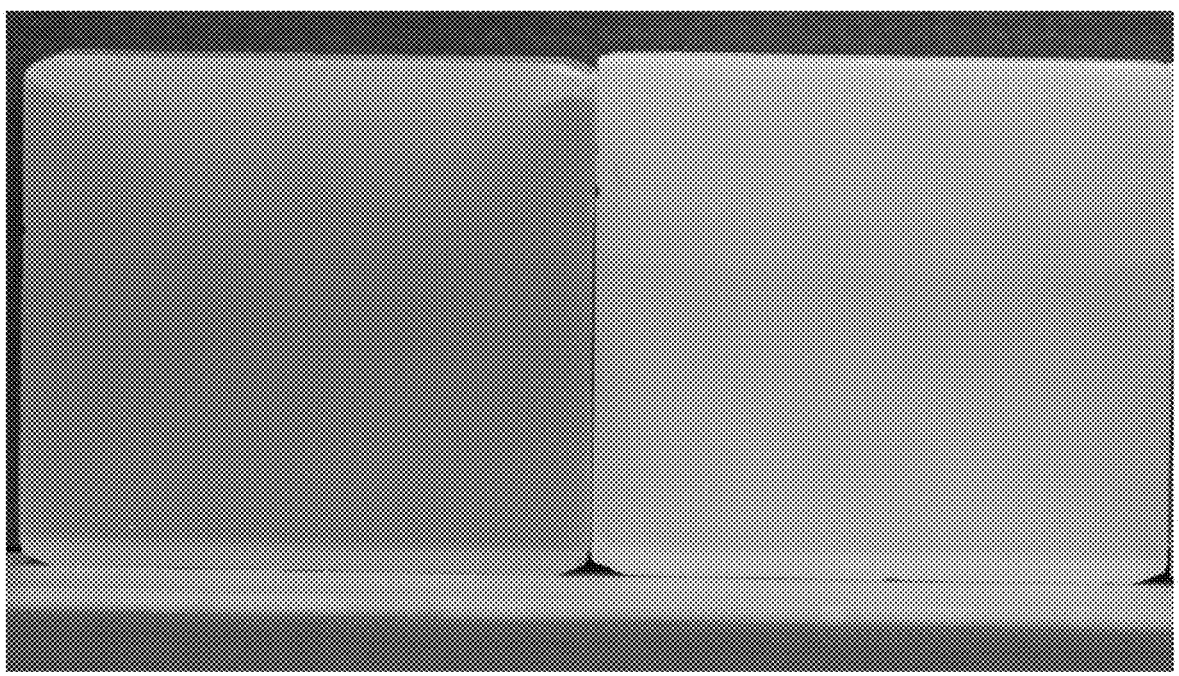
FIG. 3 shows on the left a test cross section of the dental mill blank according to mill blank no. 7 that was fully sintered by a speed sintering process according to table 5. On the right, a test cross section of the dental mill blank according to the comparative example is shown that was fully sintered by a speed sintering process according to table 5. The top layer L4 of each cross section is located on the upper part of the image and the bottom layer L1 is located on the lower part of the image.

The dental mill blank no. 7 according to one embodiment of the present invention and the comparative mill blank were tested for number of pores per grain when being speed sintered by a sintering process according to table 5. For the testing, a cross section having all layers was cut from each one of the two blanks and subsequently subjected to speed sintering according to the sintering process as described in table 5. After the sintering process was completed, each cross section was polished as described above in section "Measuring methods" under "Number of pores per grain". The polished cross sections are shown in FIG. 3. SEM images were taken from the top layer L4 and the intermediate layer L3 of each polished cross section.

Figure 4:
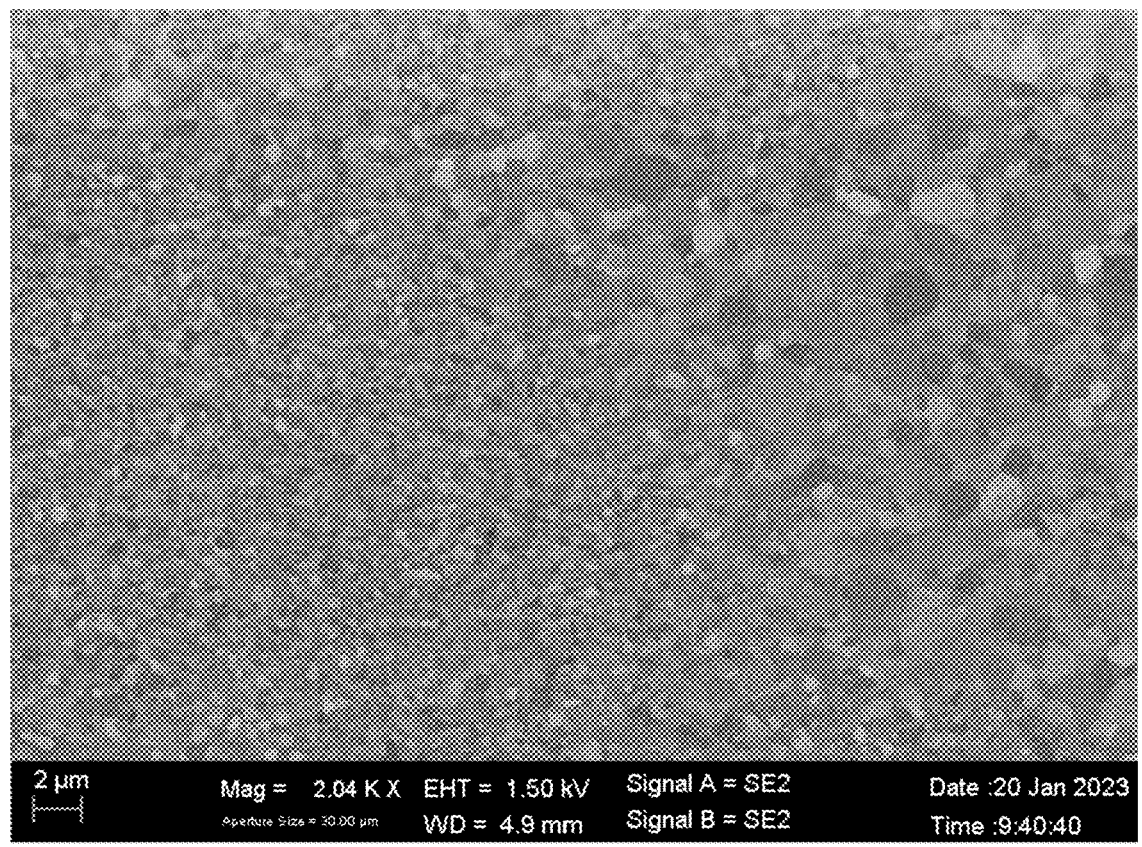
FIG. 4 shows a microstructural overview of an intermediate layer L3 of the fully sintered test cross section of mill blank no. 7 as shown in FIG. 3.
Figure 5:
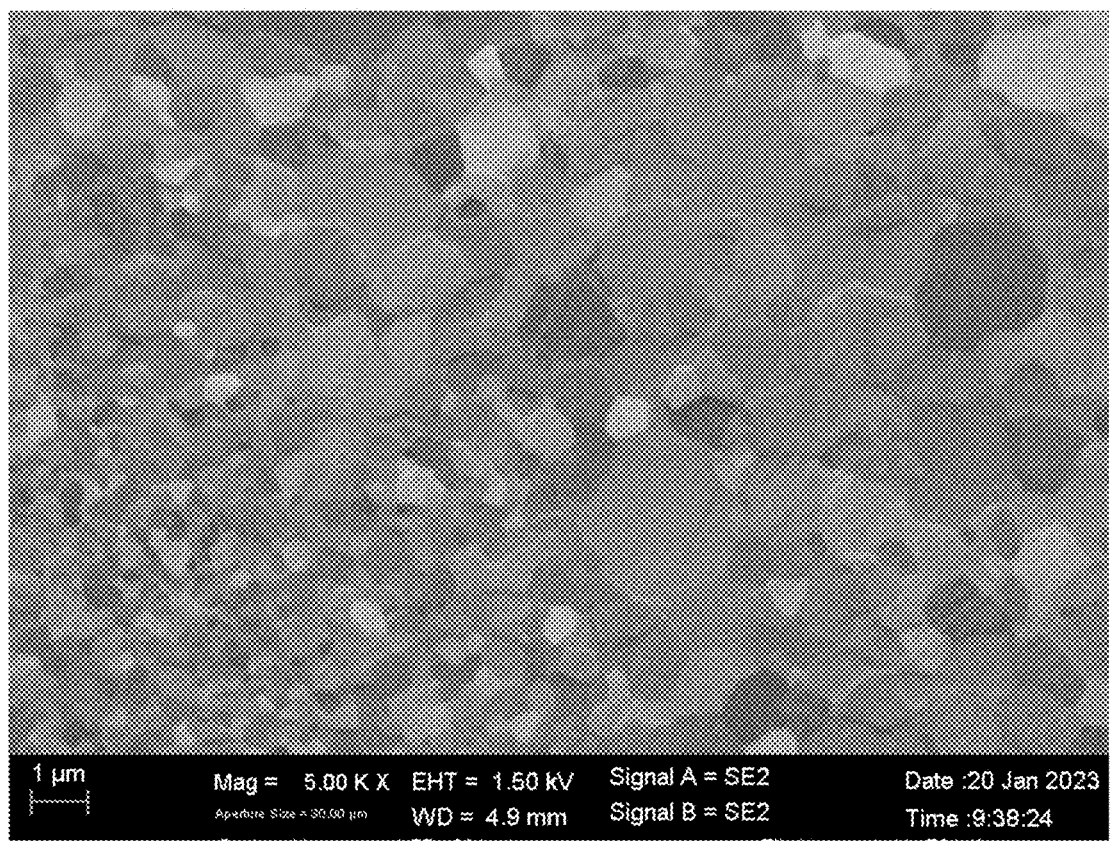
FIG. 5 shows a part of the surface of FIG. 4 in higher magnification.
Figure 6:
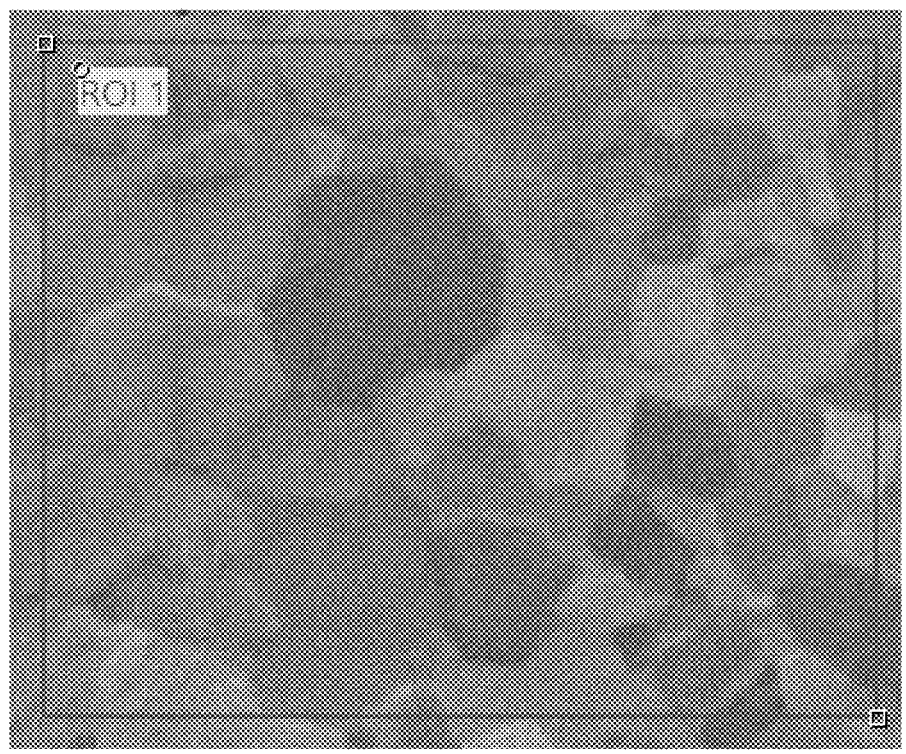
FIG. 6 shows a region of interest (ROI) selected from a part of the surface of a top layer L4 of the fully sintered test cross section of mill blank no. 7 as shown in FIG. 3.
Figure 7:
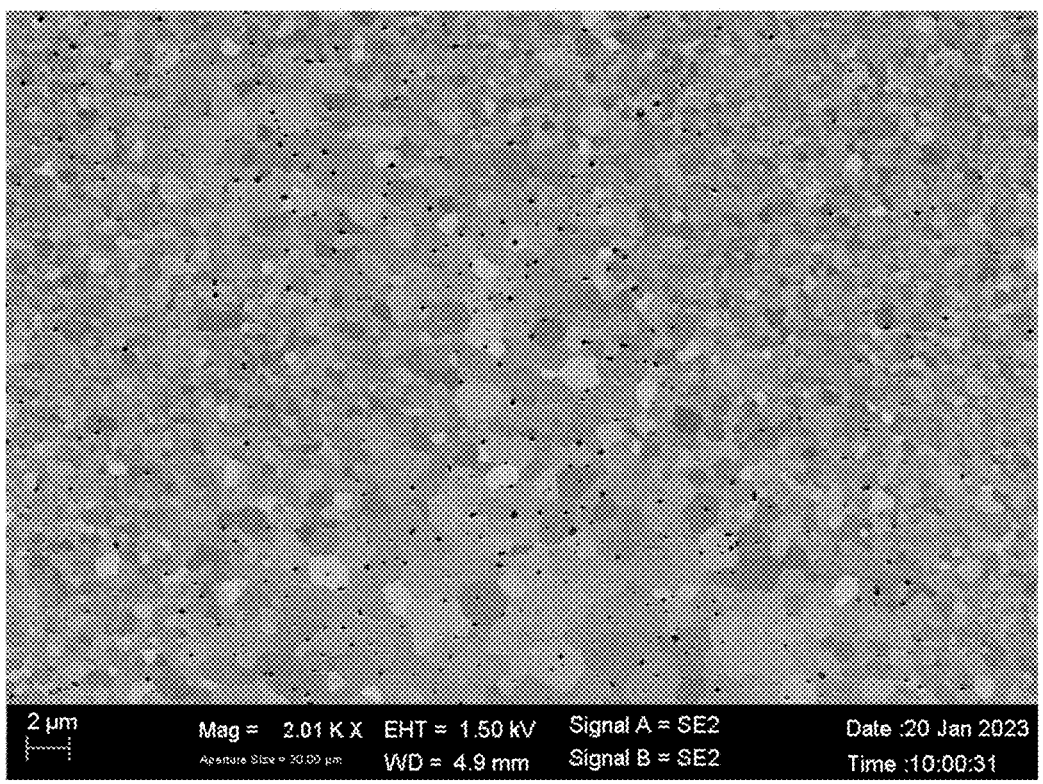
FIG. 7 shows a microstructural overview of an intermediate layer L3 of the fully sintered test cross section of the comparative mill blank as shown in FIG. 3.

A SEM image of different magnifications of the intermediate layer L3 of example 7 are shown in FIGS. 4 and 5. No or almost no pores are visible in the SEM image. In comparison, a SEM image of different magnifications of the intermediate layer L3 of the comparative example are shown in FIGS. 6 and 7. Pores are visible across the whole surface of the SEM image, and particularly in the higher grain size region (predominantly 5Y grains).

Figure 8:
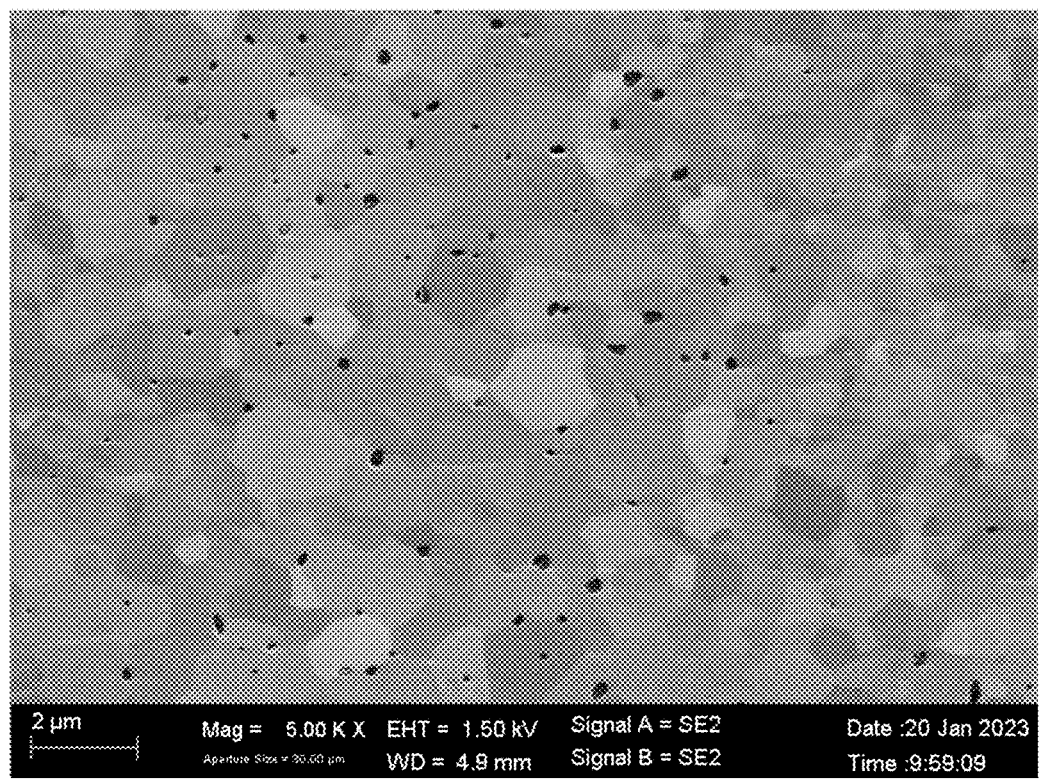
FIG. 8 shows a part of the surface of FIG. 7 in higher magnification.
Figure 9:
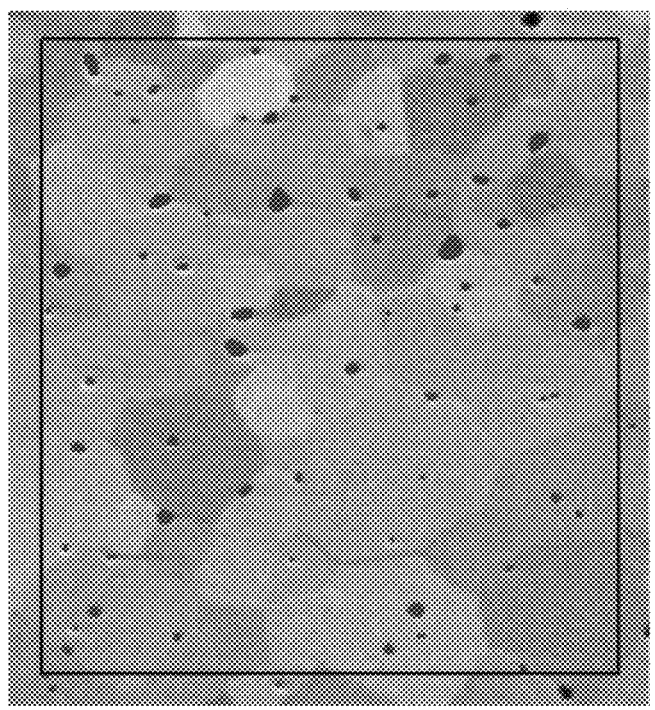
FIG. 9 shows a region of interest (ROI) selected from a part of the surface of the top layer L4 of the fully sintered test cross section of the comparative mill blank shown in FIG. 3.
Figure 10:
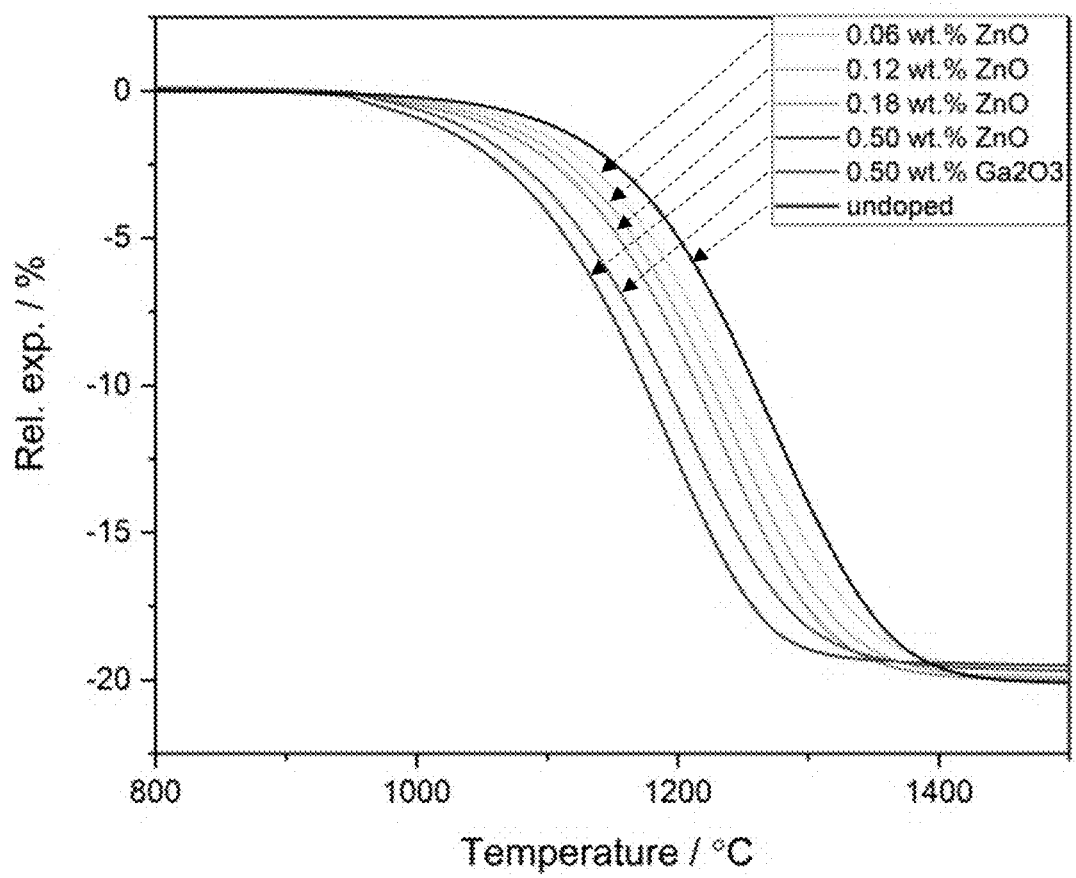
FIG. 10 shows a sintering curve of a raw 5 mol %-yttria-stabilized zirconia material ("undoped"; most right) compared to sintering curves of the 5 mol %-yttria-stabilized zirconia material containing different weight amounts of zinc oxide or gallium oxide as a sintering activator.
Figure 11:
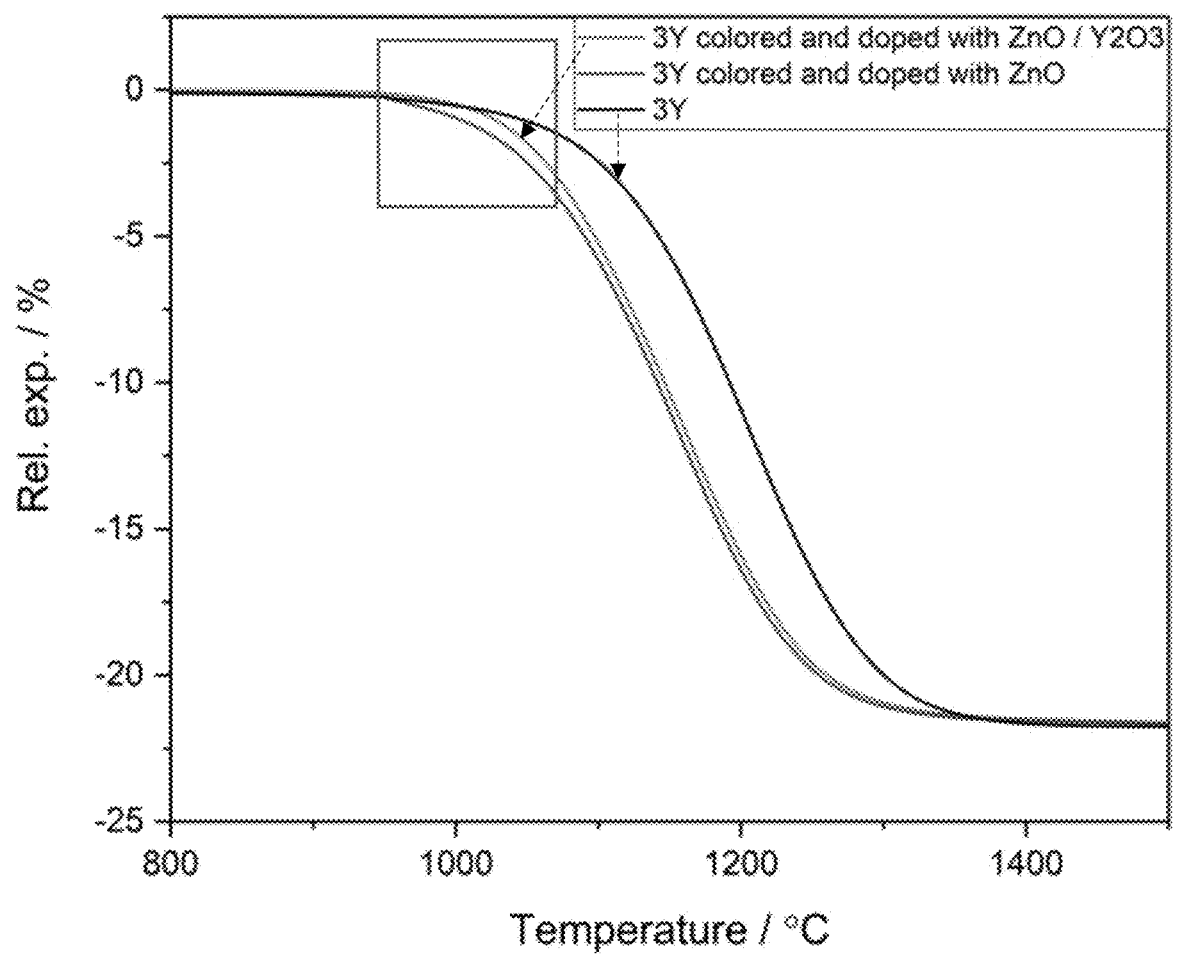
FIG. 11 shows sintering curves of a raw 3 mol %-yttria-stabilized zirconia material ("3Y"; right) compared to a sintering curve of the 3 mol %-yttria-stabilized zirconia material containing colorants and zinc oxide as a sintering activator ("3Y colored and doped with ZnO"; left) and a sintering curve of the 3 mol %-yttria-stabilized zirconia material containing colorants, zinc oxide as a sintering activator and type-II-yttria as a sintering inhibitor ("3Y colored and doped with ZnO/$Y_2O_3$"; middle).
Figure 12:
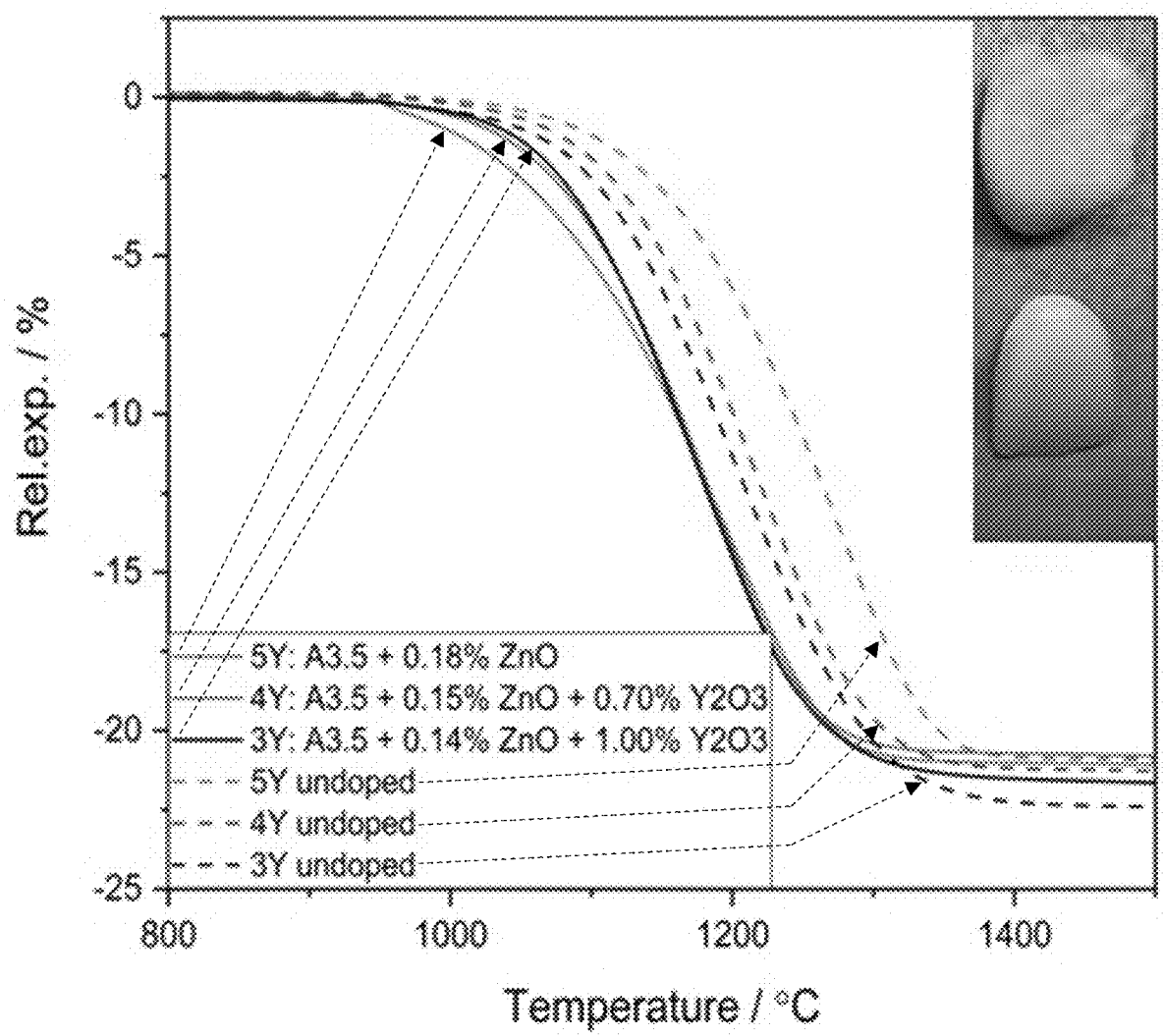
FIG. 12 shows sintering curves of a raw 3 mol %-yttria-stabilized zirconia material ("3Y undoped"; dashed left), a raw 4 mol %-yttria-stabilized zirconia material ("4Y undoped; dashed middle), and a raw 5 mol %-yttria-stabilized zirconia material ("5Y undoped; dashed right). The sintering curves are compared to sintering curves of the materials containing colorants (A3.5 shade), zinc oxide as sintering activator, and optionally type-II-yttria as a sintering inhibitor.

Number of pores per grains were calculated using the SEM images taken of the top layer L4 of each polished cross section. The regions of interest used for calculating the number of pores per grain for mill blank no. 7 and the comparative mill blank are shown in FIGS. 8 and 9, respectively. Number of pores per grain were as shown in table 6.

TABLE 6

| Region of interest (ROI) | Mill blank no. 7 | Comparative mill blank |
|---|---|---|
| Surface of ROI | 52.4 μm² | 80.5 μm² |
| Average grain size for ROI | 1.79 ± 0.38 μm | 1.83 ± 0.32 μm |
| Number of grains per ROI | 68 | 56 |
| Number of pores per ROI | 0 | 61 |
| Number of intragranular pores per ROI | 0 | 22 |
| Number of pores per grain | 0 | 1.09 |
| Number of intragranular pores per grain | 0 | 0.40 |

TABLE 7A

| | Mill blank no. | | | | | | | | | | | |
|---|---|---|---|---|---|---|---|---|---|---|---|---|
| | 1 | | | | 2 | | | | 3 | | | |
| | Dental shade | | | | | | | | | | | |
| | BL1 | | | | BL3 | | | | Experimental light shade | | | |
| | Layer | | | | | | | | | | | |
| Composition [wt. %] | L1 | L2 | L3 | L4 | L1 | L2 | L3 | L4 | L1 | L2 | L3 | L4 |
| ZrO₂ | 91.32 | 90.75 | 88.82 | 88.25 | 91.37 | 90.77 | 88.81 | 88.25 | 91.27 | 90.65 | 88.76 | 88.19 |
| HfO₂ | 1.68 | 1.69 | 1.69 | 1.70 | 1.68 | 1.69 | 1.69 | 1.70 | 1.68 | 1.69 | 1.69 | 1.69 |
| Al₂O₃ | 0.10 | 0.10 | 0.03 | 0.00 | 0.10 | 0.10 | 0.03 | 0.00 | 0.10 | 0.10 | 0.03 | 0.00 |
| Y₂O₃ (total) | 6.56 | 7.18 | 9.17 | 9.77 | 6.62 | 7.20 | 9.19 | 9.77 | 6.61 | 7.24 | 9.18 | 9.77 |
| Type-I-yttria (raw powder) | 5.63 | 6.70 | 9.09 | 9.77 | 5.63 | 6.70 | 9.09 | 9.77 | 5.62 | 6.69 | 9.09 | 9.77 |
| Type-II-yttria (sintering inhibitor) | 0.93 | 0.48 | 0.08 | 0.00 | 0.99 | 0.50 | 0.10 | 0.00 | 0.99 | 0.55 | 0.10 | 0.00 |
| ZnO (sintering activator) | 0.14 | 0.15 | 0.17 | 0.18 | 0.14 | 0.15 | 0.17 | 0.18 | 0.14 | 0.15 | 0.17 | 0.18 |
| Coloring metal oxides (total) | 0.21 | 0.14 | 0.11 | 0.10 | 0.10 | 0.10 | 0.11 | 0.11 | 0.21 | 0.18 | 0.17 | 0.17 |
| Fe₂O₃ | 0.01 | 0.01 | 0.00 | 0.00 | 0.01 | 0.01 | 0.01 | 0.01 | 0.03 | 0.02 | 0.02 | 0.02 |
| Er₂O₃ | 0.20 | 0.13 | 0.11 | 0.10 | 0.08 | 0.09 | 0.10 | 0.10 | 0.17 | 0.16 | 0.15 | 0.15 |
| Others | <0.01 | <0.01 | <0.01 | <0.01 | <0.01 | <0.01 | <0.01 | <0.01 | <0.01 | <0.01 | <0.01 | <0.01 |
| Total | 100 | 100 | 100 | 100 | 100 | 100 | 100 | 100 | 100 | 100 | 100 | 100 |

TABLE 7B

| | Mill blank no. | | | | | | | | | | | |
|---|---|---|---|---|---|---|---|---|---|---|---|---|
| | 4 | | | | 5 | | | | 6 | | | |
| | Dental shade | | | | | | | | | | | |
| | A1 | | | | A2 | | | | A3 | | | |
| | Layer | | | | | | | | | | | |
| Composition [wt. %] | L1 | L2 | L3 | L4 | L1 | L2 | L3 | L4 | L1 | L2 | L3 | L4 |
| ZrO₂ | 91.20 | 90.63 | 88.71 | 88.13 | 91.09 | 90.54 | 88.61 | 88.06 | 90.94 | 90.43 | 88.51 | 87.96 |
| HfO₂ | 1.68 | 1.69 | 1.69 | 1.69 | 1.67 | 1.68 | 1.69 | 1.69 | 1.67 | 1.68 | 1.69 | 1.69 |
| Al₂O₃ | 0.10 | 0.10 | 0.03 | 0.00 | 0.10 | 0.10 | 0.03 | 0.00 | 0.10 | 0.10 | 0.03 | 0.00 |
| Y₂O₃ (total) | 6.56 | 7.17 | 9.16 | 9.76 | 6.44 | 7.09 | 9.14 | 9.75 | 6.44 | 7.08 | 9.13 | 9.74 |
| Type-I-yttria (raw powder) | 5.62 | 6.69 | 9.08 | 9.76 | 5.61 | 6.68 | 9.07 | 9.75 | 5.60 | 6.67 | 9.06 | 9.74 |
| Type-II-yttria (sintering inhibitor) | 0.94 | 0.48 | 0.08 | 0.00 | 0.83 | 0.41 | 0.07 | 0.00 | 0.84 | 0.41 | 0.07 | 0.00 |

TABLE 7B-continued

| | Mill blank no. | | | | | | | | | | | |
|---|---|---|---|---|---|---|---|---|---|---|---|---|
| | 4 | | | | 5 | | | | 6 | | | |
| | Dental shade | | | | | | | | | | | |
| | A1 | | | | A2 | | | | A3 | | | |
| | Layer | | | | | | | | | | | |
| Composition [wt. %] | L1 | L2 | L3 | L4 | L1 | L2 | L3 | L4 | L1 | L2 | L3 | L4 |
| ZnO (sintering activator) | 0.14 | 0.15 | 0.17 | 0.18 | 0.14 | 0.15 | 0.17 | 0.18 | 0.14 | 0.15 | 0.17 | 0.18 |
| Coloring metal oxides (total) | 0.33 | 0.27 | 0.25 | 0.23 | 0.56 | 0.44 | 0.37 | 0.32 | 0.71 | 0.56 | 0.48 | 0.43 |
| $Fe_2O_3$ | 0.04 | 0.03 | 0.03 | 0.03 | 0.06 | 0.05 | 0.04 | 0.04 | 0.08 | 0.07 | 0.06 | 0.05 |
| $Er_2O_3$ | 0.28 | 0.23 | 0.21 | 0.20 | 0.49 | 0.39 | 0.32 | 0.27 | 0.61 | 0.48 | 0.41 | 0.36 |
| Others | 0.01 | 0.01 | 0.01 | 0.01 | 0.01 | 0.01 | 0.01 | 0.01 | 0.02 | 0.01 | 0.01 | 0.01 |
| Total | 100 | 100 | 100 | 100 | 100 | 100 | 100 | 100 | 100 | 100 | 100 | 100 |

TABLE 7C

| | Mill blank no. | | | | | | | | | | | |
|---|---|---|---|---|---|---|---|---|---|---|---|---|
| | 7 | | | | 8 | | | | 9 | | | |
| | Dental shade | | | | | | | | | | | |
| | A3.5 | | | | B1 | | | | B2 | | | |
| | Layer | | | | | | | | | | | |
| Composition [wt. %] | L1 | L2 | L3 | L4 | L1 | L2 | L3 | L4 | L1 | L2 | L3 | L4 |
| $ZrO_2$ | 90.93 | 90.41 | 88.48 | 87.92 | 91.35 | 90.77 | 88.83 | 88.27 | 91.3 | 90.66 | 88.70 | 88.14 |
| $HfO_2$ | 1.67 | 1.68 | 1.69 | 1.69 | 1.68 | 1.69 | 1.69 | 1.70 | 1.68 | 1.69 | 1.69 | 1.69 |
| $Al_2O_2$ | 0.10 | 0.10 | 0.03 | 0.00 | 0.10 | 0.10 | 0.03 | 0.00 | 0.10 | 0.10 | 0.03 | 0.00 |
| $Y_2O_3$ (total) | 6.43 | 7.08 | 9.12 | 9.74 | 6.60 | 7.20 | 9.19 | 9.78 | 6.61 | 7.19 | 9.18 | 9.76 |
| Type-I-yttria (raw powder) | 5.60 | 6.67 | 9.06 | 9.74 | 5.63 | 6.70 | 9.09 | 9.78 | 5.62 | 6.69 | 9.08 | 9.76 |
| Type-II-yttria (sintering inhibitor) | 0.83 | 0.41 | 0.07 | 0.00 | 0.97 | 0.50 | 0.10 | 0.00 | 0.99 | 0.50 | 0.10 | 0.00 |
| ZnO (sintering activator) | 0.14 | 0.15 | 0.17 | 0.18 | 0.14 | 0.15 | 0.17 | 0.18 | 0.14 | 0.15 | 0.17 | 0.18 |
| Coloring metal oxides (total) | 0.73 | 0.59 | 0.52 | 0.48 | 0.14 | 0.10 | 0.08 | 0.08 | 0.22 | 0.23 | 0.23 | 0.23 |
| $Fe_2O_3$ | 0.09 | 0.08 | 0.07 | 0.07 | 0.03 | 0.02 | 0.02 | 0.02 | 0.06 | 0.05 | 0.04 | 0.04 |
| $Er_2O_3$ | 0.61 | 0.49 | 0.43 | 0.40 | 0.10 | 0.07 | 0.06 | 0.05 | 0.15 | 0.17 | 0.18 | 0.18 |
| Others | 0.02 | 0.02 | 0.01 | 0.01 | 0.01 | 0.01 | 0.01 | 0.01 | 0.01 | 0.01 | 0.01 | 0.01 |
| Total | 100 | 100 | 100 | 100 | 100 | 100 | 100 | 100 | 100 | 100 | 100 | 100 |

TABLE 7D

| | Mill blank no. | | | | | | | |
|---|---|---|---|---|---|---|---|---|
| | 10 | | | | 11 | | | |
| | Dental shade | | | | | | | |
| | C2 | | | | D2 | | | |
| | Layer | | | | | | | |
| Composition (wt. %) | L1 | L2 | L3 | L4 | L1 | L2 | L3 | L4 |
| $ZrO_2$ | 91.32 | 90.74 | 88.80 | 88.24 | 91.35 | 90.76 | 88.81 | 88.25 |
| $HfO_2$ | 1.68 | 1.69 | 1.69 | 1.70 | 1.68 | 1.69 | 1.69 | 1.70 |
| $Al_2O_2$ | 0.10 | 0.10 | 0.03 | 0.00 | 0.10 | 0.10 | 0.03 | 0.00 |
| $Y_2O_3$ (total) | 6.61 | 7.19 | 9.19 | 9.77 | 6.62 | 7.20 | 9.19 | 9.77 |
| Type-I-yttria (raw powder) | 5.63 | 6.70 | 9.09 | 9.77 | 5.63 | 6.70 | 9.09 | 9.77 |
| Type-II-yttria (sintering inhibitor) | 0.99 | 0.50 | 0.10 | 0.00 | 0.99 | 0.50 | 0.10 | 0.00 |
| ZnO (sintering activator) | 0.14 | 0.15 | 0.17 | 0.18 | 0.14 | 0.15 | 0.17 | 0.18 |
| Coloring metal oxides (total) | 0.15 | 0.13 | 0.12 | 0.11 | 0.12 | 0.11 | 0.11 | 0.11 |

TABLE 7D-continued

| | | Mill blank no. | | | | | | |
|---|---|---|---|---|---|---|---|---|
| | | 10 | | | | 11 | | |
| | | Dental shade | | | | | | |
| | | C2 | | | | D2 | | |
| | | Layer | | | | | | |
| Composition (wt. %) | | L1 | L2 | L3 | L4 | L1 | L2 | L3 | L4 |
| $Fe_2O_3$ | | 0.07 | 0.06 | 0.05 | 0.05 | 0.05 | 0.04 | 0.03 | 0.03 |
| $Er_2O_3$ | | 0.07 | 0.07 | 0.06 | 0.06 | 0.06 | 0.07 | 0.07 | 0.07 |
| Others | | 0.01 | 0.01 | 0.01 | 0.01 | 0.01 | 0.01 | 0.01 | 0.01 |
| Total | | 100 | 100 | 100 | 100 | 100 | 100 | 100 | 100 |

TABLE 8A

| Mill blank | Dental shade | Layer | Contrast ratio [%] | L* | a* | b* |
|---|---|---|---|---|---|---|
| 1 | BL1 | L4 | 66.7 | 92.3 | 0.66 | 4.5 |
| | | L3 | 68.2 | 92.2 | 0.86 | 4.7 |
| | | L2 | 68.8 | 91.9 | 1.06 | 5.7 |
| | | L1 | 71.2 | 91.6 | 1.56 | 5.9 |
| 2 | BL3 | L4 | 64.4 | 90.6 | 0.52 | 7.2 |
| | | L3 | 67.8 | 90.1 | 0.66 | 7.4 |
| | | L2 | 70.7 | 88.9 | 0.48 | 9.2 |
| | | L1 | 73.8 | 88.3 | 0.49 | 9.8 |
| 3 | Experimental light shade | L4 | n.m. | n.m. | n.m. | n.m. |
| | | L3 | n.m. | n.m. | n.m. | n.m. |
| | | L2 | n.m. | n.m. | n.m. | n.m. |
| | | L1 | n.m. | n.m. | n.m. | n.m. |
| 4 | A1 | L4 | 64.8 | 90.3 | −0.04 | 14.4 |
| | | L3 | 67.2 | 89.5 | 0.43 | 15.3 |
| | | L2 | 71.3 | 88.0 | 0.85 | 17.1 |
| | | L1 | 74.2 | 87.1 | 1.48 | 18.0 |
| 5 | A2 | L4 | 63.5 | 88.7 | 0.78 | 16.2 |
| | | L3 | 68.1 | 87.5 | 1.72 | 17.9 |
| | | L2 | 72.7 | 85.3 | 2.48 | 20.0 |
| | | L1 | 76.0 | 84.3 | 3.33 | 20.9 |
| 6 | A3 | L4 | 66.2 | 87.0 | 1.58 | 21.1 |
| | | L3 | 67.1 | 86.3 | 2.05 | 21.7 |
| | | L2 | 73.6 | 83.9 | 3.46 | 22.5 |
| | | L1 | 79.0 | 81.3 | 4.79 | 22.1 |
| 7 | A3.5 | L4 | 67.3 | 86.3 | 1.93 | 23.2 |
| | | L3 | 70.9 | 84.6 | 3.08 | 24.0 |
| | | L2 | 77.9 | 80.7 | 4.8 | 24.0 |
| | | L1 | 80.1 | 78.6 | 5.55 | 23.8 |
| 8 | B1 | L4 | 63.4 | 91.2 | −1.69 | 12.9 |
| | | L3 | 67.1 | 90.4 | −1.28 | 14.0 |
| | | L2 | 71.2 | 88.1 | −0.35 | 15.8 |
| | | L1 | 75.5 | 86.2 | 0.52 | 15.9 | n.m. = not measured

TABLE 8B

| Mill blank | Dental shade | Layer | Contrast ratio [%] | L* | a* | b* |
|---|---|---|---|---|---|---|
| 9 | B2 | L4 | 65.8 | 89.3 | −0.29 | 17.6 |
| | | L3 | 67.0 | 88.5 | 0.07 | 19.1 |
| | | L2 | 72.4 | 86.5 | 0.47 | 20.5 |
| | | L1 | 76.0 | 85.5 | 1.1 | 20.3 |
| 10 | C2 | L4 | 62.8 | 86.8 | −0.8 | 21.1 |
| | | L3 | 68.3 | 86.0 | −0.25 | 21.5 |
| | | L2 | 76.7 | 81.3 | 1.32 | 20.6 |
| | | L1 | 81.0 | 79.3 | 2.36 | 20.08 |
| 11 | D2 | L4 | 66.2 | 86.6 | 0.02 | 15.0 |
| | | L3 | 69.8 | 86.1 | 0.08 | 16.4 |
| | | L2 | 77.1 | 82.1 | 1.09 | 17.8 |
| | | L1 | 79.1 | 80.6 | 1.57 | 18.64 |

The invention claimed is:

1. A pre-sintered multi-layered dental mill blank comprising the following layers:
   a top layer L4,
   an intermediate layer L3,
   an intermediate layer L2, and
   a bottom layer L1,
   and the layers L4 to L1 comprising the components as defined in Table I herein below, wherein the indicated weight amounts are based on a total weight of the respective layer:

TABLE I

| Layer | Combined amount of $ZrO_2$ and $HfO_2$ [wt. %] | $Al_2O_3$ [wt. %] | $Y_2O_3$ [wt. %] | Coloring metal oxides [wt. %] | ZnO [wt. %] |
|---|---|---|---|---|---|
| L4 | >87 | <0.01 | 9-12 | 0.02-1.5 | 0.02-0.80 |
| L3 | >88 | 0.02-0.20 | 8-10 | 0.02-1.5 | 0.02-0.80 |
| L2 | >90 | 0.05-0.50 | 6-8 | 0.02-1.5 | 0.02-0.80 |
| L1 | >90 | 0.05-0.50 | 5-7 | 0.02-1.5 | 0.02-0.80 |

2. The pre-sintered multi-layered dental mill blank according to claim 1, each layer comprising zirconia in a weight amount of at least 85 wt. %, based on the total weight of the respective layer of the pre-sintered multi-layered dental mill blank.

3. The pre-sintered multi-layered dental mill blank according to claim 1, the layers L4 to L1 having an yttria content that increases layer-by-layer from layer L1 to layer L4.

4. The pre-sintered multi-layered dental mill blank according to claim 1, the layers L4 to L1 comprising the components as defined in Table II herein below, wherein the indicated weight amounts are based on the total weight of the respective layer:

TABLE II

| Layer | Combined amount of $ZrO_2$ and $HfO_2$ [wt. %] | $Al_2O_3$ [wt. %] | $Y_2O_3$ [wt. %] | Coloring metal oxides [wt. %] | ZnO [wt. %] |
|---|---|---|---|---|---|
| L4 | >87 | <0.01 | 9-12 | 0.02-1.0 | 0.05-0.50 |
| L3 | >88 | 0.02-0.20 | 8-10 | 0.02-1.0 | 0.05-0.50 |
| L2 | >90 | 0.05-0.30 | 6-8 | 0.02-1.0 | 0.05-0.50 |
| L1 | >90 | 0.05-0.30 | 5-7 | 0.02-1.0 | 0.05-0.50 |

5. The pre-sintered multi-layered dental mill blank according to claim 4, each layer comprising zirconia in a weight amount of at least 85 wt. %, based on the total weight of the respective layer of the pre-sintered multi-layered dental mill blank.

6. The pre-sintered multi-layered dental mill blank according to claim 4, the layers L4 to L1 having an yttria content that increases layer-by-layer from layer L1 to layer L4.

7. The pre-sintered multi-layered dental mill blank according to claim 4, the layers L4 to L1 comprising the components as defined in Table III herein below, wherein the indicated weight amounts are based on the total weight of the respective layer:

TABLE III

| Layer | $ZrO_2$ [wt. %] | $HfO_2$ [wt. %] | $Al_2O_3$ [wt. %] | $Y_2O_3$ [wt.%] | Coloring metal oxides [wt. %] | ZnO [wt. %] |
|---|---|---|---|---|---|---|
| L4 | 87.5-89.0 | 1.5-2.0 | <0.01 | 9.2-10.2 | 0.05-0.7 | 0.10-0.30 |
| L3 | 88.0-89.5 | 1.5-2.0 | 0.02-0.10 | 8.7-9.7 | 0.05-0.7 | 0.10-0.30 |
| L2 | 90.0-91.5 | 1.5-2.0 | 0.05-0.20 | 6.5-7.5 | 0.05-0.7 | 0.05-0.25 |
| L1 | 90.5-92.0 | 1.5-2.0 | 0.05-0.20 | 6.0-7.0 | 0.05-0.8 | 0.05-0.25 |

8. The pre-sintered multi-layered dental mill blank according to claim 7, the layers L4 to L1 having an yttria content that increases layer-by-layer from layer L1 to layer L4.

9. The pre-sintered multi-layered dental mill blank according to claim 1, each layer comprising hafnium dioxide in a weight ratio to zirconia in a range of 0:100 to 5:95, based on a total weight of hafnium dioxide and zirconia of the respective layer of the pre-sintered multi-layered dental mill blank.

10. The pre-sintered multi-layered dental mill blank according to claim 9, each layer comprising hafnium oxide in a weight ratio to zirconia in a range of 1:99 to 4:96, based on a total weight of hafnium dioxide and zirconia of the respective layer of the pre-sintered multi-layered dental mill blank.

11. The pre-sintered multi-layered dental mill blank according to claim 1,
the top layer L4 being obtainable from an yttria-stabilized zirconia powder P3,
the intermediate layer L3 being obtainable from a mixture of yttria-stabilized zirconia powders P2 and P3,
the intermediate layer L2 being obtainable from a mixture of yttria-stabilized zirconia powders P1 and P2,
the bottom layer L1 being obtainable from an yttria-stabilized zirconia powder P1, and
the powder P1 having an yttria content in a range of 4.5 to 6.1 wt. %, the powder P2 having an yttria content in a range of 6.2 to 7.9 wt. %, and the powder P3 having an yttria content in a range of 8.0 to 11.0 wt. %.

12. The pre-sintered multi-layered dental mill blank according to claim 1, the yttria being present in each one of layers L3 to L1 comprising type-I-yttria and type-II-yttria,
wherein type-I-yttria is yttria that is present in an yttria-stabilized zirconia powder that is used to prepare at least a part of a powder layer of a green body from which the pre-sintered multi-layered dental mill blank is obtainable by pre-sintering,
wherein type-II-yttria is a sintering inhibitor, and wherein type-II-yttria is yttria that is obtainable by converting an yttrium salt into yttria when pre-sintering a green body of the multi-layered dental mill blank.

13. The pre-sintered multi-layered dental mill blank according to claim 12,
the intermediate layer L3 comprising the type-II-yttria in a weight amount in a range of 0.02 to 0.6 wt. %, based on the total weight of the intermediate layer L3,
the intermediate layer L2 comprising the type-II-yttria in a weight amount in a range of 0.1 to 1.0 wt. %, based on the total weight of the intermediate layer L2,
the bottom layer L1 comprising the type-II-yttria in a weight amount in a range of 0.5 to 1.5 wt. %, based on the total weight of the bottom layer L1, and the type-II-yttria content decreases layer-by-layer from layer L3 to layer L1.

14. The pre-sintered multi-layered dental mill blank according to claim 1, wherein the coloring metal oxides of each layer comprise erbium oxide, and optionally iron oxide.

15. The pre-sintered multi-layered dental mill blank according to claim 1, being characterized by providing a representative test section for each layer, the representative test sections, when being fully sintered by a speed sintering process, having a contrast ratio that increases layer-by-layer from the top layer to the bottom layer.

16. The pre-sintered multi-layered dental mill blank according to claim 1, being composed of layers L1 to layer L4.

17. The pre-sintered multi-layered dental mill blank according to claim 16,
the top layer L4 having a height in the range of 2 to 5 mm,
the intermediate layer L3 having a height in the range of 1 to 3 mm,
the intermediate layer L2 having a height in the range of 1 to 3 mm, and
the bottom layer L1 having a height in the range of 5 to 20 mm.

18. A process for preparing a pre-sintered multi-layered dental mill blank comprising the following layers:
a top layer L4,
an intermediate layer L3,
an intermediate layer L2, and
a bottom layer L1,
and the layers L4 to L1 comprising the components as defined in Table I herein below, wherein the indicated weight amounts are based on the total weight of the respective layer:

TABLE I

| Layer | Combined amount of $ZrO_2$ and $HfO_2$ [wt. %] | $Al_2O_3$ [wt. %] | $Y_2O_3$ [wt. %] | Coloring metal oxides [wt. %] | ZnO [wt. %] |
|---|---|---|---|---|---|
| L4 | >87 | <0.01 | 9-12 | 0.02-1.5 | 0.02-0.80 |
| L3 | >88 | 0.02-0.20 | 8-10 | 0.02-1.5 | 0.02-0.80 |
| L2 | >90 | 0.05-0.50 | 6-8 | 0.02-1.5 | 0.02-0.80 |
| L1 | >90 | 0.05-0.50 | 5-7 | 0.02-1.5 | 0.02-0.80 | the process comprising the steps of:
a) providing three yttria-stabilized zirconia powders P1 to P3, powder P1 having an yttria content in the range of 4.5 to 6.1 wt. %, powder P2 having an yttria content in the range of 6.2 to 7.9 wt. %, and powder P3 having an yttria content in the range of 8.0 to 11.0 wt. %,
b) preparing a green body comprising:
a top powder layer of powder P3,
an intermediate powder layer of a mixture of powders P2/P3, an intermediate powder layer of a mixture of powders P1/P2,
a bottom powder layer of powder P1,
c) pre-sintering the green body to provide a pre-sintered multi-layered dental mill blank,
and wherein the process comprises adding a zinc salt being a sintering activator precursor and coloring additives to the powders P1 to P3 or to the mixtures thereof.

19. A process for preparing a dental restoration, the process comprising the steps of:
machining a pre-sintered multi-layered dental mill blank to provide a dental restoration precursor,
the pre-sintered multi-layered dental mill blank comprising the following layers:
a top layer L4,
an intermediate layer L3,
an intermediate layer L2, and
a bottom layer L1,
and the layers L4 to L1 comprising the components as defined in Table I herein below, wherein the indicated weight amounts are based on the total weight of the respective layer:

TABLE I

| Layer | Combined amount of $ZrO_2$ and $HfO_2$ [wt. %] | $Al_2O_3$ [wt. %] | $Y_2O_3$ [wt. %] | Coloring metal oxides [wt. %] | ZnO [wt. %] |
|---|---|---|---|---|---|
| L4 | >87 | <0.01 | 9-12 | 0.02-1.5 | 0.02-0.80 |
| L3 | >88 | 0.02-0.20 | 8-10 | 0.02-1.5 | 0.02-0.80 |
| L2 | >90 | 0.05-0.50 | 6-8 | 0.02-1.5 | 0.02-0.80 |
| L1 | >90 | 0.05-0.50 | 5-7 | 0.02-1.5 | 0.02-0.80 | optionally surface-treating the dental restoration precursor;
sintering the dental restoration precursor to provide a dental restoration.

20. The process according to claim 19, wherein the total duration of the sintering is less than 45 minutes, like in a range of 10 to 30 minutes.

* * * * *